US012142611B2

(12) United States Patent
Peng et al.

(10) Patent No.: US 12,142,611 B2
(45) Date of Patent: Nov. 12, 2024

(54) SEMICONDUCTOR STRUCTURE FOR REDUCING STRAY CAPACITANCE AND METHOD OF FORMING THE SAME

(71) Applicant: TAIWAN SEMICONDUCTOR MANUFACTURING COMPANY LTD., Hsinchu (TW)

(72) Inventors: Shih-Wei Peng, Hsinchu (TW); Wei-Cheng Lin, Taichung (TW); Jiann-Tyng Tzeng, Hsinchu (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

(21) Appl. No.: 17/075,559

(22) Filed: Oct. 20, 2020

(65) Prior Publication Data

US 2022/0123023 A1 Apr. 21, 2022

(51) Int. Cl.
*H01L 27/12* (2006.01)
*G06F 30/392* (2020.01)
*G06F 119/12* (2020.01)

(52) U.S. Cl.
CPC .......... *H01L 27/124* (2013.01); *G06F 30/392* (2020.01); *G06F 2119/12* (2020.01)

(58) Field of Classification Search
CPC ... H01L 27/124; G06F 30/392; G06F 2119/12
USPC ....................................................... 257/213
See application file for complete search history.

(56) References Cited

U.S. PATENT DOCUMENTS

| | | | | |
|---|---|---|---|---|
| 6,649,980 B2* | 11/2003 | Noguchi | ................. | H01L 21/84 257/407 |
| 8,232,152 B2* | 7/2012 | Hsu | ................. | H01L 21/823456 257/E21.177 |
| 10,896,851 B2* | 1/2021 | Cheng | ................... | H01L 29/775 |
| 10,930,563 B2* | 2/2021 | Cheng | ................... | H01L 29/775 |
| 2008/0179664 A1* | 7/2008 | Rao | ................. | H01L 21/823487 257/329 |
| 2017/0133273 A1* | 5/2017 | Choi | ................... | H01L 29/4238 |
| 2017/0207239 A1* | 7/2017 | Liaw | ..................... | H01L 27/092 |
| 2020/0104460 A1 | 4/2020 | Peng et al. | | |

* cited by examiner

*Primary Examiner* — Ori Nadav
(74) *Attorney, Agent, or Firm* — WPAT LAW; Anthony King

(57) ABSTRACT

A layout method includes: generating a design data including an electronic circuit; and generating a design layout by placing a cell corresponding to the electronic circuit. The cell includes a first transistor and a second transistor over the first transistor. The first transistor includes a gate extending in a first direction, a first active region arranged in a first layer and extending in a second direction, and a first conductive line and a second conductive line arranged on two sides of the first active region. The second transistor includes the gate, a second active region arranged in a second layer over the first layer and extending in the second direction, and a third conductive line and a fourth conductive line arranged on two sides of the second active region. At least one of the four conductive lines includes a first portion non-overlapped with the gate in the first direction.

20 Claims, 46 Drawing Sheets

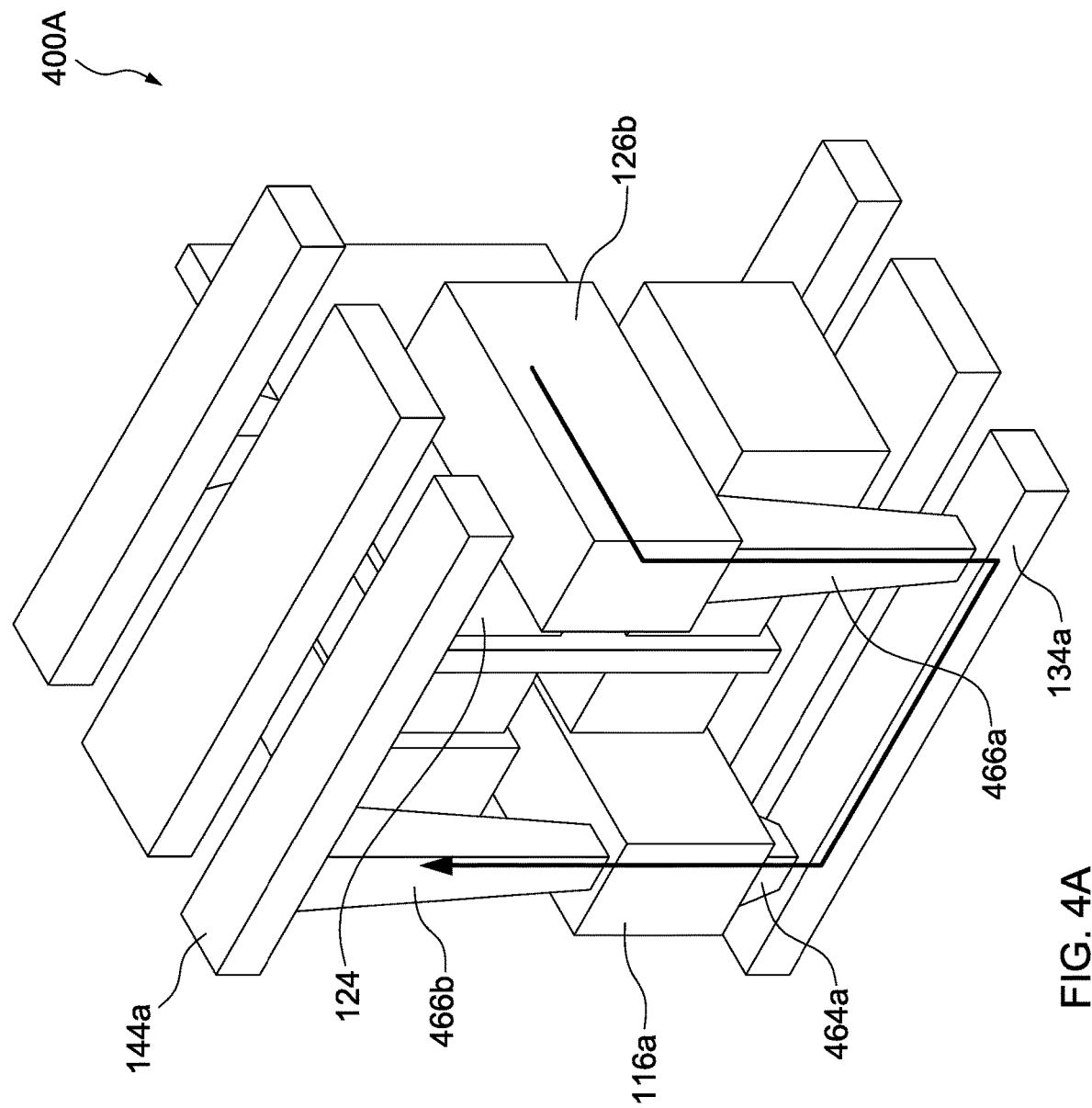

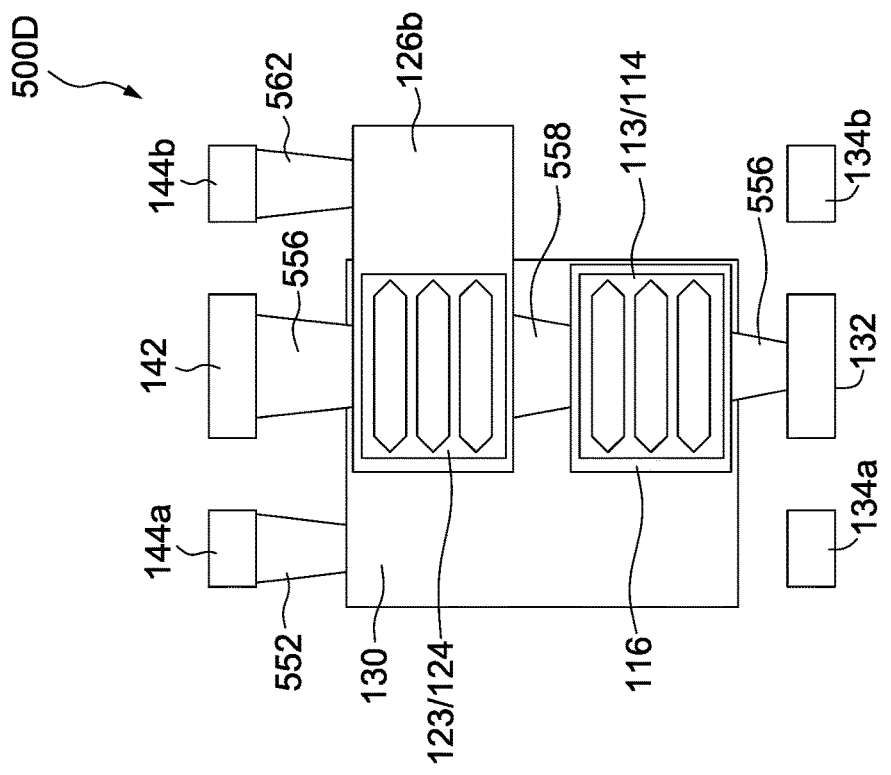
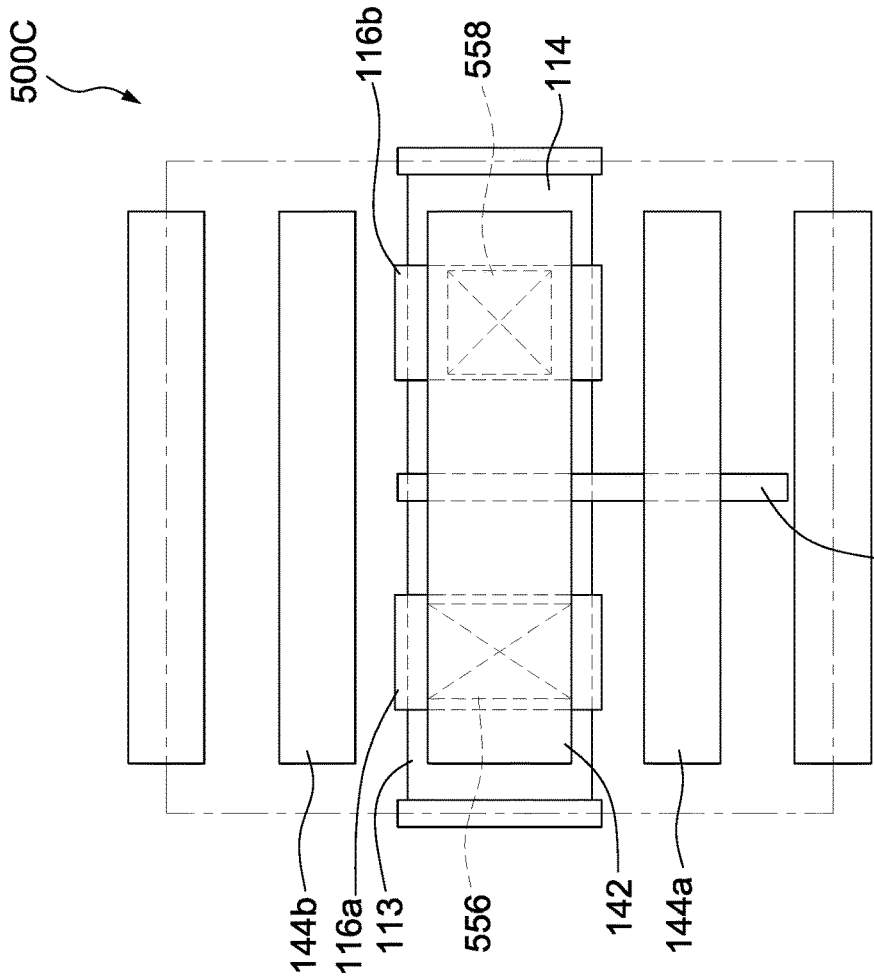

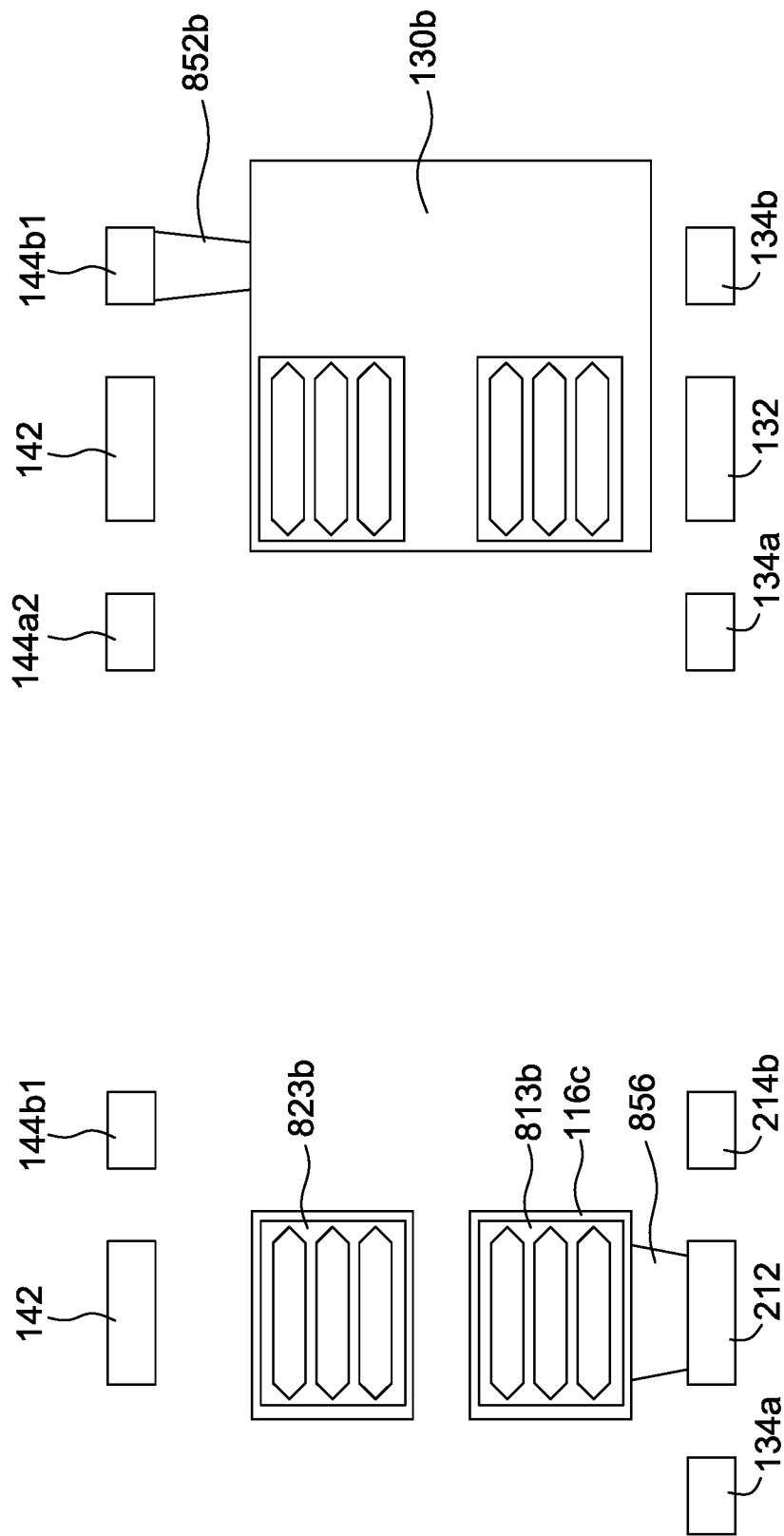

SEMICONDUCTOR STRUCTURE FOR REDUCING STRAY CAPACITANCE AND METHOD OF FORMING THE SAME

BACKGROUND

Electronic equipment involving semiconductor devices is essential for many modern applications. Technological advances in materials and design have produced generations of semiconductor devices, in which each generation includes smaller and more complex circuits than the previous generation. In the course of advancement and innovation, functional density (i.e., the number of interconnected devices per chip area) has generally increased while geometric size (i.e., the smallest component that can be created using a fabrication process) has decreased. Such advances have increased the complexity of designing and manufacturing semiconductor devices. The manufacturing of a semiconductor device becomes more complicated in a miniaturized scale, and the increase in complexity of manufacturing may cause deficiencies such as high yield loss, reduced reliability of electrical interconnection and low testing coverage. Therefore, there is a continuous need to modify the structure and manufacturing method of the devices in electronic equipment in order to improve device robustness as well as reduce manufacturing cost and processing time.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIGS. 4A to 4C are perspective views of various semiconductor devices, in accordance with some embodiments of the present disclosure.

FIGS. 5B and 5C are plan views of the semiconductor device shown in FIG. 5A, in accordance with some embodiments of the present disclosure.

FIG. 5D is a cross-sectional view of a semiconductor device shown in FIG. 5A, in accordance with some embodiments of the present disclosure.

FIGS. 8D to 8L are cross-sectional views of the semiconductor device shown in FIG. 8A, in accordance with some embodiments of the present disclosure.

DETAILED DESCRIPTION

Figure 1:
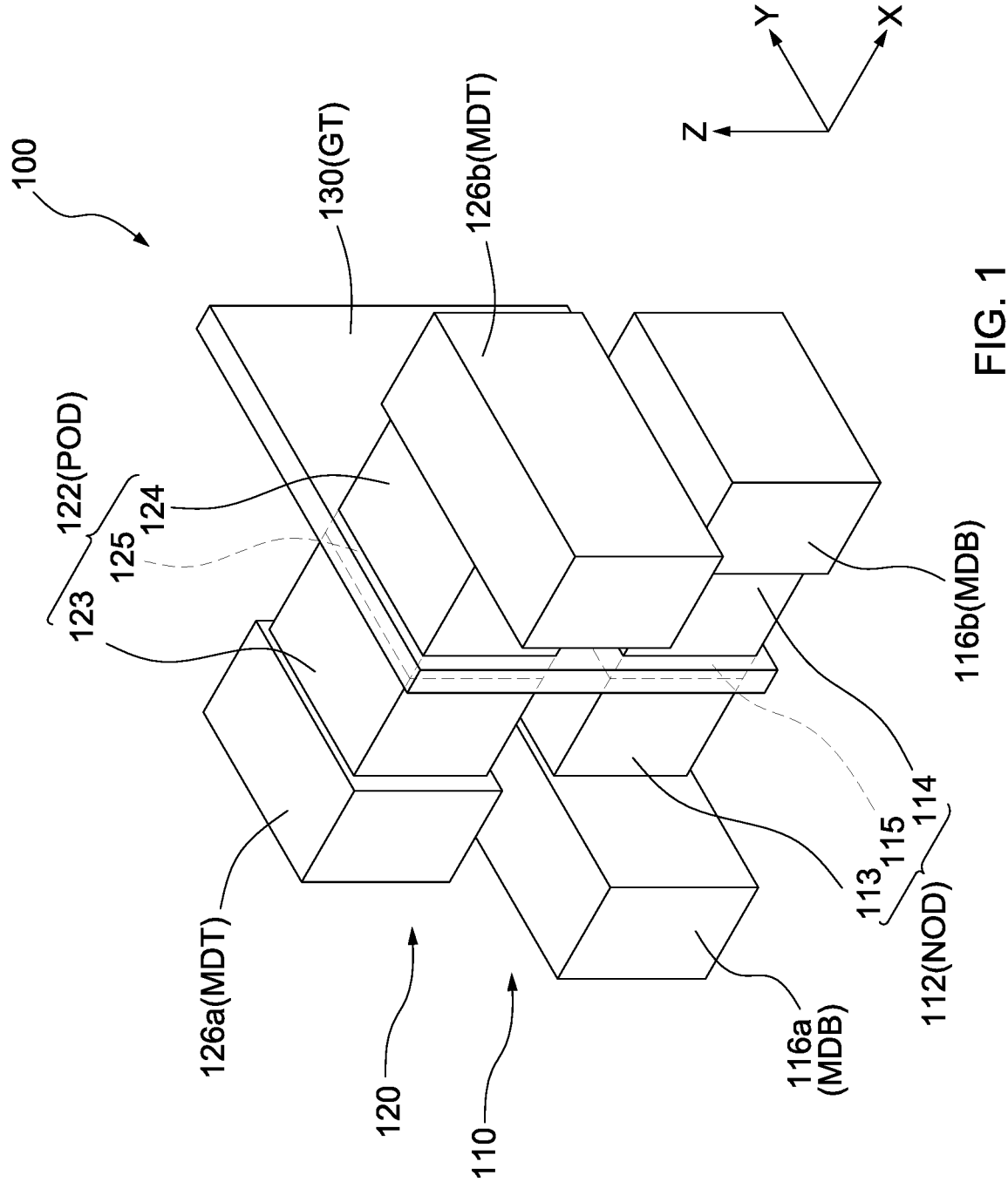
FIG. 1 is a perspective view of a semiconductor device, in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the deviation normally found in the respective testing measurements. Also, as used herein, the terms "about," "substantial" or "substantially" generally mean within 10%, 5%, 1% or 0.5% of a given value or range. Alternatively, the terms "about," "substantial" or "substantially" mean within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms "about," "substantial" or "substantially." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as being from one endpoint to another endpoint or between two endpoints. All ranges disclosed herein are inclusive of the endpoints, unless specified otherwise.

Throughout the present disclosure, if several features of a same type are introduced, they are labeled by the same generic numerals and differentiated by postfixes of different lower-case letters. For example, the numerals 102a and 102b may refer to two instances of a same type feature in a semiconductor device, in which the instances 102a and 102b may have the same or different configurations, such as the dimension or material. In some cases, if one or more features are referred to by a three-digit numeral only, it is intended to mean the union set of such features, e.g., the description "feature 102" refers to the collection of the features 102a and 102b. Throughout various views and illustrative embodiments, like elements are designated with like reference numerals for ease of understanding.

The term "standard cell" or simply "cell" used throughout the present disclosure refers to a group of circuit patterns in a design layout to implement specific functionalities of a circuit. A cell is generally comprised of one or more layers, and each layer includes various patterns expressed as polygons of the same or various shapes. A design layout may be generated by placement of one or more cells in allocated locations of a blank layout. In some cases, after the placement step, the placed cells are electrically connected using an interconnect structure. The geometries of the patterns in the cells may be adjusted at different stages of a design flow in order to compensate for design and process effects. The cells may be accessible from cell libraries provided by semiconductor manufacturers or designers. In some cases, the cell library may be stored in a non-transitory computer-readable storage medium and accessed by a processor in various circuit design stages.

Throughout the present disclosure, the cells are designed for implementing electronic circuits formed by semiconductor devices, e.g., a metal-oxide-semiconductor (MOS) field-effect transistor (FET) device, and can be a planar FET device, a fin-type FET (FinFET) device, a gate-all-around (GAA) device, a nanosheet device, a nanowire device, a fully-depleted silicon-on-isolator (FDSOI) device, or the like.

Throughout the present disclosure, the term "nanosheet" refers to a substantially two-dimensional layer formed of semiconductor materials, such as silicon or silicon germanium. In a nanosheet FET, the nanosheets are used as a channel in place of the channel in a planar or fin-type FET. A gate of the FET warps around each of the nanosheets to achieve better electrical performance of the FET.

In the various embodiments of the present disclosure, a semiconductor device is provided, in which the semiconductor device includes a vertical stack of at least an upper FET and a lower FET with a common gate and independently controlled source/drain regions, in which each FETs has one or more physical channels extending between two source/drain regions. A top power rail and a bottom power rail are separately arranged in two metal line layers overlying the upper FET and underlying the lower FET, respectively, in which the top power rail and the bottom power rail are configured to supply a first voltage (e.g., VDD) and a second voltage (e.g., VSS), respectively.

Compared to approaches in which the power rails are arranged in a same layer or on a same side of the vertical stack, the proposed metal layer stacking structure can provide power rails with adequate line widths while decreasing the distances of the conduction paths in the FET. The resistance and power consumption of the semiconductor device can be effectively decreased. Further, the gate is shortened along the gate direction so as to reduce its overlapping area with the source/drain contacts for the source/drain regions in each FET. The stray capacitance in the propose FET stacking structure between the gate and its neighboring features can be effectively decreased as compared to approaches in which the gate overlaps the entire source/drain contacts in the gate direction. Therefore, through the arrangements of the separate power rails and the shortened gate, the proposed FET stacking structure provides advantages in terms of power or speed, as illustrated by the non-limiting examples provided below.

FIG. 1 is a schematic diagram of a perspective view of a semiconductor device 100, in accordance with some embodiments of the present disclosure. FIG. 1 depicts a simplified version of the semiconductor device 100 for the purpose of illustrating the spatial relationships of the FETs in the semiconductor device 100; the spatial relationships of the semiconductor device 100 are provided in greater detail with reference to FIGS. 2A to 2D.

Referring to FIG. 1, the semiconductor device 100 includes a vertical stack of two FETs 110 and 120. The FETs 110 and 120 are vertically stacked in the direction of the z-axis, in which the FET 120 is arranged over the FET 110. In some embodiments, the FETs 110 and 120 are vertically stacked over a substrate (not shown). The substrate underlying the stacking structure can be any substrate suitable for epitaxial growth and/or is formed of any suitable crystalline material including, for example, silicon, silicon germanium (SiGe), or the like.

In some embodiments, the stacked FETs 110 and 120 are constructed by a p-type FET and an n-type FET, or vice versa, and thus the semiconductor device 100 is referred to as a complementary FET (CFET) device. In some embodiments, the term "p-type FET" as discussed above is referred to as a FET including a p-type dopant, e.g., boron, in doped source/drain regions of the p-type FET. The term "n-type FET" as discussed above is referred to as a FET including an n-type dopant, e.g., phosphorous or arsenic, in doped source/drain regions of the n-type FET.

The FET 110 includes an active region (NOD) 112, a gate 130, a first conductive line (MDB) 116a and a second conductive line (MDB) 116b. The active region 112, also referred to as an active area or an oxide-defined (OD) area, extends in a direction along the x-axis and defines a first source/drain region 113, a second source/drain region 114, and a channel region 115, in which the channel region 115 is arranged between the source/drain regions 113 and 114 and covered by the gate 130. In some embodiments, the channel region 115 is formed of one nanosheet or a stacking structure of nanosheets. The nanosheet(s) of the channel region 115 may be wrapped around by the gate 130. In some embodiments, the source/drain regions 113 and 114 include epitaxially formed materials, such as silicon or silicon germanium, on opposite sides of the channel region 115. In some embodiments, the source/drain regions 113 and 114 include dopants, such as a p-type dopant, e.g., boron, or an n-type dopant, e.g., phosphorous and arsenic. In the present example, the source/drain regions 113 and 114 include n-type dopants, and thus the active region 112 is referred to as an n-type active region (NOD).

The gate 130 extends in a gate direction, e.g., along the y-axis, and is arranged between the first source/drain region 113 and the second source/drain region 114 of the FET 110. The gate 130 is configured to control current in the channel region 115 through a biasing signal applied thereto. In some embodiment, the gate 130 is formed of a conductive material, such as doped polysilicon or formed of a metal gate including metallic materials such as tungsten and cobalt, and other work function adjusting metals, such as Ti, Al, TiAl, TiN, TaC, and the like.

In some embodiments, the conductive lines 116a and 116b are arranged in a same layer of the active region 112 and electrically connected to the first and second source/drain regions 113 and 114, respectively. In some examples, the conductive lines 116a and 116b are also referred to the source/drain contacts. In some embodiments, the conductive lines 116a and 116b wrap around portions of the source/drain regions 113 and 114, respectively.

In some embodiments, the conductive lines 116 are formed of conductive materials, e.g., one or more of copper (Cu), silver (Ag), tungsten (W), titanium (Ti), nickel (Ni), tin (Sn), aluminum (Al) or another metal or material suitable for providing low resistance electrical connection in the semiconductor device 100. In some other embodiments, the conductive lines 116 include semiconductor materials. In some embodiments, the conductive lines 116 include epitaxial layers with dopants. The conductive lines 116 may be formed of one or more of silicon (Si), SiGe, silicon-carbide, boron, phosphorous, arsenic, gallium, or other suitable materials.

Similar to the FET 110, the FET 120 includes an active region 122, the gate 130, a first conductive line (MDT) 126a and a second conductive line (MDT) 126b. The active region 122 extends in a direction parallel to the active region 112 and defines a first source/drain region 123, a second source/drain region 124, and a channel region 125, in which the channel region 125 is arranged between the two source/drain regions 123 and 124 and covered by the gate 130. In some embodiments, the conductive lines 126a and 126b are arranged in a same layer of the active region 122 and electrically connected to the first and second source/drain regions 123 and 124, respectively. The materials, configurations and method of forming for the FET 120 are similar to those for the FET 110, and their detailed descriptions are omitted for brevity. In the present example, the source/drain regions 123 and 124 include p-type dopants, and thus the active region 122 is referred to as a p-type active region (POD).

The gate 130 extends in the gate direction, e.g., along the y-axis, and is arranged between the first source/drain region 123 and the second source/drain region 124 of the FET 120. The gate 130 is configured to control current in the channel region 125 through the same biasing signal which controls the channel region 115. In this connection, the gate 130 extends across the lower layer and the upper layer in a direction along the z-axis.

The conductive lines 116 and 126 extend in a direction along the y-axis, substantially perpendicular to the direction in which the active region 112 or 122 extends and substantially parallel to the direction in which the gate 130 extends from a top-view perspective. In some embodiments, the gate 130 is shortened in the gate direction, i.e., along the y-axis, on one side of the active region 112 or 122 while still fully wrapping around the active regions 112 and 122. As such, at least one of the conductive lines 116 and 126, e.g., the conductive line 116a, is offset from the gate 130 in the y-axis. In some embodiments, at least one of the conductive lines 116 and 126 is not fully overlapped with the gate 130 in the y-axis due to the shortened gate 130. In some embodiments, the gate 130 and the conductive line 116a extends toward opposite directions (e.g., positive y-axis and negative y-axis) along the y-axis. In some embodiments, at least one of the conductive lines 116 and 126 extend beyond one end of the gate 130 in the y-axis due to the shortened gate 130.

Since stray capacitance is generally induced between two adjacent parallel conductive features of the semiconductor device 100, e.g., between the gate 130 and any of the conductive lines 116 and 126, the induced capacitance value will be closely determined by the overlapping area between the gate 130 and any of the conductive lines 116 and 126. Through the arrangement of the shortened gate 130, the overlapping area between the gate 130 and the conductive lines 116 126 are effectively reduced without impacting the performance of the semiconductor device 100. The electrical performance of the semiconductor device 100 can be thus improved.

The structures of the semiconductor device 100 as discussed above are given for illustrative purposes. Various structures of the Semiconductor device 100 are within the contemplated scope of the present disclosure. For example, in various embodiments, the structures of the semiconductor device 100 are extended to include additional gates that are in parallel, in series, or in parallel and series combination, to the gate 130 as discussed above. In some other embodiments, the FET 110 is stacked above the FET 120.

Figure 2A:
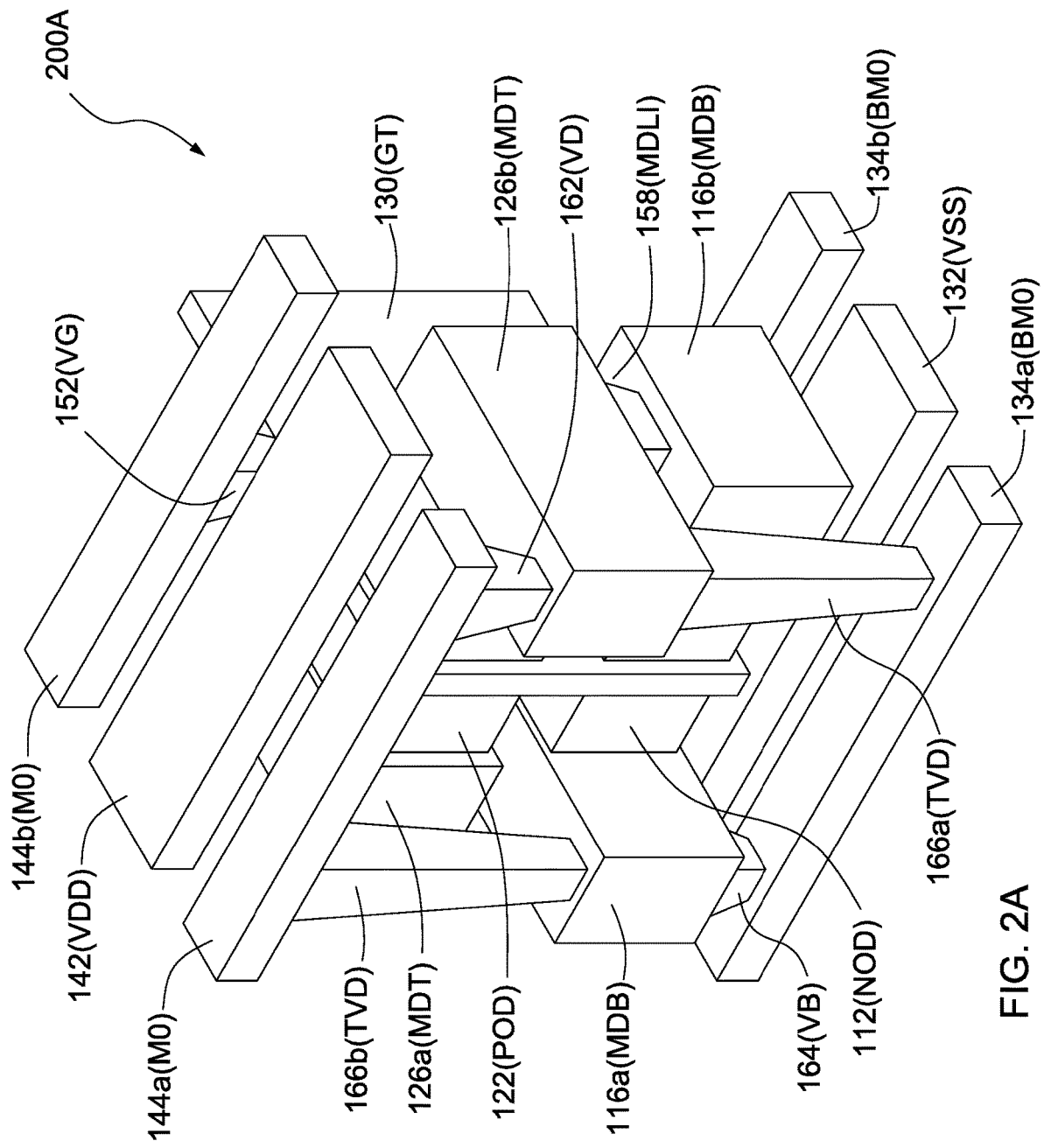
FIG. 2A is a perspective view of a semiconductor device, in accordance with some embodiments of the present disclosure.
Figure 2B:
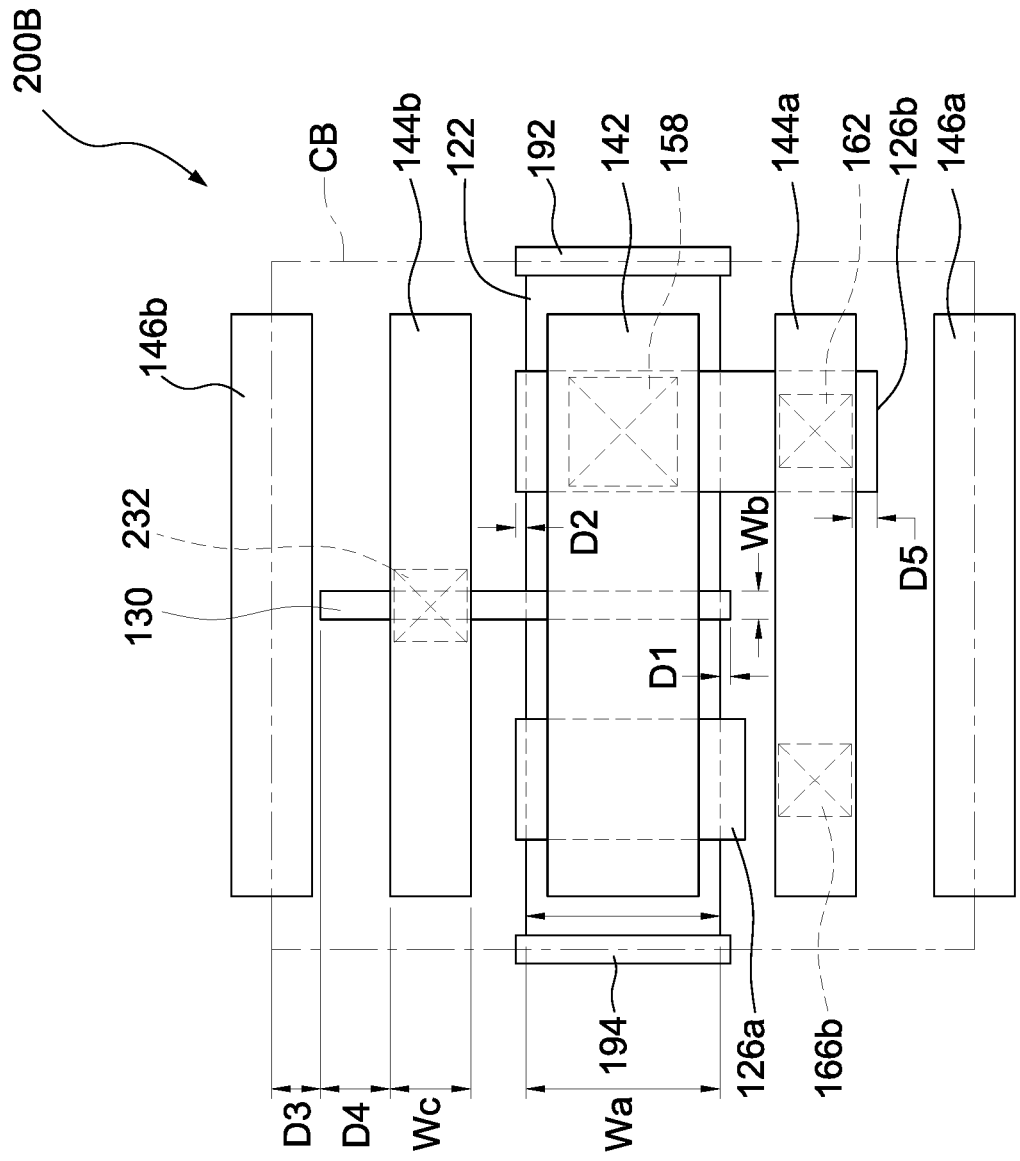
FIGS. 2B to 2C are schematic diagrams of design layouts of the semiconductor device shown in FIG. 2A, in accordance with some embodiments of the present disclosure.
Figure 2C:
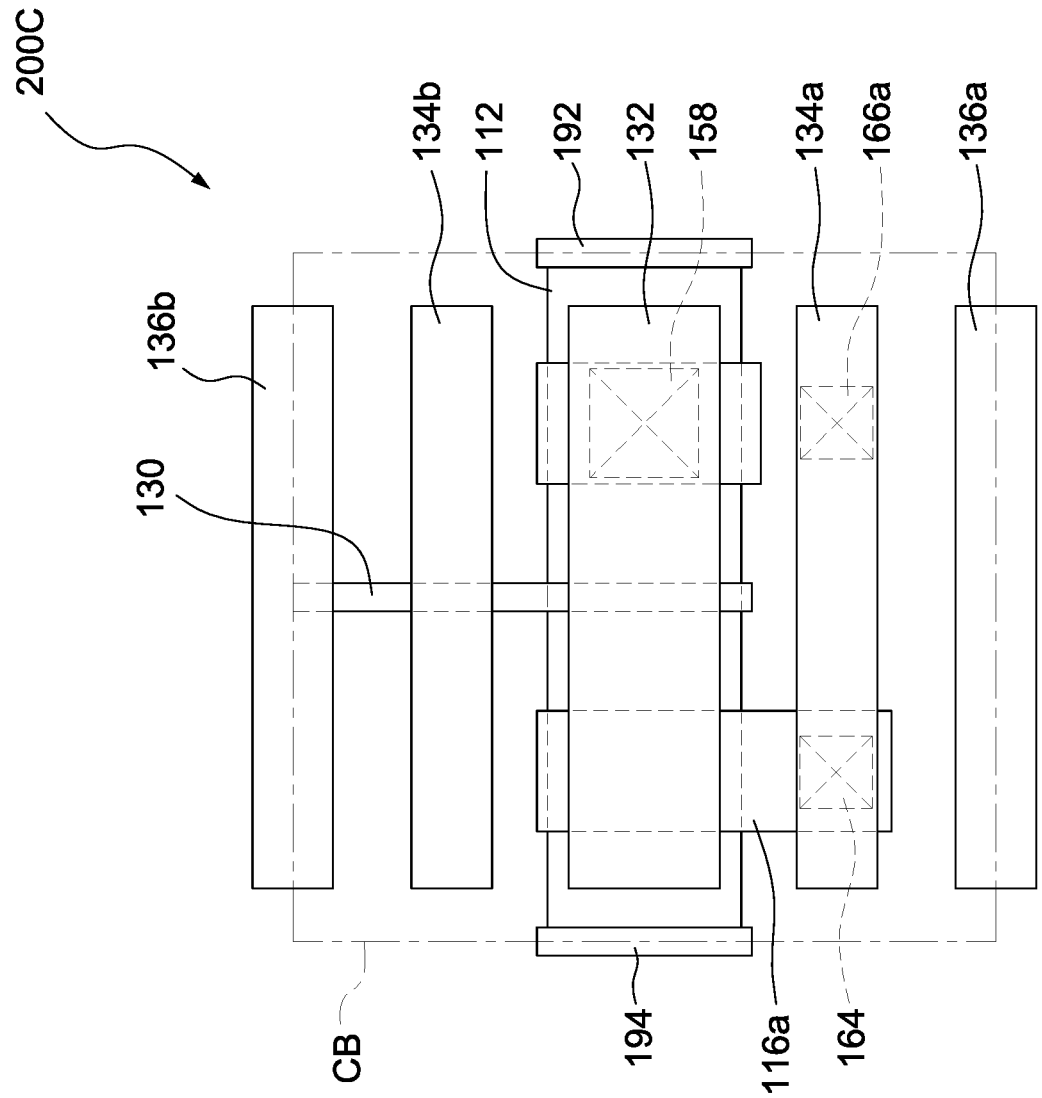

FIG. 2A is a perspective view of the semiconductor device 200A, in accordance with some embodiments of the present disclosure. The semiconductor device 200A includes the semiconductor device 100 shown in FIG. 1A and additional routing structures. FIGS. 2B to 2C are schematic diagrams of design layouts 200B and 200C, respectively, illustrating features in different layers of the semiconductor device 200A. In some embodiments, the semiconductor device 200A is associated with a cell 200A during a design stage and the design layouts 200B and 200C show different parts of the cell 200A. As seen from FIGS. 2B and 2C, the cell 200A is defined by a cell boundary CB.

Figure 2D:
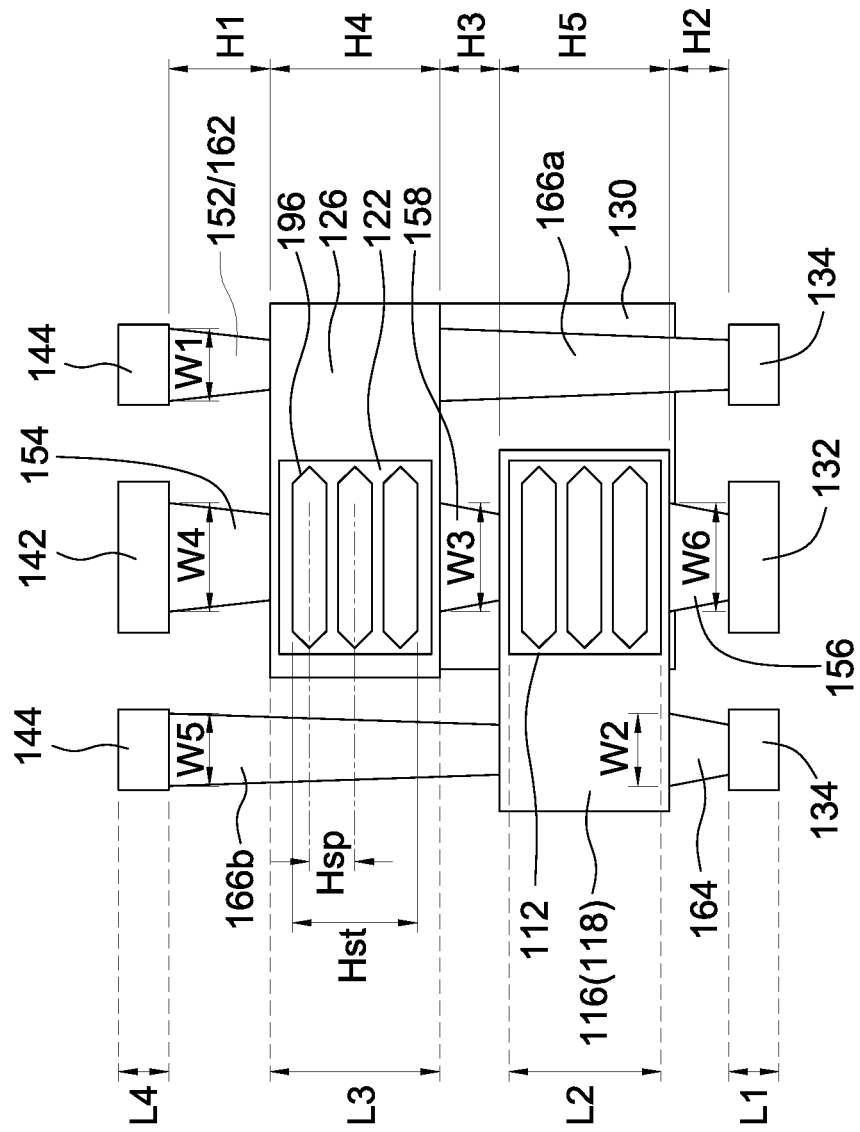
FIG. 2D is a schematic diagram showing dimensions of various parts in the semiconductor device shown in FIG. 2A, in accordance with some embodiments of the present disclosure.

FIG. 2D shows schematic diagrams illustrating dimensions of various parts in the semiconductor device shown in FIG. 2A, in accordance with some embodiments of the present disclosure. Referring to FIG. 2D, the semiconductor device 200A includes a bottom metal line layer L1 arranged underlying the lower layer L2 in which the FET 110 resides and a top metal line layer L4 arranged overlying the upper layer L3 in which the FET 120 resides.

Referring to FIGS. 2A and 2C, the bottom metal line layer L1 includes a first power rail 132 (VSS), two conductive lines (BMO) 134 and two conductive lines (BMO) 136 in parallel and extending along the direction of the x-axis. A conductive line 134a and a conductive line 136a are arranged on a first side of the first power rail 132; a conductive line 134b and a conductive line 136b are arranged on a second side of the first power rail 132.

Likewise, referring to FIGS. 2A and 2B, the top metal line layer L4 includes a second power rail 142 (VDD), two conductive lines (MO) 144 and two conductive lines (MO) 146 in parallel and extending along the direction of the x-axis. A conductive line 144a and a conductive line 146a are arranged on a first side of the second power rail 142; a conductive line 144b and a conductive line 146b are arranged on a second side of the second power rail 142.

In some embodiments, the power rail 142 and the conductive lines 144 form a front-side interconnect structure of the semiconductor device 200A for interconnecting the features of the semiconductor device 200A. In some embodiments, the power rail 132 and the conductive lines 134 form a backside interconnect structure of the semiconductor device 200A for interconnecting the features of the semiconductor device 200A. In some embodiments, only the conductive lines 144 serve as input/output pins of the semiconductor device 200A to electrically connect the signals of the semiconductor device 200A to external features or circuits. In some embodiments, the power rails 132, 142 and the conductive lines 134, 136, 144, 146 are formed of conductive materials, such as doped polysilicon, copper, tungsten, aluminum, titanium, tantalum, titanium nitride, tantalum nitride, alloys thereof, or the like.

The semiconductor device 200A further includes various conductive vias for providing electrical connection between the aforementioned features in different layers. A first-type conductive via extends between two adjacent layers of the semiconductor device 100, for example, a gate via (VG) 152 is disposed in a conductive via layer between the layers L3 and L4 and configured to electrically connect the gate 130 to a conductive line, e.g., conductive line 146, in the layer L4. A first drain via (VD) 162 is disposed in a conductive via layer between the layers L3 and L4 and configured to electrically connect a conductive line, e.g., the conductive line 126b, in the layer L3 to a conductive line, e.g., conductive line 144, in the layer L4. A second drain via (VB) 164 is disposed in a conductive via layer between the layers L1 and L2 and configured to electrically connect a conductive line, e.g., the conductive line 116a, in the layer L2 to a conductive line, e.g., the conductive line 134a, in the layer L1. An MD-local-interconnect via (MDLI) 158 is disposed in a conductive via layer between the layers L2 and L3 and configured to electrically connect conductive lines in layers L2 and L3, e.g., conductive lines 126b and 116b.

A second-type conductive via 166 extends more than one layers and can be referred to as a tall drain via (TVD) herein. For example, a first second-type via 166a electrically connects the conductive line 134 in the layer L1 to the conductive line 126b in the third layer L3. A second second-type via 166b electrically connects the conductive line 126a in the layer L2 to the conductive line 144a in the fourth layer L4.

In some embodiments, the power rails 132, 142 are configured to supply power to the semiconductor device 200A while the conductive lines 134, 136, 144 and 146 are configured as data rails for conveying data signals. In some embodiments, only the conductive lines 134 or 144 immediately adjacent to the power rail 132 or 142 are functioning, and therefore the conductive lines 136 or 146 are configured as dummy or shielding conductive lines. Referring to FIG. 2B, the power rails 132, 142 have a line width Wa measured along the y-axis and the conductive lines 134, 136, 144 and 146 have a line width Wc, measured along the y-axis, less than the line width Wa since a power rail is typically made wider than a data rail to minimize interconnection resistance. In some embodiments, a line width ratio Wc/Wa is between about 0.3 and about 0.8, or between about 0.4 and about 0.6.

In some embodiments, the power rails 132 and 142 are configured to supply a first voltage and a second voltage, respectively, or vice versa. The first voltage may be a positive voltage (VDD) and the second voltage may be ground (VSS). Since the power rails 132 and 142 need to be of greater line width than that for the conductive lines 134, 136, 144 and 146, the arrangement of disposing the power rails 132 and 142 in different metal line layers L1 and L4 provides better area utilization of the metal line layer L1 and L4 to for wider power rails 132 and 142. In some other embodiments, the first voltage may be VSS and the second voltage may be VDD depending upon the conductivity types of the active regions 112 and 122.

In some embodiments, the power rails 132 and 142 overlap the active regions 112 and 122 of the FETs 110 and 120, respectively, from a top-view perspective. In some embodiments, the first and second voltages correspond to a p-type FET and an n-type FET of the CFET, and the voltages supplied by the power rails 132 and 142 are determined according to the conductivity types of the FETs 110 and 120. In other words, the power rail 132 or 142 are so arranged so as to provide first and second voltages to the active region 112 or 122 as closely as possible, thereby minimizing the conduction path and the resultant resistance.

Conventional circuit design generally arrange the power rails in a same metal line layer, in which the power rails are on opposite sides of the metal layer while the conductive lines are arranged between the two power rails and immediately adjacent to each other. However, since the conductive lines 144a and 144b are configured to transmit data signals independently of each other, the coupling effect between the conductive lines 144 is found to be pronounced due to the reduced line pitch, thereby deteriorating signal quality. In contrast, the conductive lines in the same metal layers are separated by the power rail in the same metal layer. The proposed power rail arrangement not only reduces the resistance of the conduction path but also provides electrical shielding between the conductive lines 144a and 144b (or between conductive lines 134a and 134b) on opposite sides of the power rail 142 (132) without any additional shielding or protecting circuits. Therefore, the stability and integrity of signal transmission can be enhanced without sacrificing area or power.

The semiconductor device 200B further includes dummy gates 192 and 194 extending in the y-axis and arranged on two sides of the active regions 112 and 122, respectively. In some embodiments, the dummy gates 192 and 194 are formed with the similar materials to those for forming the gate 130; however, the dummy gates 192 and 194 are not functioning in forming the FETs 110 and 120 of the semiconductor device 200B. In some embodiments, the cell boundary CB is constructed by an upper cell side, a lower cell side, a left cell side and a right cells side. The upper cell side and the lower cell side are aligned with centerlines of the topmost and bottommost conductive lines 146b and 146a (or 136b and 136a), respectively. The left cell side and the right cell side of the cell boundary CB are aligned with centerlines of the left dummy gates 194 and 192, respectively.

Referring to FIG. 2B and FIG. 2C, the gate 130 crosses the active region 112 (122) and extends towards the conductive lines 134 (144) and 136 (146) on only one side, e.g., the upper side when viewed from above in FIG. 2B or 2C, of the active region 112 (122). In some embodiments, on one hand, the gate 130 crosses the conductive line 134b (144b) on the upper side of the active region 112 (132) and contacts the conductive line 136b (146b) on the upper side of the active region 112 (132). On the other hand, the gate 130 is non-overlapped with the conductive line 134a (144a) or 136a (146a) on the lower side of the active region 112 (132) when viewed from above in FIG. 2B or 2C.

In some embodiments, at least one of the conductive lines 116a, 116b, 126a and 126b extends in a direction opposite to that in which the gate 130 extends from a top-view perspective. For example, the conductive line 116a extends towards the conductive line 134a on the lower side of the active region 112. The conductive line 116a is non-overlapped with the conductive lines 134b and 136b on the upper side of the active region 112. Similarly, the conductive line 126b extends towards the conductive line 144a on the lower side of the active region 122. The conductive line 126a is non-overlapped with the conductive lines 144b and 146b on the upper side of the active region 122.

In some embodiments, referring to FIG. 2B, the gate 130 includes an enclosure distance D1 between a first side (e.g., a lower side) of the gate 130 and a second side (e.g., the lower side on the same side of the first side) of the active region 122 to ensure that the gate 130 crosses the entire active region 122 and 112 under process variations of manufacturing the semiconductor device 200A. In some embodiments, the enclosure distance D1 is less than a distance between the power rail 142 and the conductive line 144 and is between about 1 nm and about 6 nm. In some embodiments, the conductive line 116 or 126 includes the enclosure distance D2 between a third side (e.g., the upper side) of the conductive line 116, 126 and a fourth side (e.g., the upper side on the same side of the third side) of the active region 112, 122 to ensure that the conductive line 116 or 126 crosses the entire active region 112, 122 under process variations of manufacturing the semiconductor device 200A. In some embodiments, the enclosure distance D2 is less than a distance between the power rail 142 and the conductive line 144 and between about 1 nm and about 6 nm. In some embodiments, a ratio of the distance D1 or D2 to the width Wa of the active region 112, 122 measure along the y-axis is between about 0.05 and about 0.5.

In some embodiments, referring to FIG. 2B, the gate 130 has a clearance distance D3 between the upper side of the gate 130 and the cell boundary to avoid undesired contact with features in adjacent cells. In some embodiments, the clearance distance D3 is greater than about 6 nm or about 10 nm. In some embodiments, a ratio of the distance D3 to the width Wa of the active region 112, 122 measure along the y-axis is between about 0.2 and about 0.4.

In some embodiments, the conductive via of the semiconductor device 200A, such as the gate via 152, has an enclosure distance D4 with respect to the gate 130 to ensure reliable contact between the conductive via and the gate 130 under process variations of manufacturing the semiconductor device 200A. The enclosure distance D4 may be measured between a fifth side (e.g., the upper side) of the gate via 152 and the sixth side (e.g., the upper side on the same side of the active region 122 with respect to the fifth side) of the gate 130. In some embodiments, the enclosure distance D4 is between about 5 nm and about 10 nm. In some embodiment, a width Wb of the gate 130 measure along the x-axis is in a range between about 3 nm and about 5 nm. In some embodiments, a ratio of the enclosure distance D4 to the width Wb of the gate 130 is between about 0.5 and about 4.

In some embodiments, the conductive line 134, 136 has an enclosure distance D5 with respect to the corresponding conductive via of the semiconductor device 200A, such as the drain vias 162, 164, the MDLI via 158 and the tall drain via 166, to ensure reliable contact between the conductive via and the corresponding conductive line under process variations of manufacturing the semiconductor device 200A. In some embodiments, the enclosure distance D5 is between about 1 nm and about 3 nm. In some embodiments, a ratio of the enclosure distance D5 to the width Wc of the conductive line 134, 136 is between about 0.05 and about 0.2.

As discussed previously, the stray capacitance induced between the gate 130 and the conductive lines 116 and 126 is determined by the overlapping area between the gate 130 and the conductive lines 116 and 126. Through the shortening of the gate 130 in the gate direction, e.g., in the y-axis, while maintain the necessary enclosure distances, the stray capacitance can be reduced effectively. The electrical performance of the semiconductor device 200A is thus improved.

Referring to FIG. 2D, the active region 112 or 122 includes three exemplary nanosheets 196 stacked over one another. A pitch Hsp of the nanosheets 196 is measured between the centerlines of two adjacent nanosheets 196. In some embodiments, a height Hst of the total nanosheets 196 is in a range between Hsp and 4 times Hsp. In some embodiments, the gate via 152 or drain via 162 is arranged to electrically connect the conductive line 144 in the layer L4 to the gate 130 or the conductive line 126, respectively, in the layer L3. In some embodiments, a drain via 154 is arranged to electrically connect the power rail 142 in the layer L4 to the conductive line 126 in the layer L3, and a drain via 156 is arranged to electrically connect the power rail 132 in the layer L1 to the conductive line 116 in the layer L1.

In some embodiments, the gate via 152 or drain 162 has a via height H1 in a range between about one half the height Hsp and about three times the height Hsp. In some embodiments, the drain via 156 or 164 has a via height H2 in a range between about one half the height Hsp and about three times the height Hsp. In some embodiments, the MDLI via 158 has a via height H3 in a range between about 0.99 times the height Hsp and about 1.1 times the height Hsp. In some embodiments, the conductive line 116 has a height H5 in a range between about the height Hsp and about 1.2 times the height Hsp. In some embodiments, the conductive line 126 has a height H4 in a range between about the height H5 and about 1.2 times the height H5.

In some embodiments, the tall drain via 166a has a via height Ht substantially equal to the height sum of H2+H3+H5. In some embodiments, the tall drain via 166b has a via height Ht substantially equal to the height sum of H1+H3+H4.

The gate via 152, the drain via 162 or the drain via 164 has a width W1 or a width W2. The width W1 or W2 may be equal to the width Wc. In some embodiments, an aspect ratio H1/W1 or H2/W2 of the drain via 162 or 164 is between about 1 and about 3. The MDLI via 158 has width W3. In some embodiments, an aspect ratio H3/W3 of the MDLI via 158 is between about 1 and about 4. The drain via 154 or 156 has a width W4 or W6, respectively. The width W4 or W6 may be equal to the width Wa or Wc. In some embodiments, an aspect ratio H1/W4 or H2/W6 of the drain via 154 or 156 is between about 1 and about 4. The tall drain via 166 has a width W5. The width W5 may be equal to the width Wc. In some embodiments, an aspect ratio Ht/W5 of the tall drain via 166 is between about 5 and about 10.

Figure 3B:
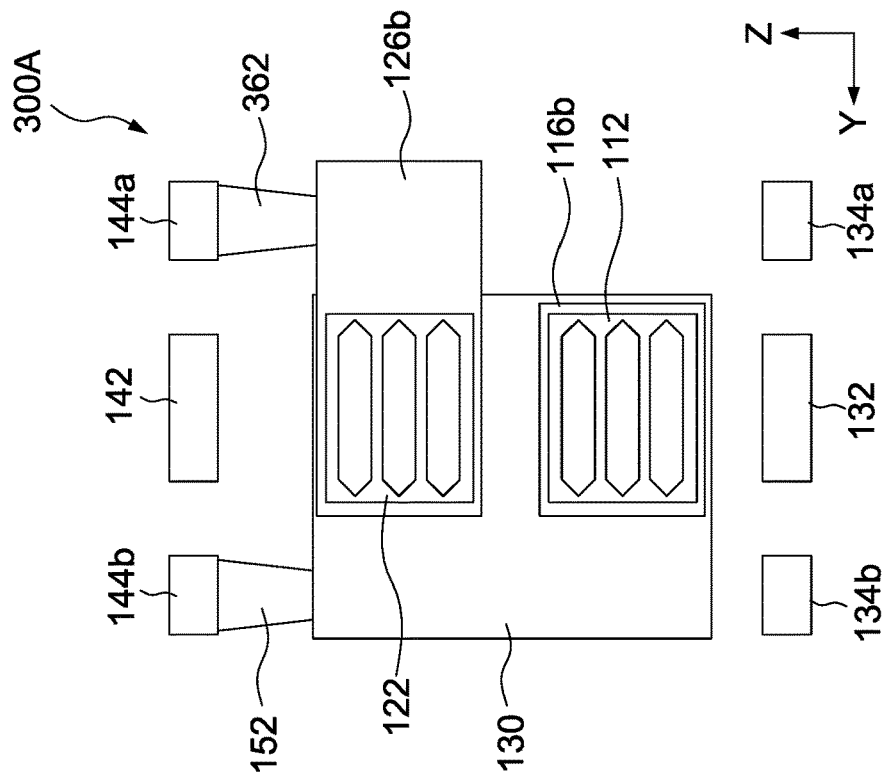
FIGS. 3A and 3B are a perspective view and a cross-sectional view of a semiconductor device, respectively, in accordance with some embodiments of the present disclosure.
Figure 3A:
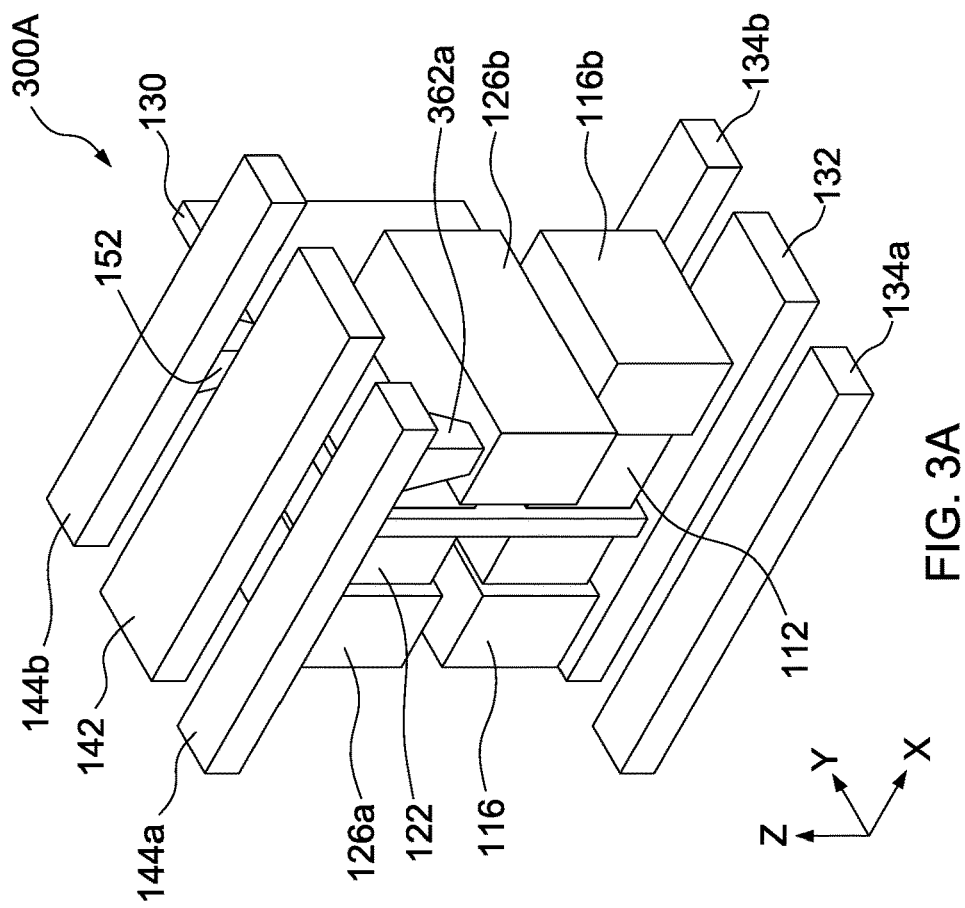

FIGS. 3A and 3B are a perspective view and a cross-sectional view, respectively, of a semiconductor device 300A, respectively, in accordance with some embodiments of the present disclosure. The semiconductor device 300A is similar to the semiconductor 200A in many aspects, and the descriptions of these aspects are omitted for brevity. The semiconductor device 300A illustrates a first type via connection, in which a drain via 362a electrically connects the conductive line 126b to the conductive line 144a.

Figure 3D:
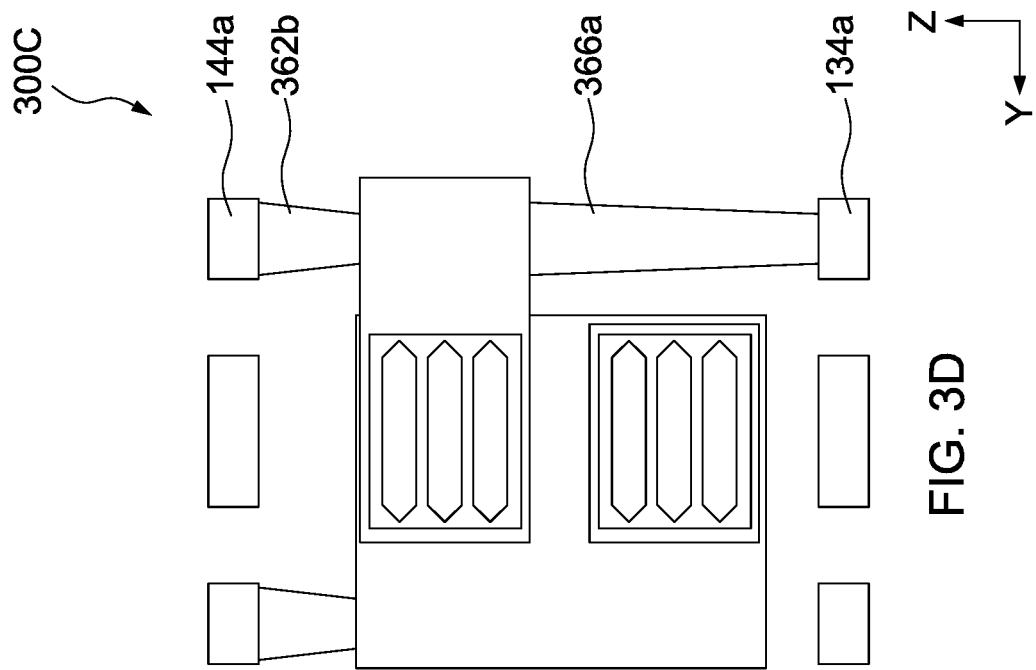
FIGS. 3C and 3D are a perspective view and a cross-sectional view of a semiconductor device, respectively, in accordance with some embodiments of the present disclosure.
Figure 3C:
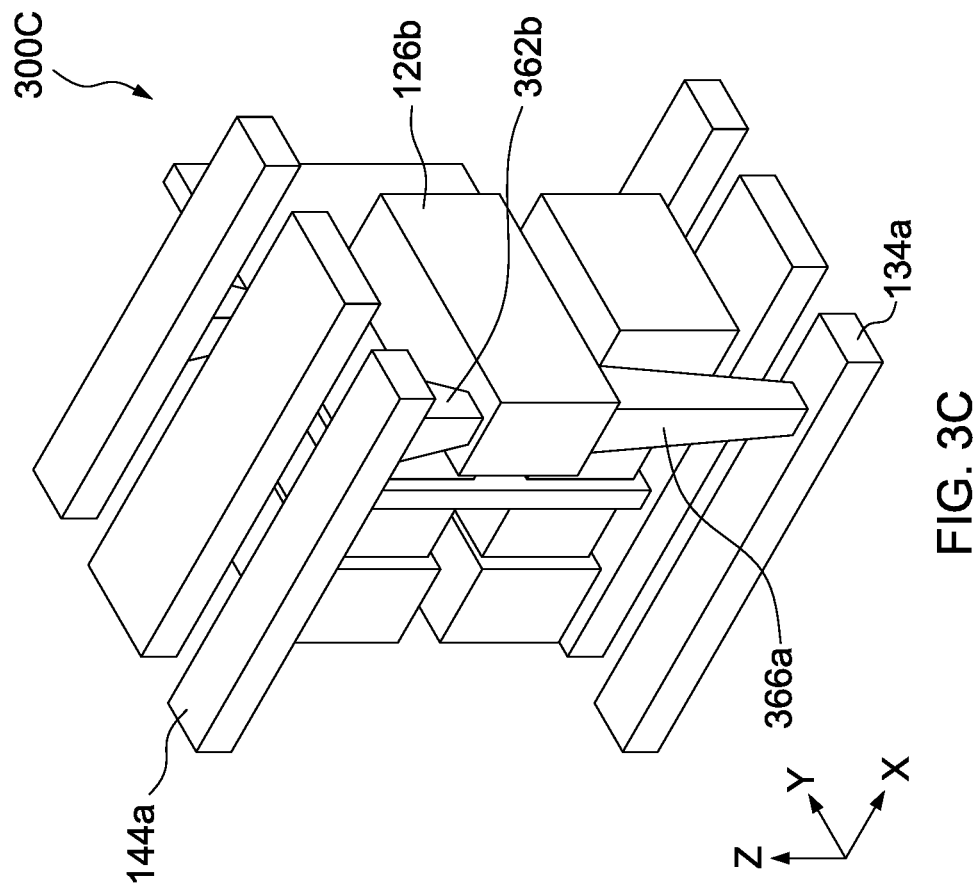

FIGS. 3C and 3D are a perspective view and a cross-sectional view, respectively, of a semiconductor device 300C, respectively, in accordance with some embodiments of the present disclosure. The semiconductor device 300C is similar to the semiconductor 200A in many aspects, and the descriptions of these aspects are omitted for brevity. The semiconductor device 300C illustrates a second type via connection, in which the conductive line 126b is electrically connected to the conductive line 144a through a drain via 362b and electrically connected to the conductive line 134a through a tall drain via 366a. The conductive lines 134a and 144a are electrically connected accordingly.

Figure 3F:
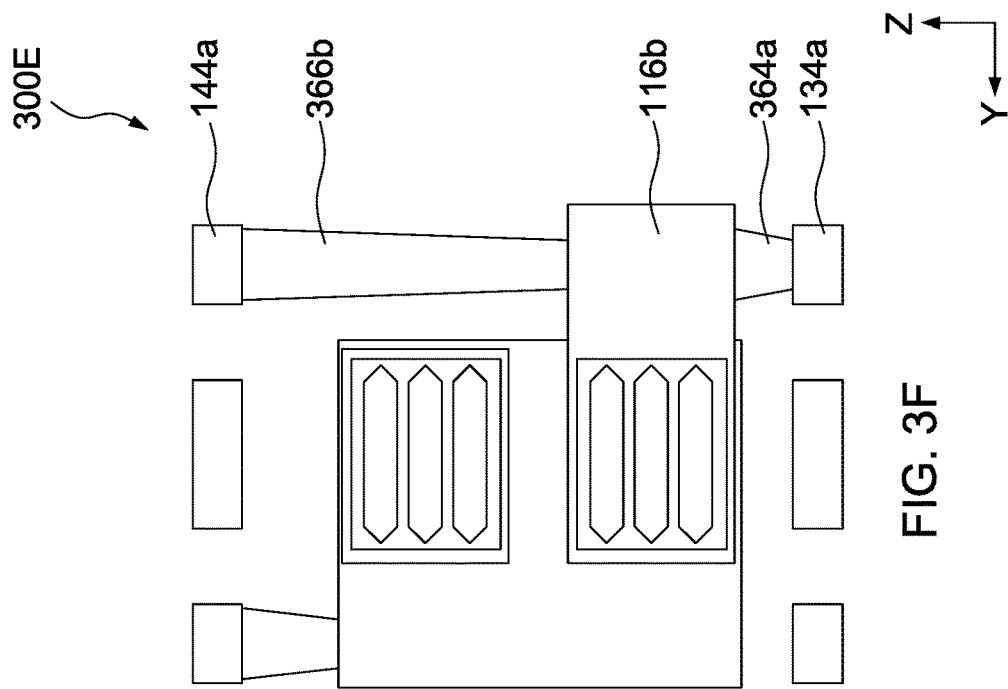
FIGS. 3E and 3F are a perspective view and a cross-sectional view of a semiconductor device, respectively, in accordance with some embodiments of the present disclosure.
Figure 3E:
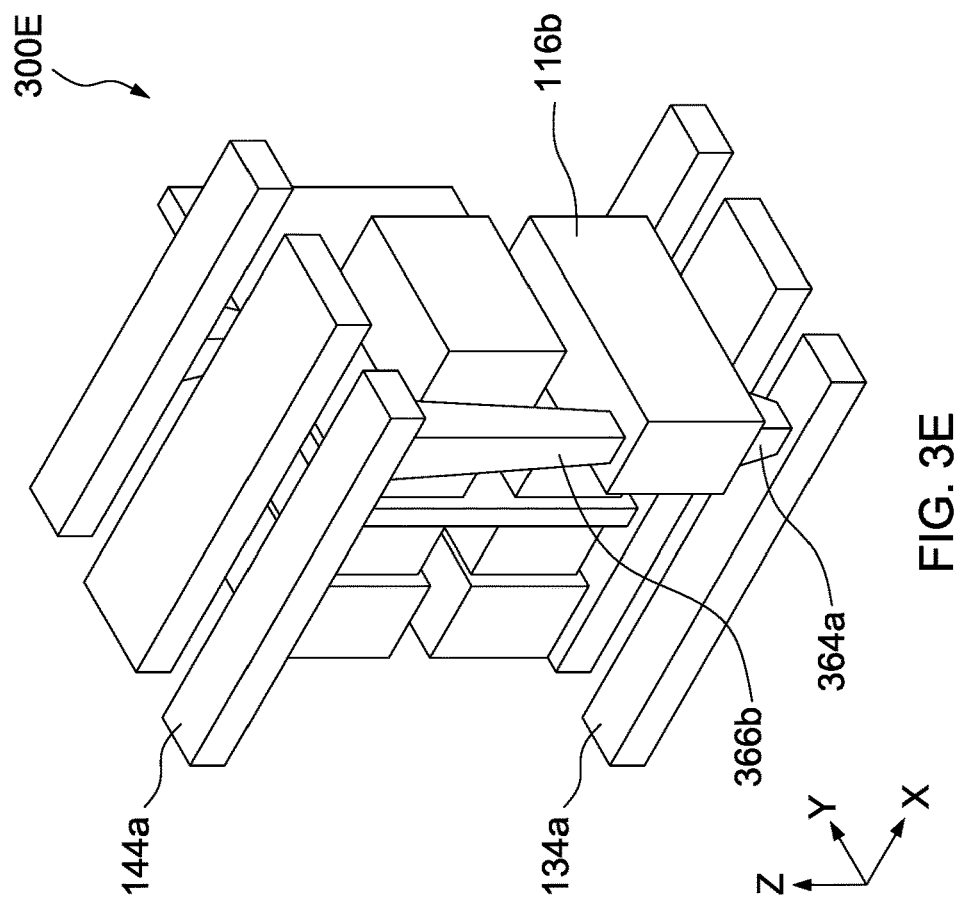

FIGS. 3E and 3F are a perspective view and a cross-sectional view, respectively, of a semiconductor device 300E, respectively, in accordance with some embodiments of the present disclosure. The semiconductor device 300E is similar to the semiconductor 200A in many aspects, and the descriptions of these aspects are omitted for brevity. The semiconductor device 300E illustrates a third type via connection, in which the conductive line 116b is electrically connected to the conductive line 144a through a tall drain via 366b and electrically connected to the conductive line 134a through a drain via 364a. The conductive lines 134a and 144a are electrically connected accordingly.

FIG. 4A is a perspective view of a semiconductor device 400A, in accordance with some embodiments of the present disclosure. The semiconductor device 400A is similar to the semiconductor 200A in many aspects, and the descriptions of these aspects are omitted for brevity. The semiconductor device 400A illustrates a first type pick-up connection, in which the conductive line 144a serves as a pick-up pin (input pin or output pin) of the source/drain region 124. A pick-up path electrically connecting the source/drain region 124 to the conductive line 144a is established through the conductive line 126b, a tall drain via 466a, the conductive line 134a, a drain via 464a, the conductive line 116a and a tall drain via 466b.

Figure 4B:
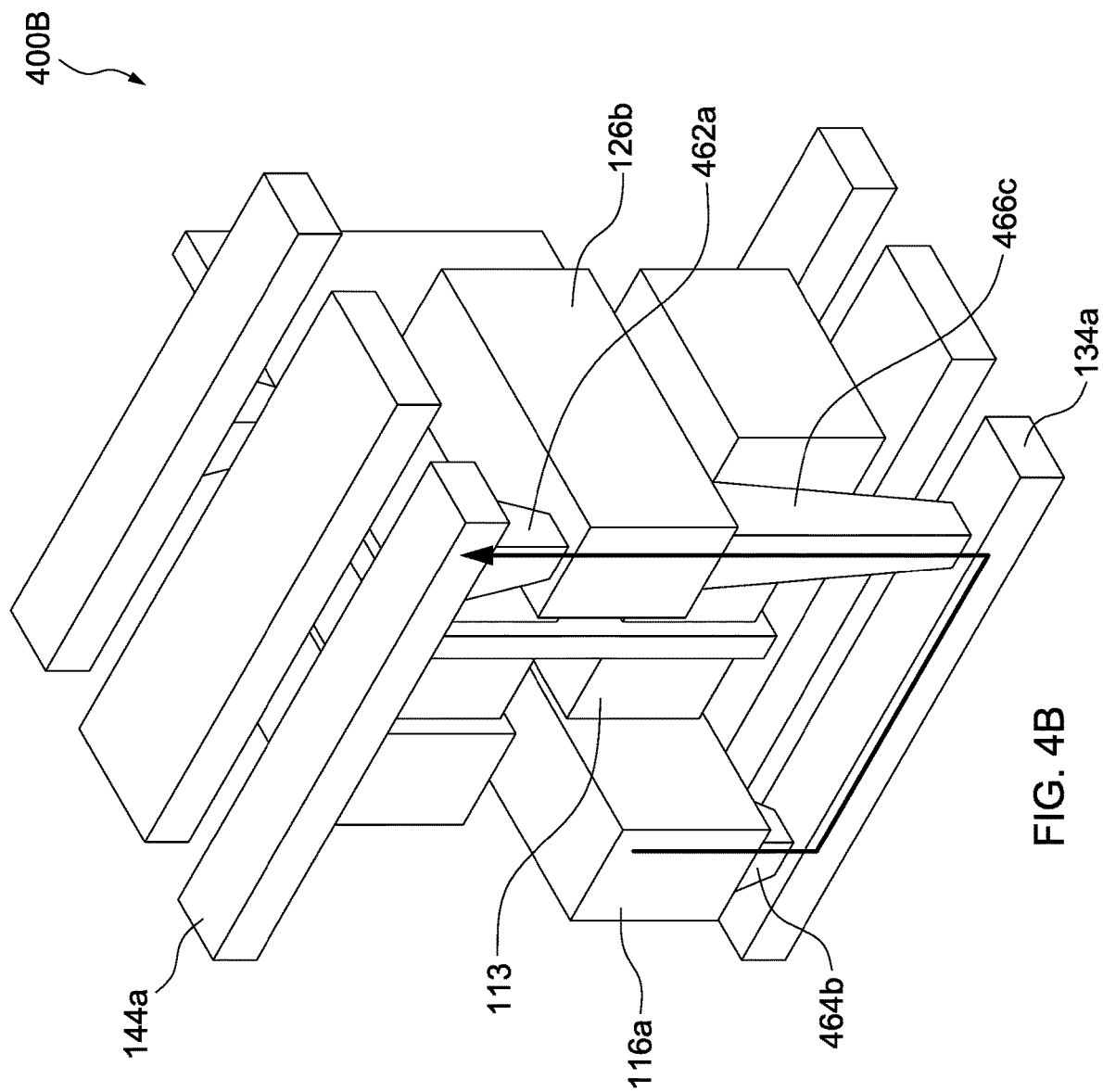

FIG. 4B is a perspective view of a semiconductor device 400B, in accordance with some embodiments of the present disclosure. The semiconductor device 400B is similar to the semiconductor 200A in many aspects, and the descriptions of these aspects are omitted for brevity. The semiconductor device 400B illustrates a second type pick-up connection, in which the conductive line 144a serves as a pick-up pin of the source/drain region 113. A pick-up path electrically connecting the source/drain region 113 to the conductive line 144a is established through the conductive line 116a, a drain via 464b, the conductive line 134a, a tall drain via 466c, the conductive line 126b and a drain via 462a.

Figure 4C:
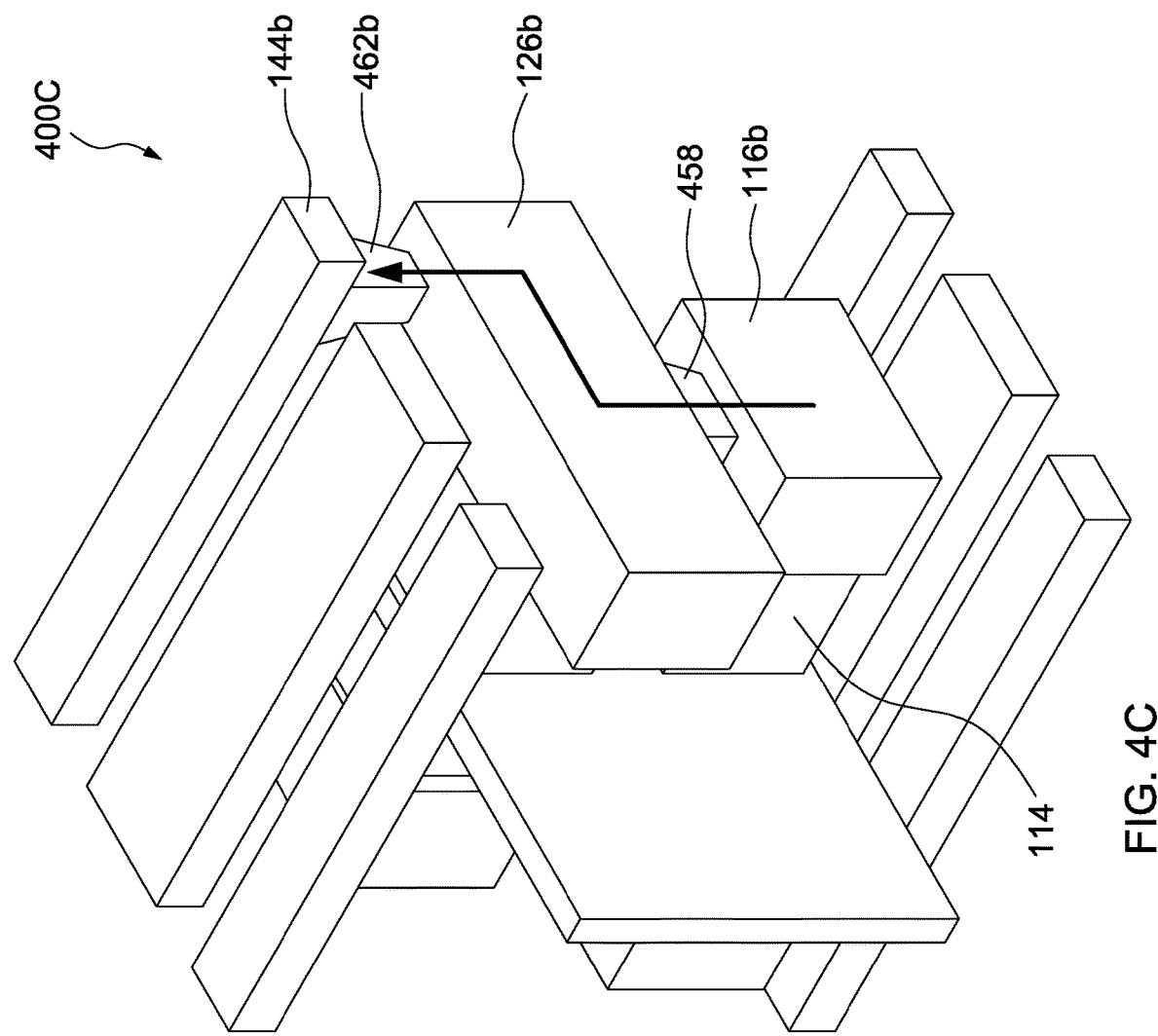

FIG. 4C is a perspective view of a semiconductor device 400C, in accordance with some embodiments of the present disclosure. The semiconductor device 400C is similar to the semiconductor 200A in many aspects, and the descriptions of these aspects are omitted for brevity. The semiconductor device 400C illustrates a third type pick-up connection, in which the conductive line 144b serves as a pick-up pin of the source/drain region 114. A pick-up path electrically connecting the source/drain region 114 to the conductive line 144b is established through the conductive line 116b, an MDLI via 458, the conductive line 126b and a drain via 462b.

Figure 5B:
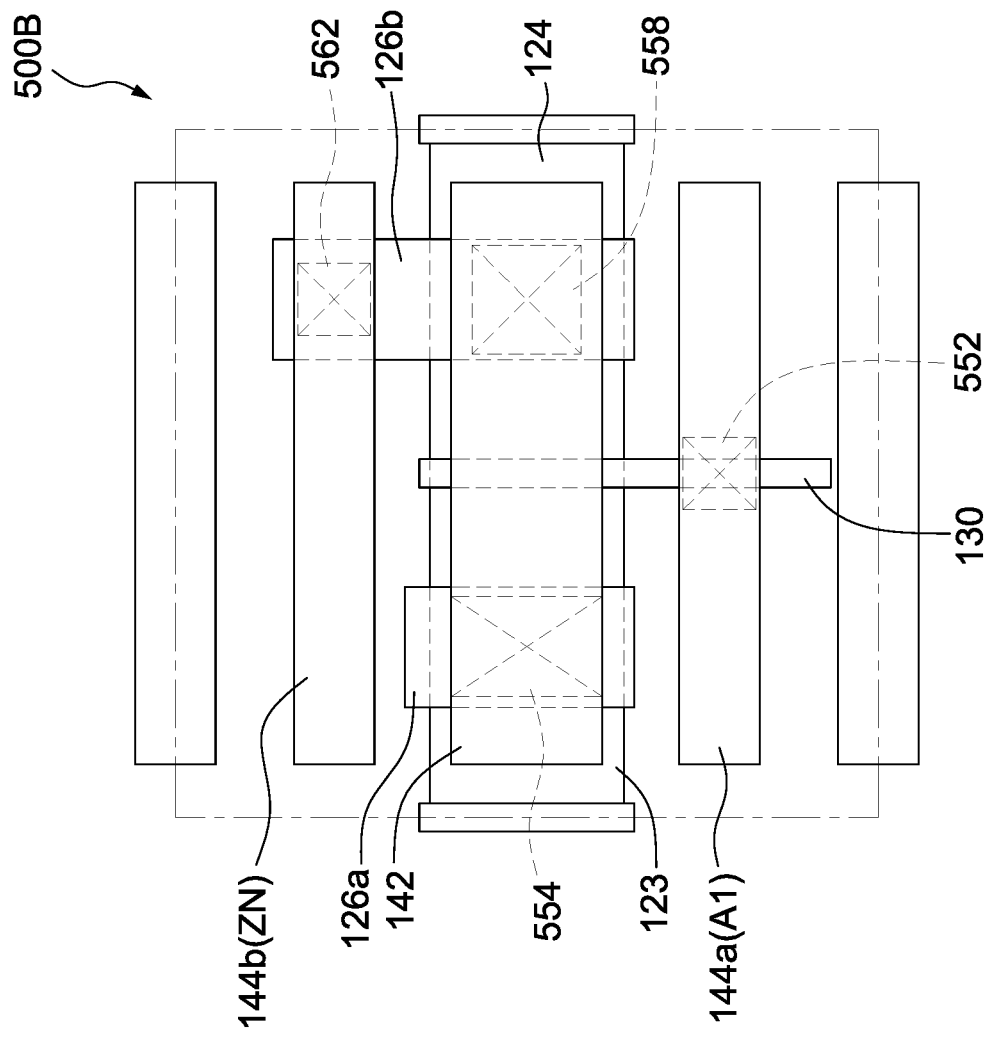
Figure 5A:
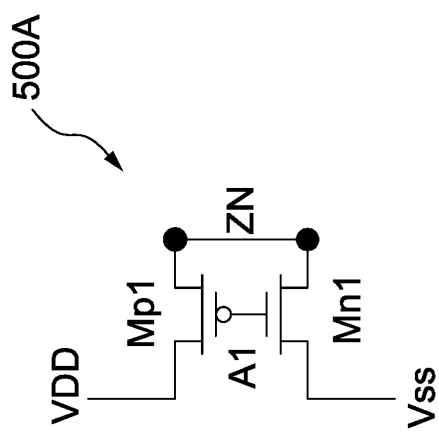
FIG. 5A is a circuit diagram of a semiconductor device, in accordance with some embodiments of the present disclosure.

FIG. 5A is a circuit diagram of a semiconductor device 500A, in accordance with some embodiments of the present disclosure. The semiconductor device 500A is an inverter device in the present embodiment. The semiconductor device 500A includes a P-type FET device Mp1 and an N-type FET device Mn1, in which the gate terminals of the FET devices Mp1 and Mn1 are coupled together at an input node A1, and the drain terminals of the FET devices Mp1 and Mn1 are coupled together at an output node ZN. During operation, the semiconductor device 100 is biased to a first voltage VDD at a source terminal of the P-type FET device Mp1 and biased to a second voltage VSS at a source terminal of the N-type FET device Mn1.

FIGS. 5B and 5C are plan views 500B and 500C of the semiconductor device 500A, in accordance with some embodiments of the present disclosure. In some embodiments, the semiconductor device 500A is implemented as a cell, and the plan views 500B and 500C are referred to as the layouts of the cell 500A. The features of the semiconductor device 500A in different layers are shown separately in FIGS. 5B and 5C for clarity. For example, the features in the layers L3 and L4 along with an MDLI via 558 between the layers L2 and L3 are illustrated in FIG. 5B while those features in the layers L1 and L2 along with the MDLI via 558 are illustrated in FIG. 5C.

FIG. 5D is a cross-sectional view of a semiconductor device 500A, in accordance with some embodiments of the present disclosure. It should be noted that the cross-sectional view shown in FIG. 5D and the subsequent cross-sectional views herein are drawn only to illustrate the relationships of vertical connections between the features in different layers from a side in a collective manner. These figures may not be drawn along a specific section line in FIG. 5A, 5B or 5C.

Referring to FIGS. 5B and 5D, the conductive line 144*a* serves as an input pin and is electrically connected to the gate 130 through a gate via 552. The conductive line 144*b* serves as an output pin and is electrically connected to the source/drain region 124) through a drain via 562 and the conductive line 126*b*. The power rail 142 is electrically connected to the source/drain region 123) through a drain via 554 and the conductive line 126*a*. Referring to FIGS. 5C and 5D, the power rail 132 is electrically connected to the source/drain region 113 through a drain via 556 and the conductive line 116*a*. Referring to FIGS. 5B, 5C and SD, the source/drain regions 114 and 124 are electrically connected through the conductive line 116*b*, the MDLI via 558 and the conductive line and 126*b*.

Referring to FIGS. 5B and 5D, the gate 130 only partially overlaps the conductive line 126*b* from a top-view perspective and the overlapping area between the gate 130 and the conductive line 126*b* at the conductive line 144*b* is mitigated or minimized. As discussed previously, the reduced overlapping area between the gate 130 and the conductive line 126*b* aids in decreasing stray capacitance and improving the electrical performance of the semiconductor device 500A.

Figure 6A:
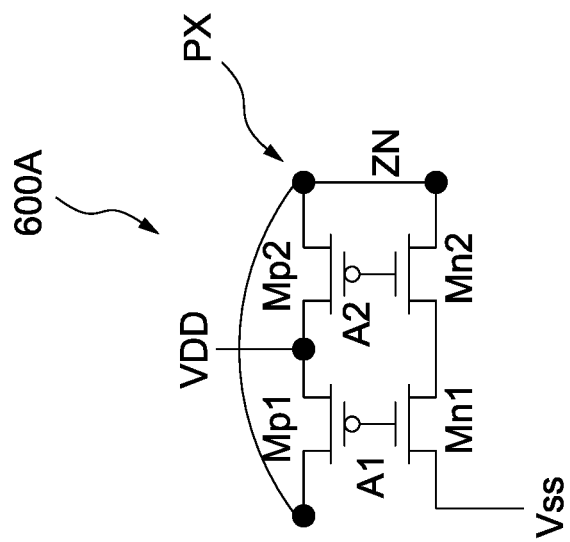
FIG. 6A is a circuit diagram of a semiconductor device, in accordance with some embodiments of the present disclosure.

FIG. 6A is a circuit diagram of a semiconductor device 600A, in accordance with some embodiments of the present disclosure. The semiconductor device 600A is a two-input NAND device in the present embodiment. The semiconductor device 600A includes two interconnected P-type FET device Mp1 and Mp2 and two interconnected N-type FET devices Mn1 and Mn2, in which an input node A1 is coupled to gate terminals of the FET devices Mp1 and Mn1, an input node A2 is coupled to gate terminals of the FET devices Mp2 and Mn2, and drain terminals of the P-type FET devices Mp1 and Mp2 are electrically connected to the drain terminal of the N-type FET device Mn2 at an output node ZN. During operation, the semiconductor device 600A is biased to the first voltage VDD at source terminals of the respective P-type FET devices Mp1 and Mp2, and biased to the second voltage VSS at the source terminal of the N-type FET device Mn1.

Figure 6B:
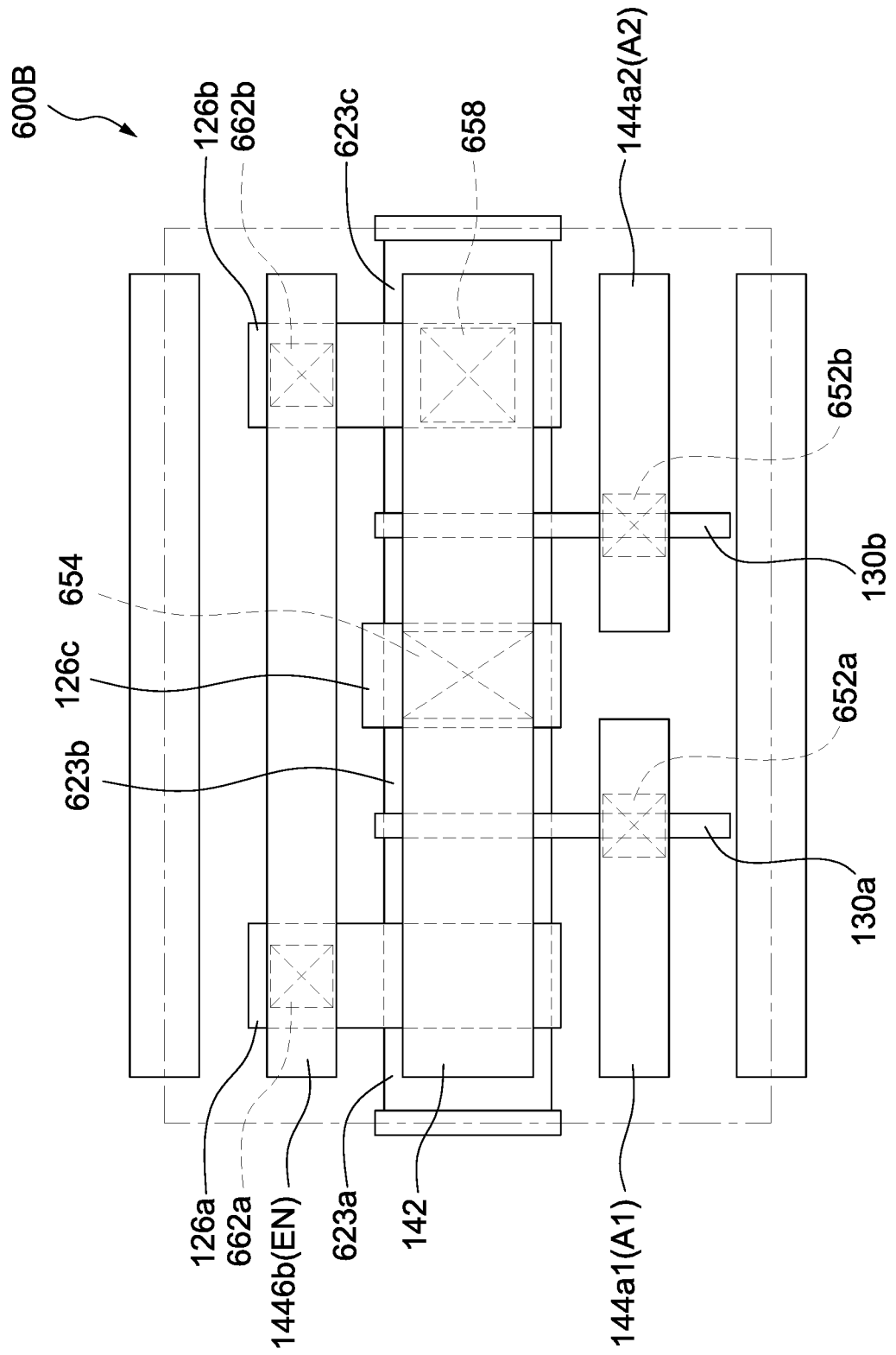
FIGS. 6B and 6C are plan views of the semiconductor device shown in FIG. 6A, in accordance with some embodiments of the present disclosure.
Figure 6C:
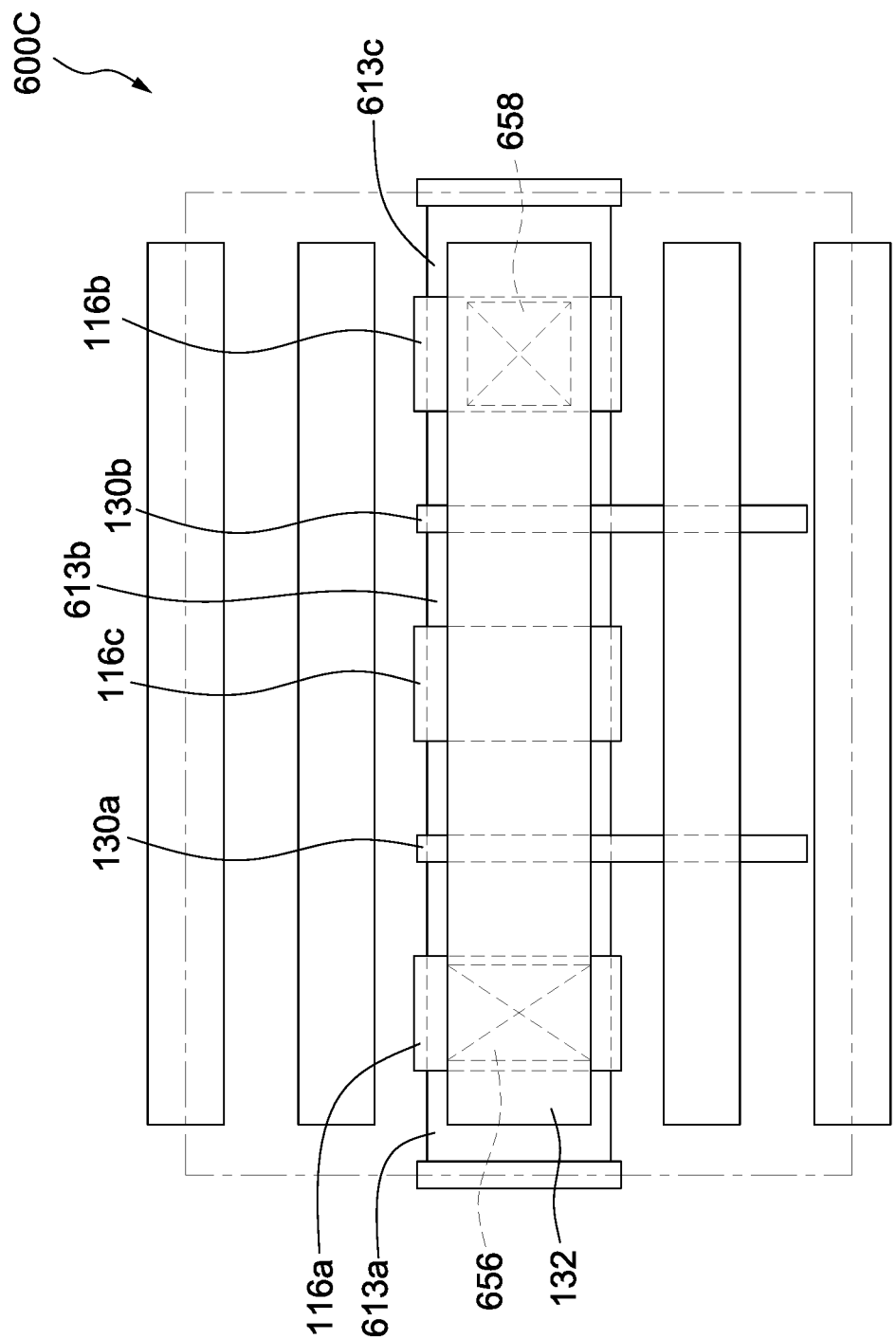
Figure 6D:
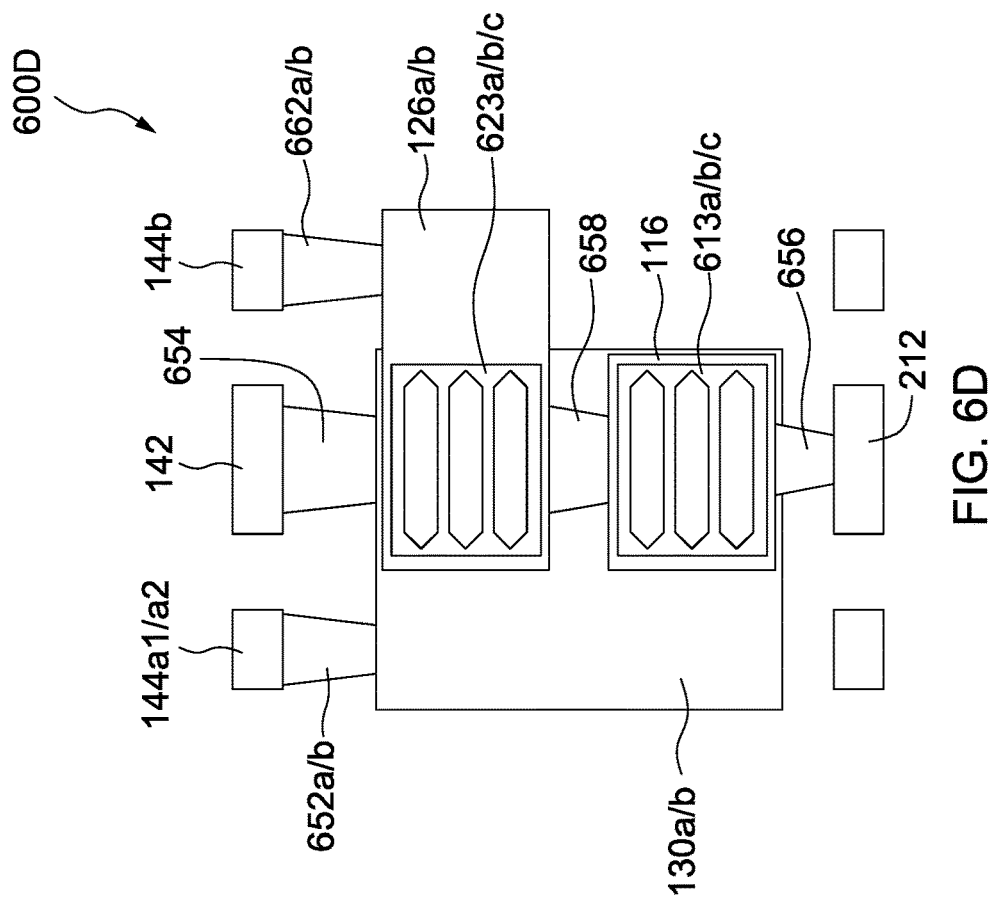
FIG. 6D is a cross-sectional view of a semiconductor device shown in FIG. 6A, in accordance with some embodiments of the present disclosure.

FIGS. 6B and 6C are plan views 600B and 600C of the semiconductor device 600A, in accordance with some embodiments of the present disclosure. In some embodiments, the semiconductor device 600A is implemented as a cell, and the plan views 600B and 600C are referred to as the layouts of the cell 600A. FIG. 6D is a cross-sectional view of a semiconductor device 600A, in accordance with some embodiments of the present disclosure.

Referring to FIGS. 6A, 6B and 6C, gates 130*a* and 130*b* define source/drain regions 623*a*, 623*b* and 623*c* of the P-type FET devices Mp1 and Mp2 in the active region 122 and source/drain regions 613*a*, 613*b* and 613*c* of the N-type FET devices Mn1 and Mn2 in the active region 112. The conductive line 144*a* is partitioned into separated conductive lines 144*a*1 and 144*a*2, which serve as input pins (nodes) A1, A2 and are electrically connected to the gates 130*a* and 130*b* through gate vias 652*a* and 652*b*, respectively. The conductive line 144*b* serves as an output pin (node) ZN and is electrically connected to the source/drain regions 623*a* and 623*c* through the respective drain vias 662*a*, 662*b* and the respective conductive lines 126*a*, 126*b*.

Referring to FIGS. 6A and 6B, the power rail 142 is electrically connected to the common source/drain region 623*b* of the P-type FET devices Mp1 and Mp2 through a drain via 654 and a conductive line 126*c*. Referring to FIGS. 6A, 6C and 6D, the power rail 132 is electrically connected to the source/drain region 613*a* of the N-type FET device Mn1 through a drain via 656 and the conductive line 116*a*. The connection path PX shown in FIG. 6A is implemented by an equivalent conduction path formed between the source/drain regions 613*c* and 623*c* through the conductive line 116*b*, the MDLI via 658 and the conductive line and 126*b*.

Figure 7A:
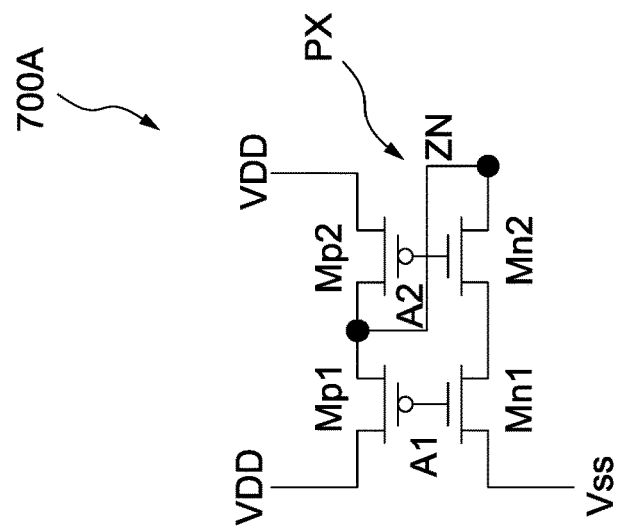
FIG. 7A is a circuit diagram of a semiconductor device, in accordance with some embodiments of the present disclosure.

FIG. 7A is a circuit diagram of a semiconductor device 700A, in accordance with some embodiments of the present disclosure. The semiconductor device 700A is a two-input NAND device and is similar to the semiconductor device 600A. The semiconductor device 700A is different from semiconductor device 600A in that the first voltage VDD is supplied to outer source/drain terminals of the respective P-type FET devices Mp1 and Mp2, and a source region of the N-type FET Mn2 is electrically connected to a common source/drain terminal of the P-type FET devices Mp1 and Mp2 at an output node ZN.

Figure 7B:
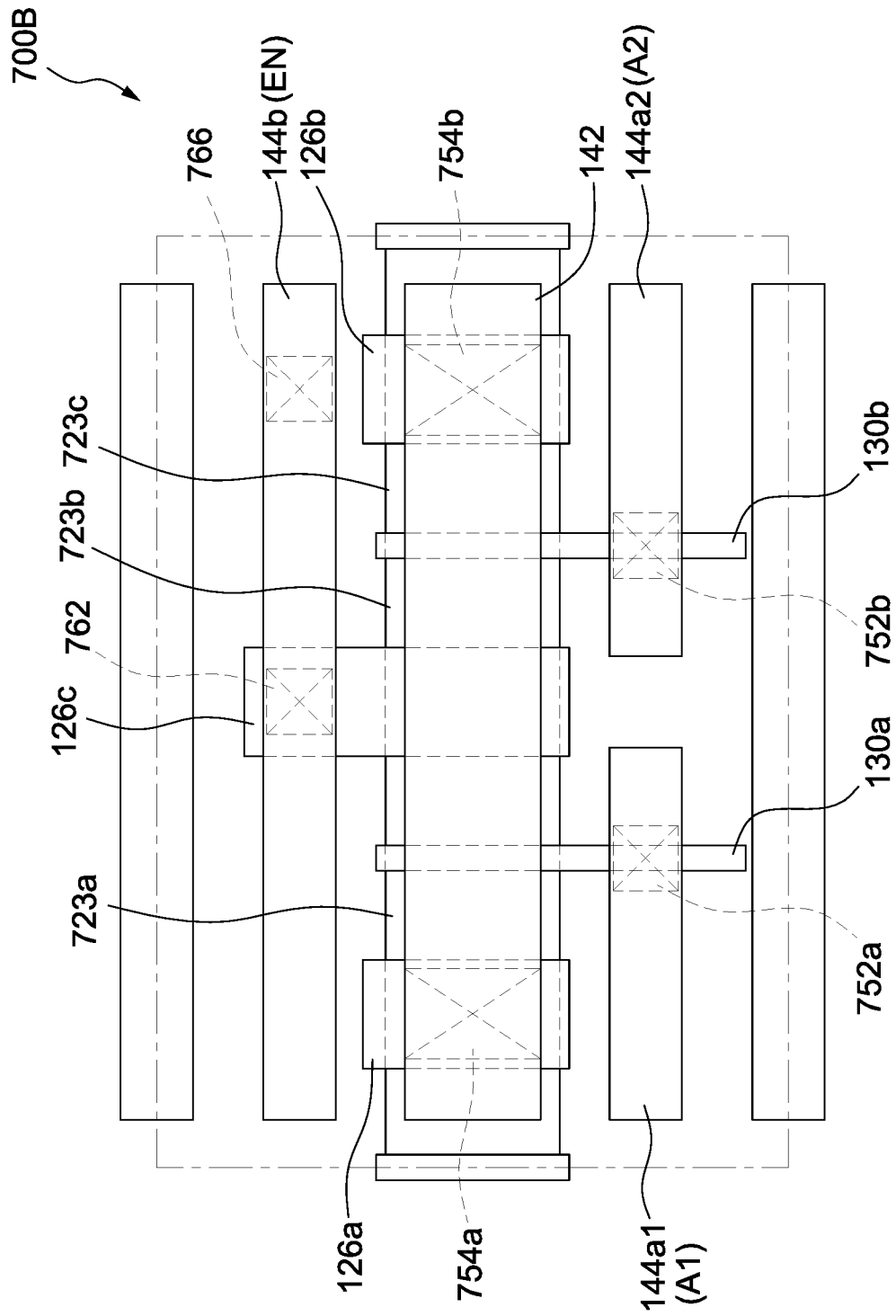
FIGS. 7B and 7C are plan views of the semiconductor device shown in FIG. 7A, in accordance with some embodiments of the present disclosure.
Figure 7C:
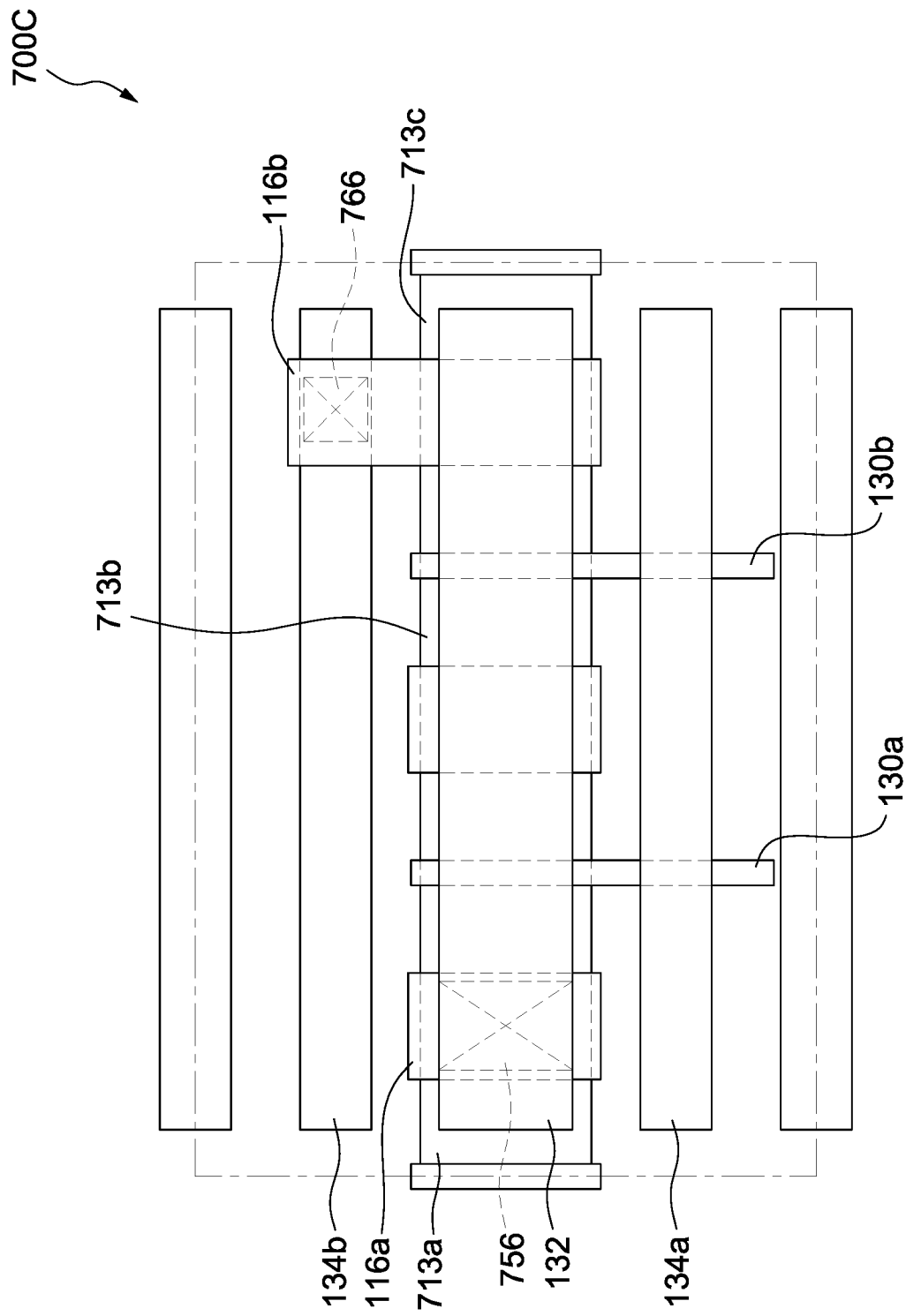
Figure 7E:
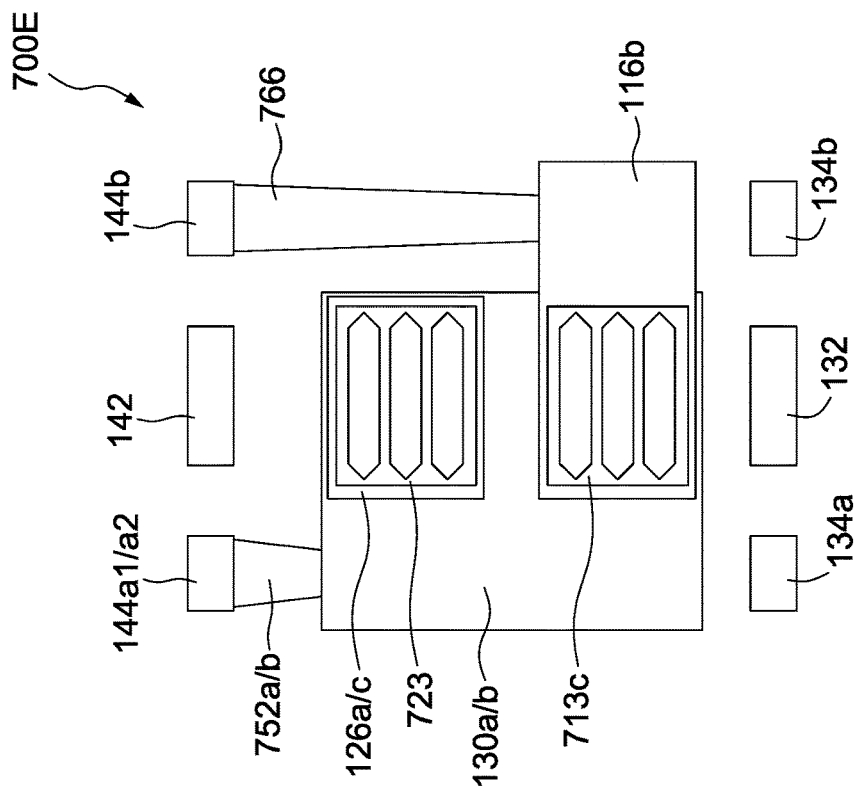
FIGS. 7D and 7E are cross-sectional views of the semiconductor device shown in FIG. 7A, in accordance with some embodiments of the present disclosure.
Figure 7D:
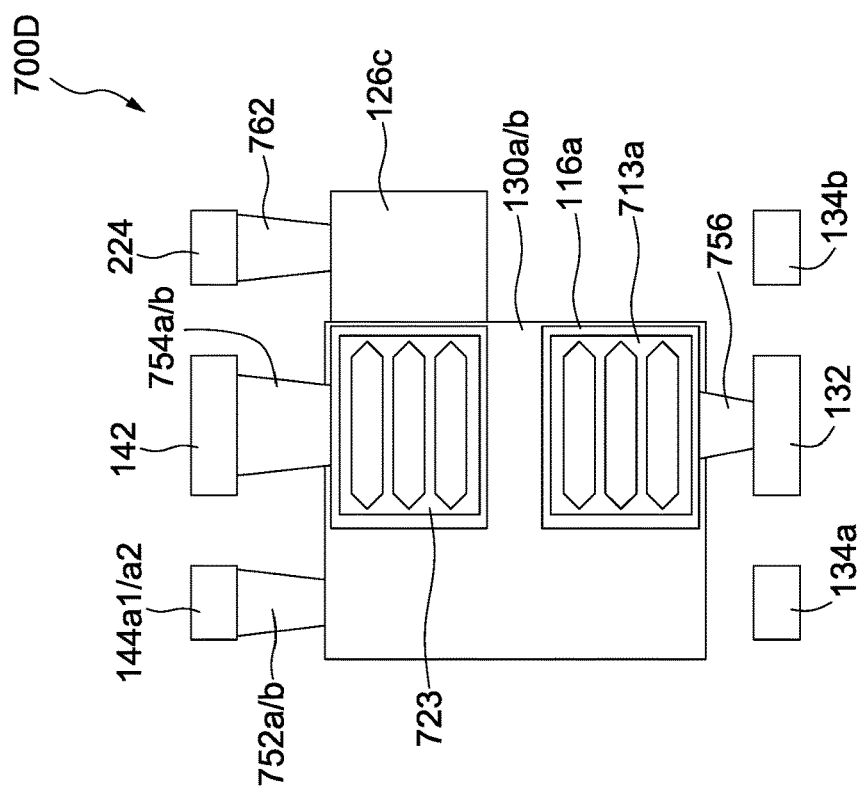

FIGS. 7B and 7C are plan views 700B and 700C of the semiconductor device 700A, in accordance with some embodiments of the present disclosure. In some embodiments, the semiconductor device 700A is implemented as a cell, and the plan views 700B and 700C are referred to as the layouts of the cell 700A. FIGS. 7D and 7E are cross-sectional views of a semiconductor device 700A, in accordance with some embodiments of the present disclosure.

Referring to FIGS. 7A-7E, the conductive lines 144*a*1 and 144*a*2 serve as input pins A1, A2 and are electrically connected to the gates 130*a* and 130*b* through gate vias 752*a* and 752*b*, respectively. The conductive line 144*b* serves as an output pin ZN and is electrically connected to the common source/drain region 723*b* of the P-type FET devices Mp1 and Mp2 through a drain via 762 and the conductive line 126*c*.

The power rail 142 is electrically connected to the source/drain regions 723*a*, 723*c* of the P-type FET devices Mp1 and Mp2 through respective drain vias 754*a*, 754*b* and respective conductive lines 126*a*, 126*b*. The power rail 132 is electrically connected to the source region 713*a* of the N-type FET device Mn1 through a drain via 756 and the conductive line 116*a*. The connection path PX of FIG. 7A is implemented by a conduction path formed between the source/drain region 723*b* and the source/drain region 713*c* through the conductive line 126*b*, the drain via 762, the conductive line 144*b*, the tall drain via 766 and the conductive line 116*b*.

Figure 8A:
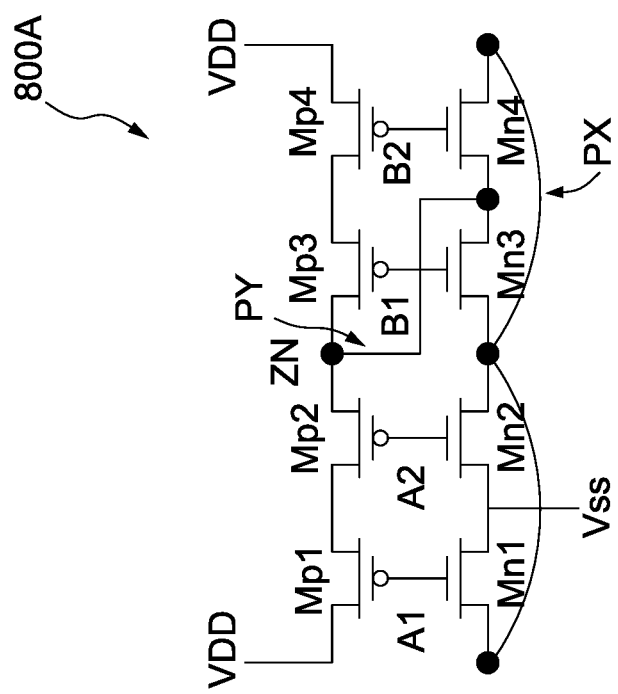
FIG. 8A is a circuit diagram of a semiconductor device, in accordance with some embodiments of the present disclosure.

FIG. 8A is a circuit diagram of a semiconductor device 800A, in accordance with some embodiments of the present disclosure. The semiconductor device 800A is a four-input Or-And-Invert (OAI) device in the present embodiment. The semiconductor device 800A includes four interconnected P-type FET device Mp1 through Mp4 and four interconnected N-type FET device Mn1 through Mn4, in which four input nodes A1, A2, B1 and B2 are coupled to gate terminals of the FET devices Mpx and Mnx (x=1-4), and the common source/drain terminal of the P-type FET device Mp2 and Mp3 is electrically connected to the common source/drain terminal of the N-type FET device Mn3 and Mn4 at an output node ZN. The common source/drain terminal of the N-type FET devices Mn2 and Mn3 is electrically connected to outer source/drain terminals of the N-type FET devices Mn1 and Mn4. During operation, the semiconductor device 800A is biased to the first voltage VDD at outer source/drain terminals of the P-type FET devices Mp1 and Mp4, and biased to the second voltage VSS at a common source/drain terminal of the N-type FET devices Mn1 and Mn2.

Figure 8B:
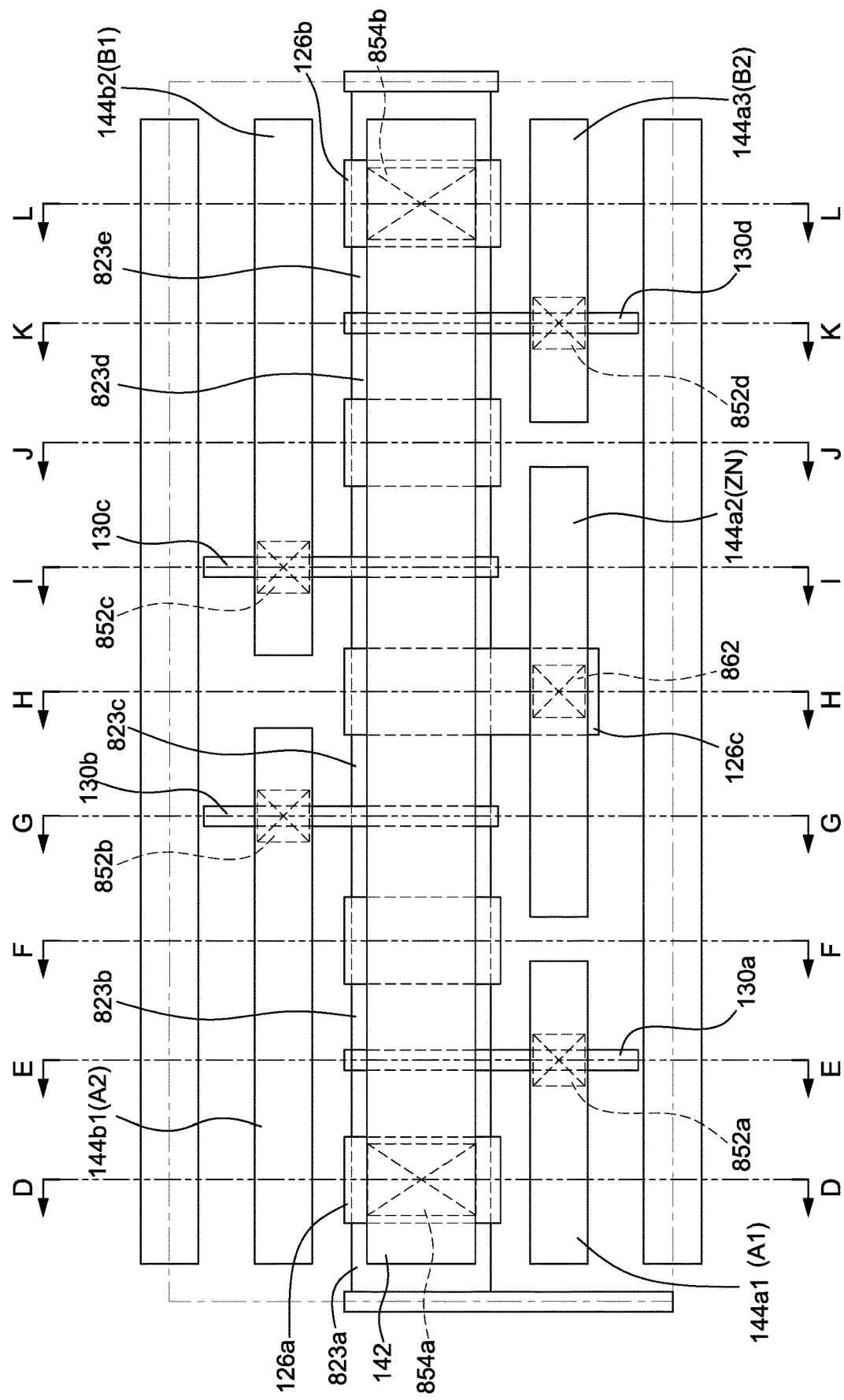
FIGS. 8B and 8C are plan views of the semiconductor device shown in FIG. 8A, in accordance with some embodiments of the present disclosure.
Figure 8C:
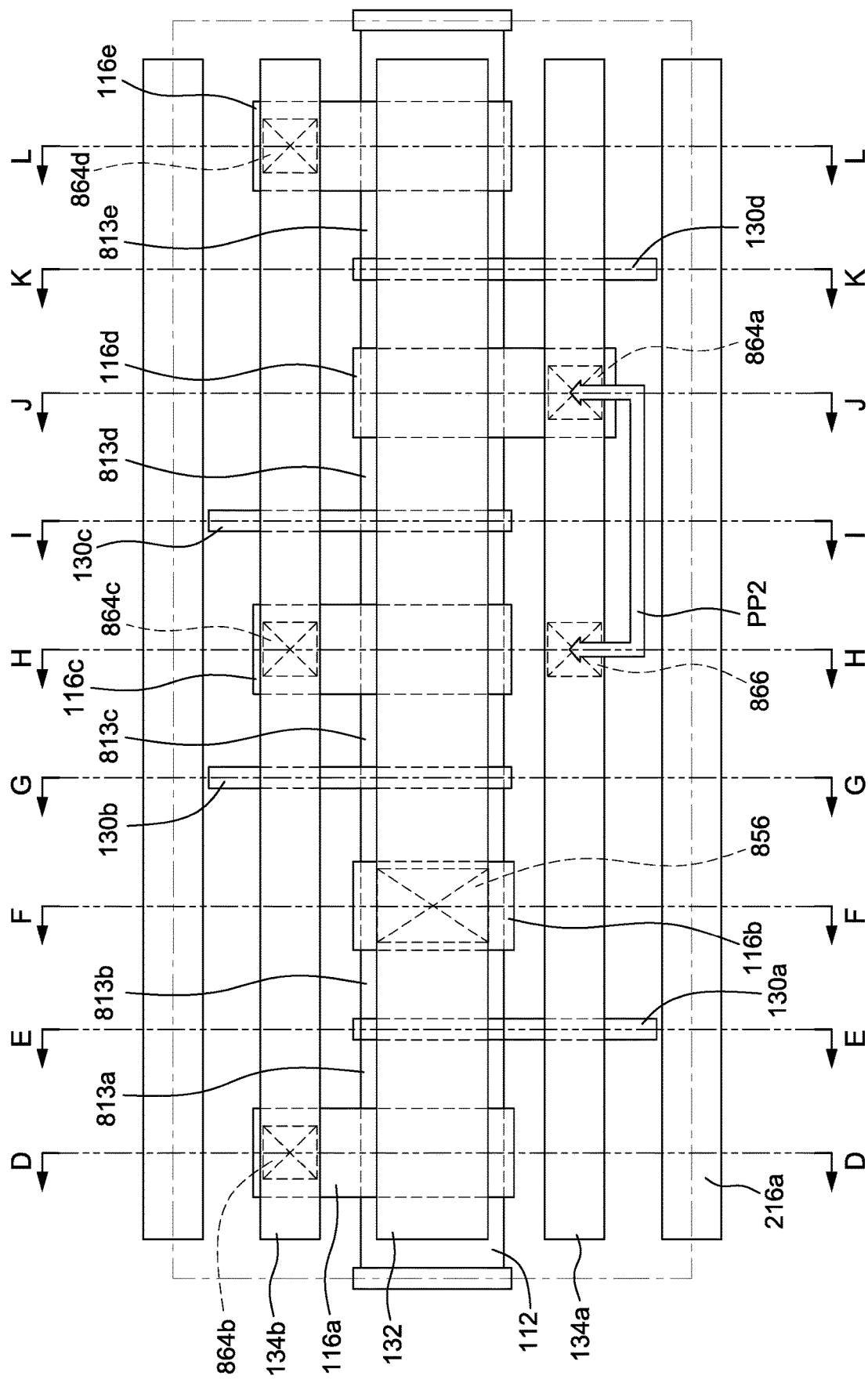
Figure 8E:
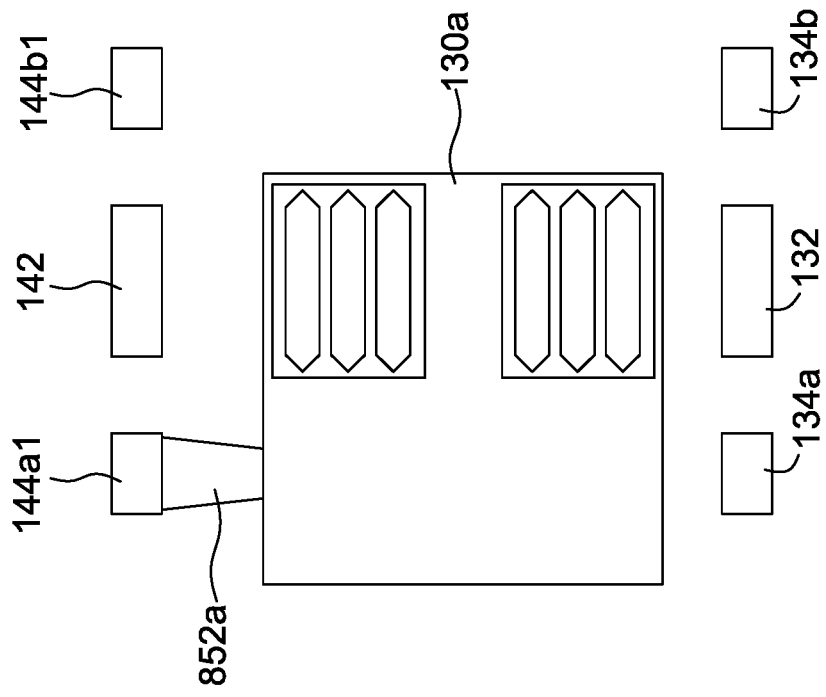

FIGS. 8B and 8C are plan views 800C and 800D of the semiconductor device 800A, in accordance with some embodiments of the present disclosure. In some embodiments, the semiconductor device 800A is implemented as a cell, and the plan views of FIGS. 800B and 800C are referred to as the layouts of the cell 800A. FIGS. 8D to 8L are cross-sectional views of the semiconductor device 800A along respective sectional lines DD, EE, FF, GG, HH, II, JJ, KK and LL in FIGS. 8B and 8C, in accordance with some embodiments of the present disclosure.

Referring to FIGS. 8A to 8C, the conductive line 144a is partitioned into conductive lines 144a1, 144a2 and 144a3, in which the conductive lines 144a1 and 144a2 serve as input pins (nodes) A1, B2 and are electrically connected to the gates 130a and 130d through gate vias 852a (see FIG. 8E) and 852d(see FIG. 8K), respectively. Also referring to FIGS. 8A to 8C, the conductive line 144b is partitioned into conductive lines 144b1 and 144b2, which serve as input pins (nodes) A2, B1 and are electrically connected to the gates 130b and 130c through gate vias 852b (see FIG. 8G) and 852c(see FIG. 8I), respectively. Further, the conductive line 144a2 serves as the output pin (node) ZN in FIG. 8A and is electrically connected to the common source/drain region 823c of the P-type FET devices Mp2 and Mp3 through a drain via 862 and the conductive line 126c (see FIG. 8H).

Figure 8D:
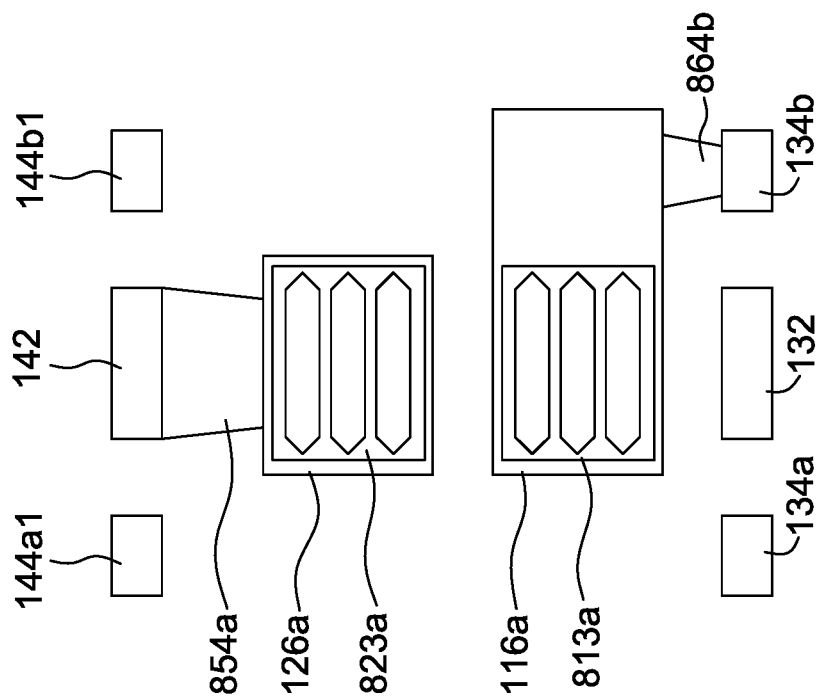
Figure 8I:
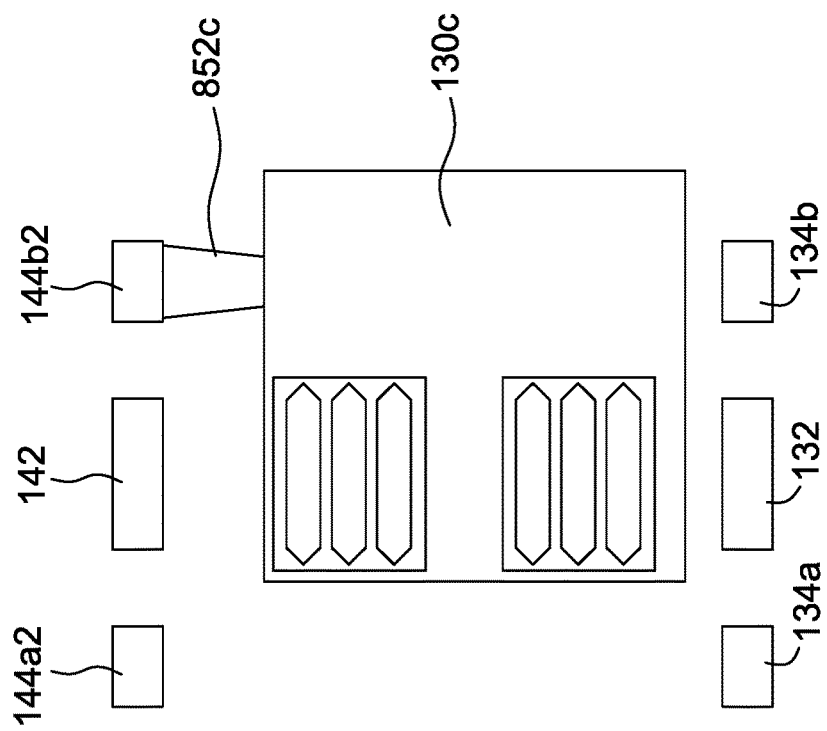
Figure 8H:
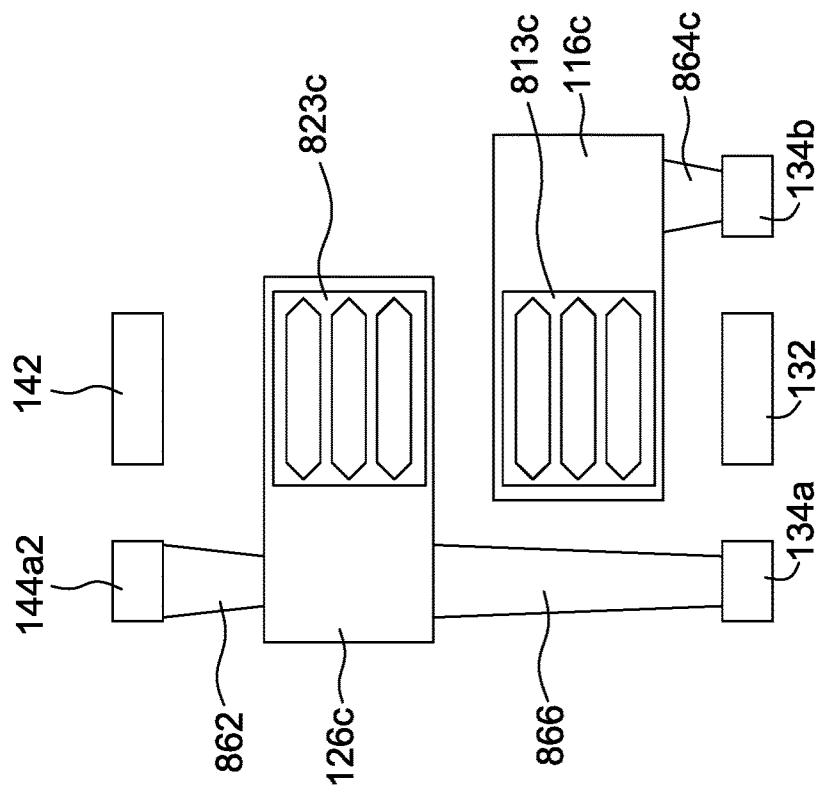
Figure 8K:
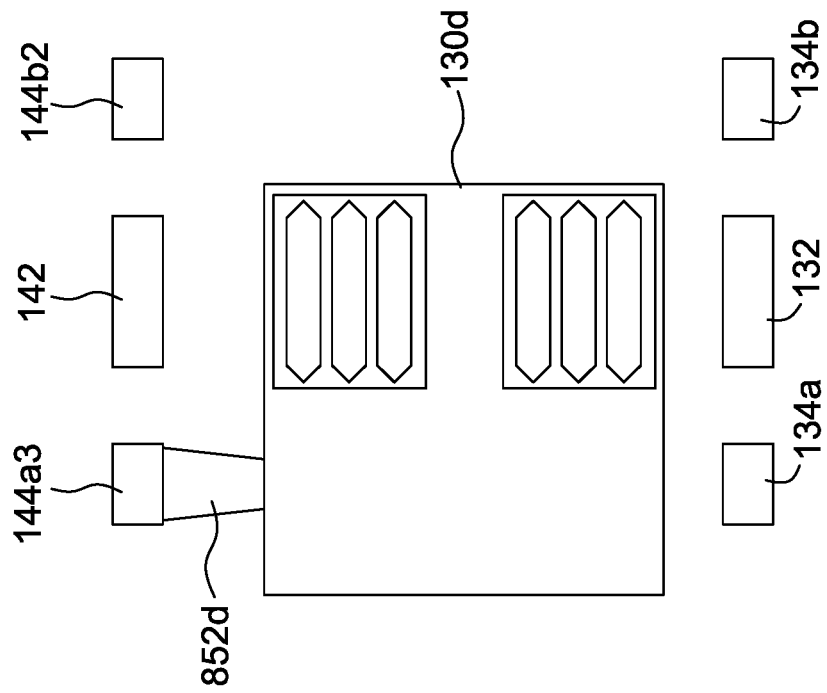
Figure 8J:
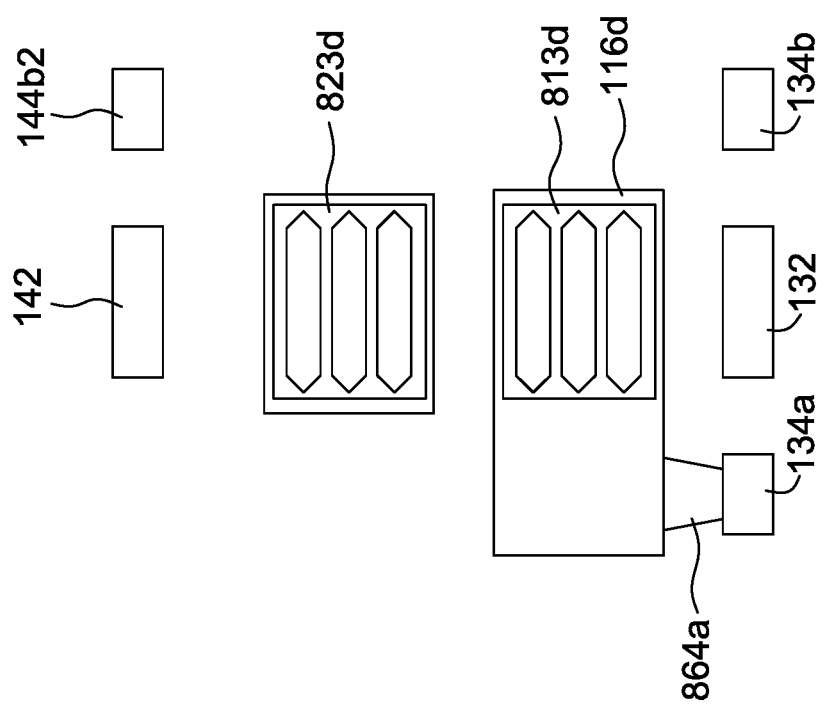
Figure 8L:
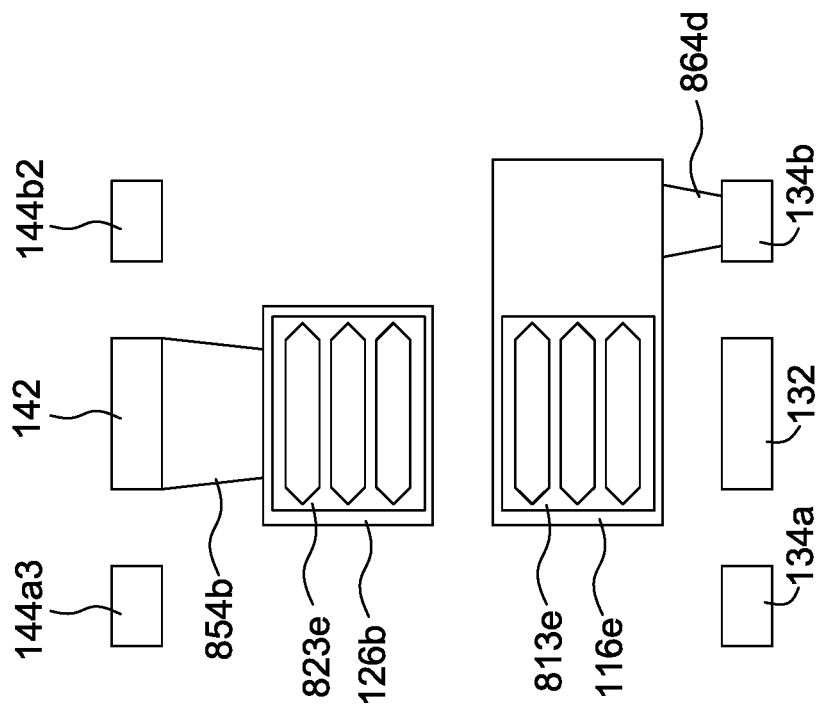

Referring to FIGS. 8B, 8D and 8L, the power rail 142 is electrically connected to the source/drain regions 823a and 823e of the P-type FET devices Mp1 and Mp4 through respective drain vias 854a, 854b and conductive lines 126a, 126b. Referring to FIGS. 8C and 8F, the power rail 132 is electrically connected to the common source/drain region 813b of the N-type FET devices Mn1 and Mn2 through a drain via 856 and the conductive line 116c.

Referring to FIGS. 8C, 8H and 8J, the connection path PX of FIG. 8A is implemented by a conduction path PP2 (in a manner similar to the second type pick-up path of FIG. 4B) formed between the source/drain regions 823c and 813d through the conductive line 126c, a tall drain via 866, the conductive line 134a, a drain via 864a and the conductive line 116d. Referring to FIGS. 8C, 8D, 8H and 8L, the connection path PY of FIG. 8A is implemented by a conduction path shown in FIG. 8C between the source/drain regions 813a, 813c and 813e through respective conductive lines 116a, 116c and 116e, drain vias 864b, 864c and 864d and the conductive line 134b.

Figure 9A:
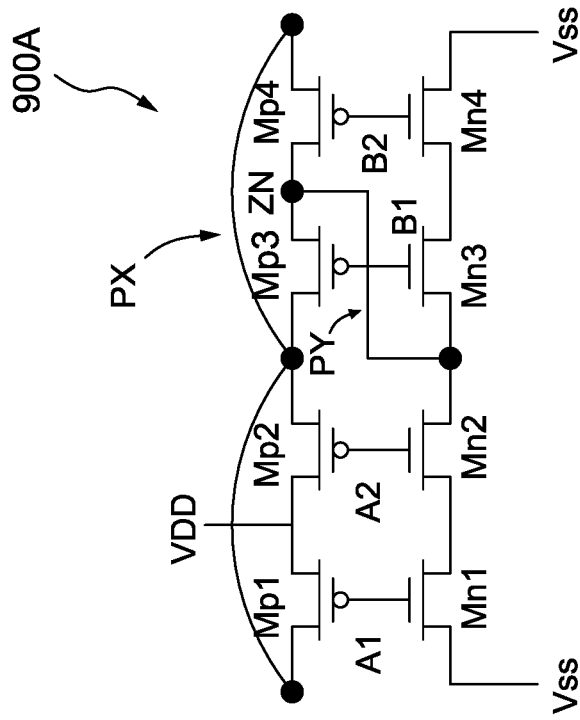
FIG. 9A is a circuit diagram of a semiconductor device, in accordance with some embodiments of the present disclosure.

FIG. 9A is a circuit diagram of a semiconductor device 900A, in accordance with some embodiments of the present disclosure. The semiconductor device 900A is a four-input And-Or-Invert (AOI) device in the present embodiment. The common source/drain terminal of the N-type FET device Mn2 and Mn3 is electrically connected to the common source/drain terminal of the P-type FET device Mp3 and Mp4 at an output node ZN. The outer source/drain terminals of the P-type FET devices Mp1 and Mp4 are electrically connected to the common source/drain terminal of the P-type FET device Mp2 and Mp3. During operation, the semiconductor device 900A is biased to the first voltage VDD at a common source/drain terminal of the P-type FET devices Mp1 and Mp2, and biased to the second voltage VSS at outer source/drain terminals of the N-type FET devices Mn1 and Mn4.

Figure 9B:
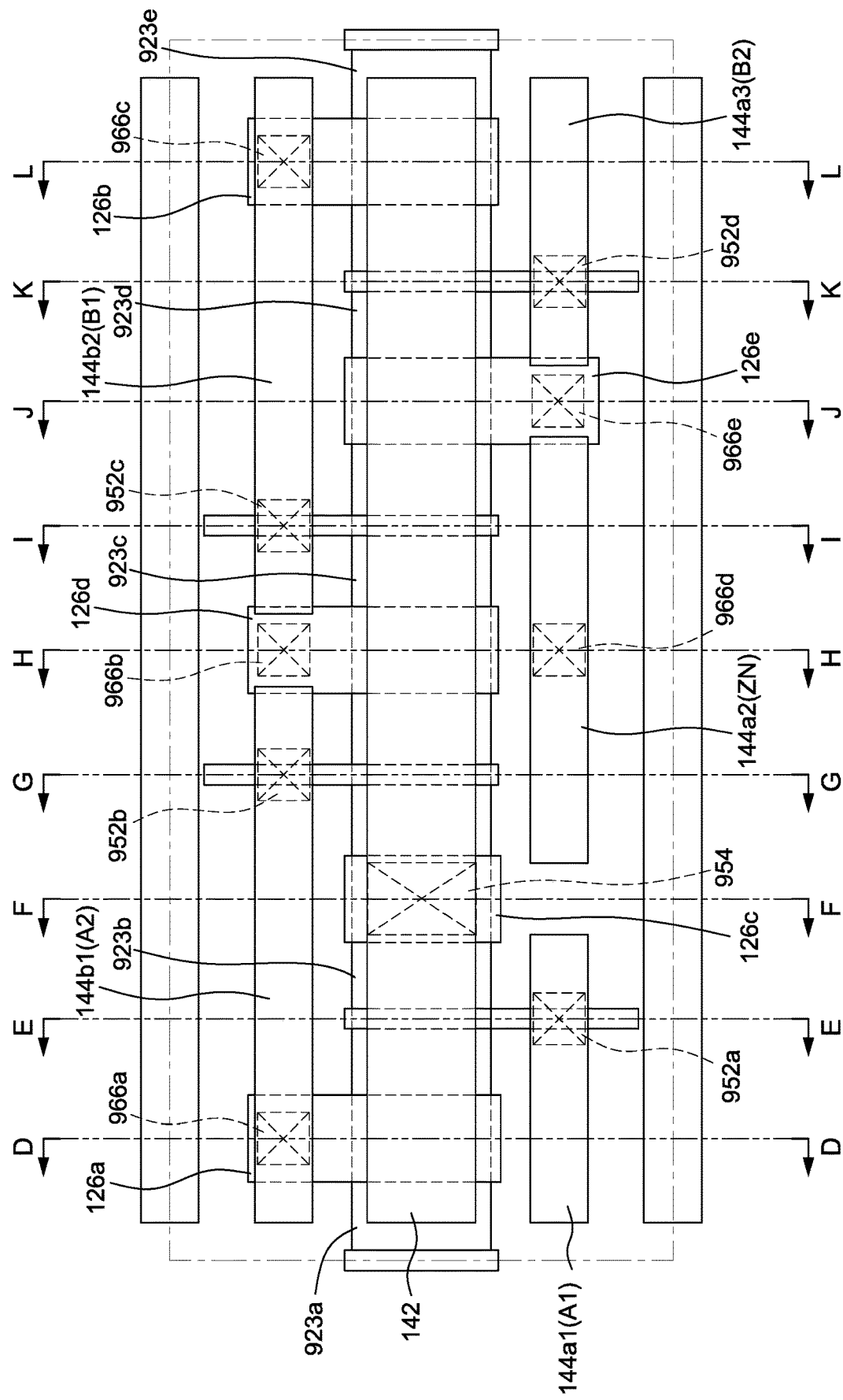
FIGS. 9B and 9C are plan views of the semiconductor device shown in FIG. 9A, in accordance with some embodiments of the present disclosure.
Figure 9C:
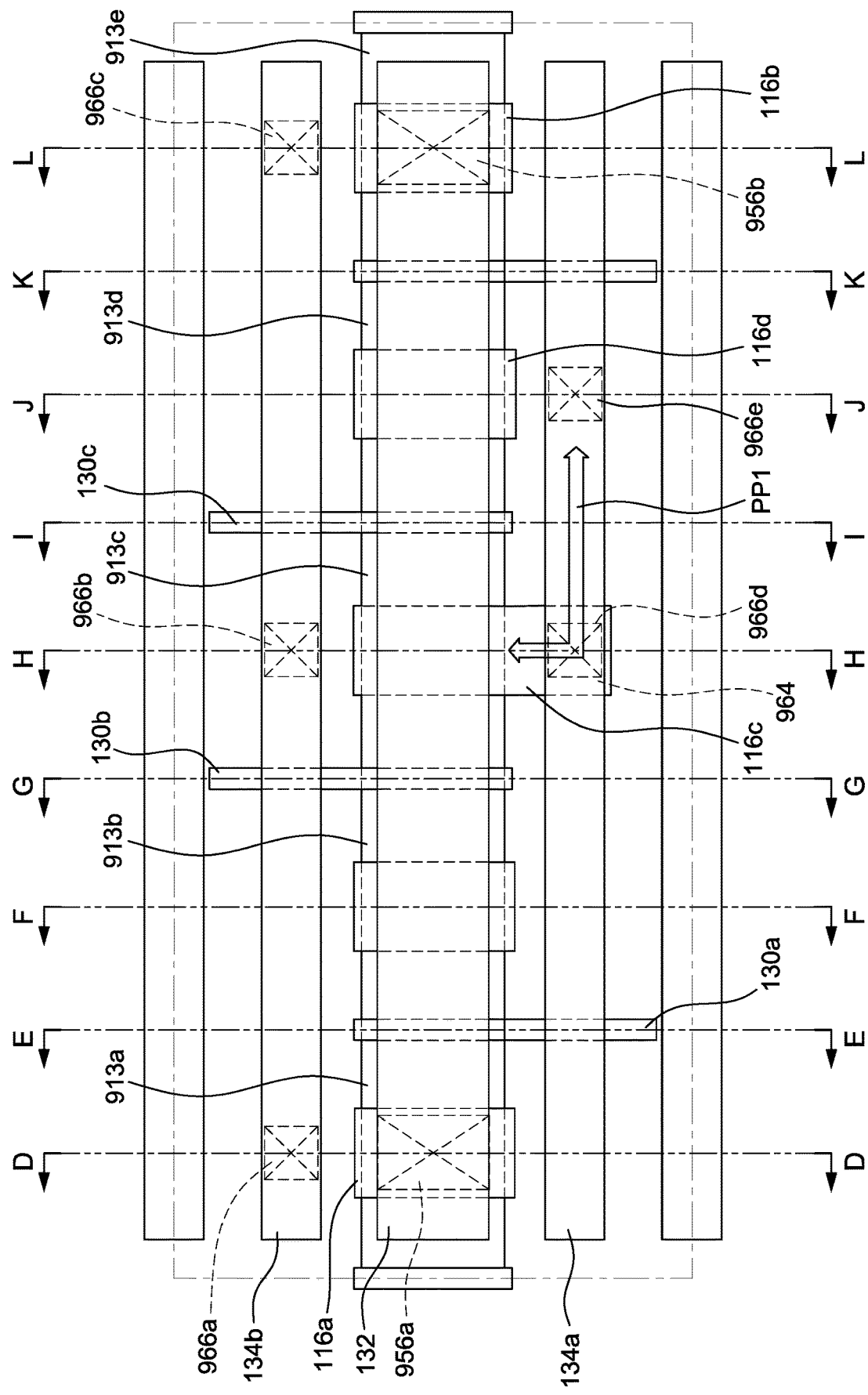
Figure 9E:
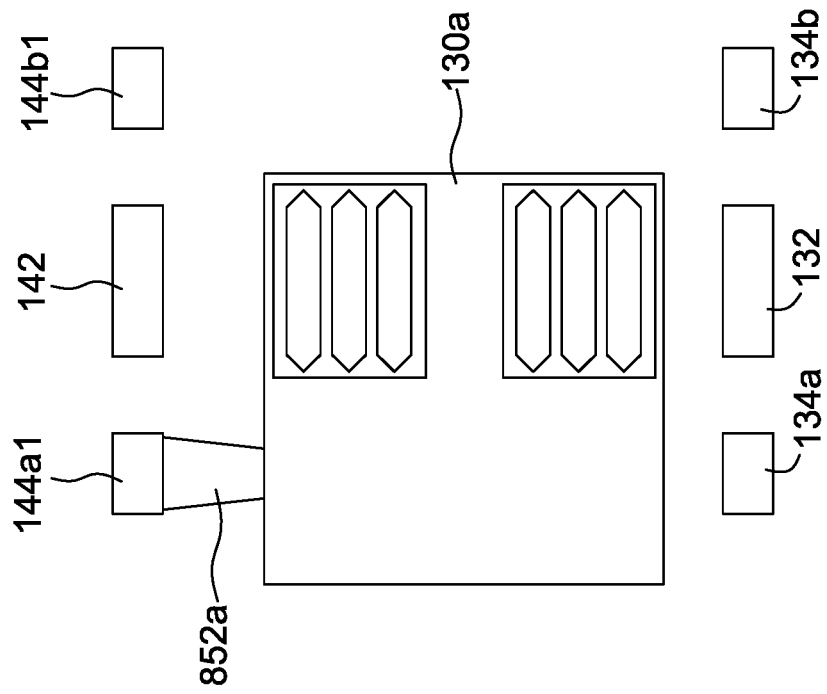
FIGS. 9D to 9L are cross-sectional views of the semiconductor device shown in FIG. 9A, in accordance with some embodiments of the present disclosure.
Figure 9D:
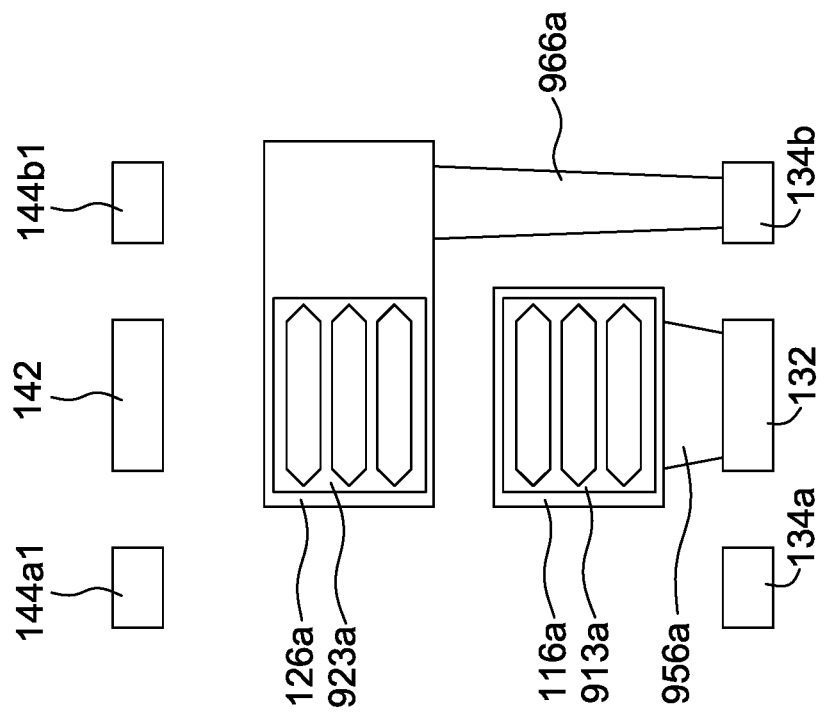
Figure 9G:
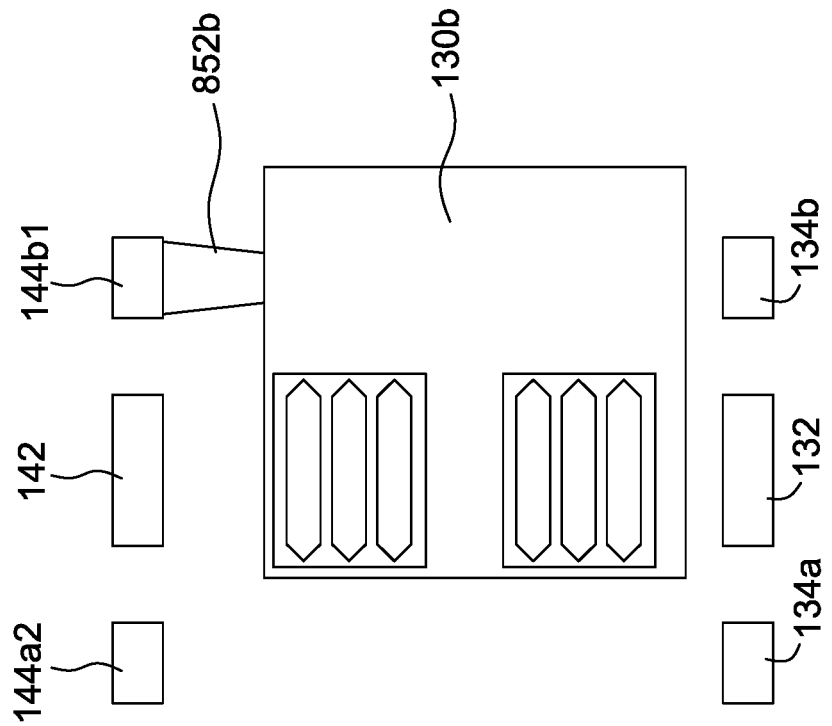
Figure 9F:
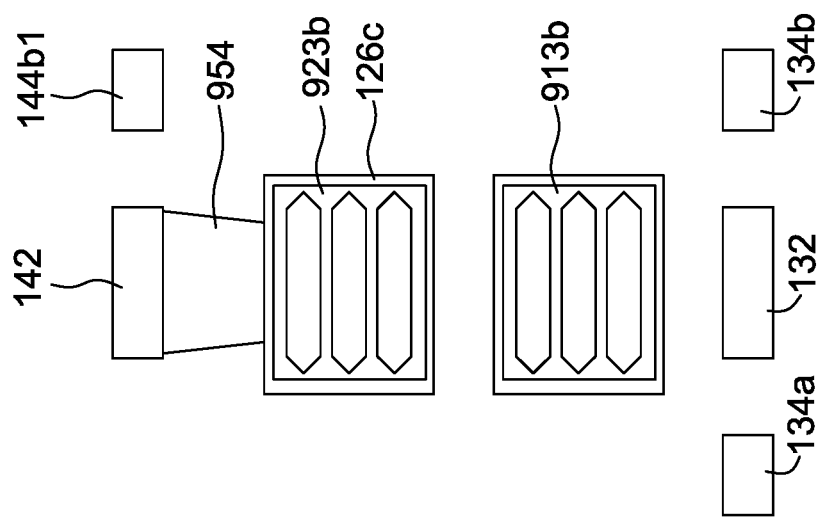

FIGS. 9B and 9C are plan views 900B and 900C of the semiconductor device 900A, in accordance with some embodiments of the present disclosure. In some embodiments, the semiconductor device 900A is implemented as a cell, and the plan views 900B and 900C are referred to as the layouts of the cell 900A. FIGS. 9D to 9F are cross-sectional views of the semiconductor device 900A along respective sectional lines DD, EE, FF, GG, HH, II, JJ, KK and LL in FIGS. 9B and 9C, in accordance with some embodiments of the present disclosure.

Figure 9I:
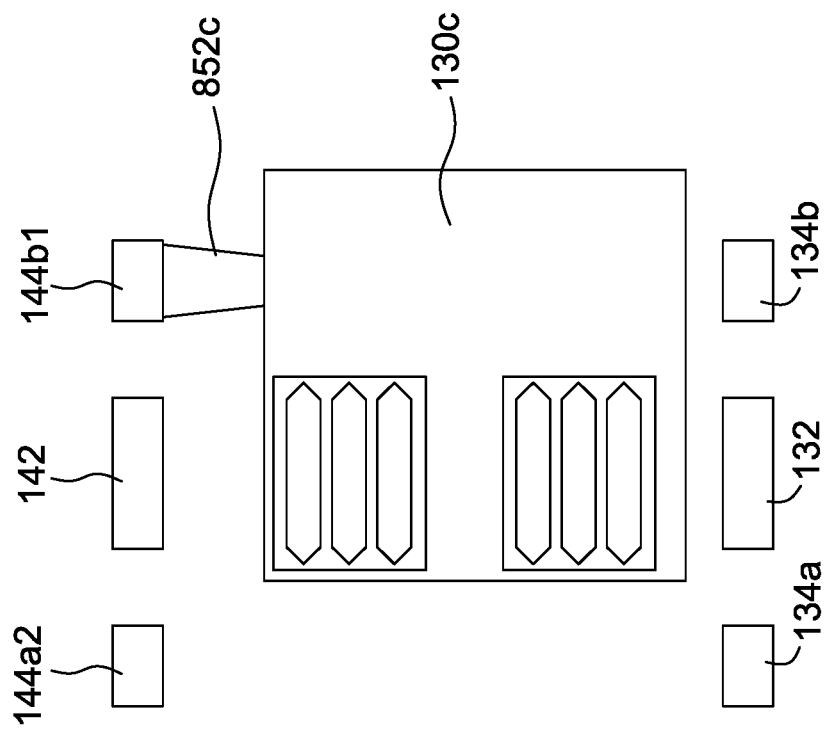

Referring to FIGS. 9A to 9C, the conductive lines 144a1 and 144a2 serve as input pins (nodes) A1 and B2 and are electrically connected to the gates 130a and 130d through gate vias 952a (see FIG. 9B) and 952d (see FIG. 9K), respectively. Still referring to FIGS. 9A to 9C, the conductive lines 144b1 and 144b2 serve as input pins (nodes) A2 and B1 and are electrically connected to the gates 130b and 130c through gate vias 952b (see FIG. 9G) and 952c (see FIG. 9I), respectively. Further, the conductive line 144a2 serves as an output pin (node) ZN and is electrically connected to the common source/drain region 913c of the N-type FET devices Mn2 and Mn3 through a tall drain via 966d and the respective conductive line 116c (see FIG. 9H).

Referring to FIGS. 9B and 9F, the power rail 142 is electrically connected to the source/drain region 923b through a drain via 954 and respective conductive line 126c. Referring to FIGS. 9C, 9D and 9L, the power rail 132 is electrically connected to the source/drain regions 913a and 913e of the N-type FET devices Mn1 and Mn4 through respective drain vias 956a and 956b and conductive lines 116a and 116b.

Figure 9H:
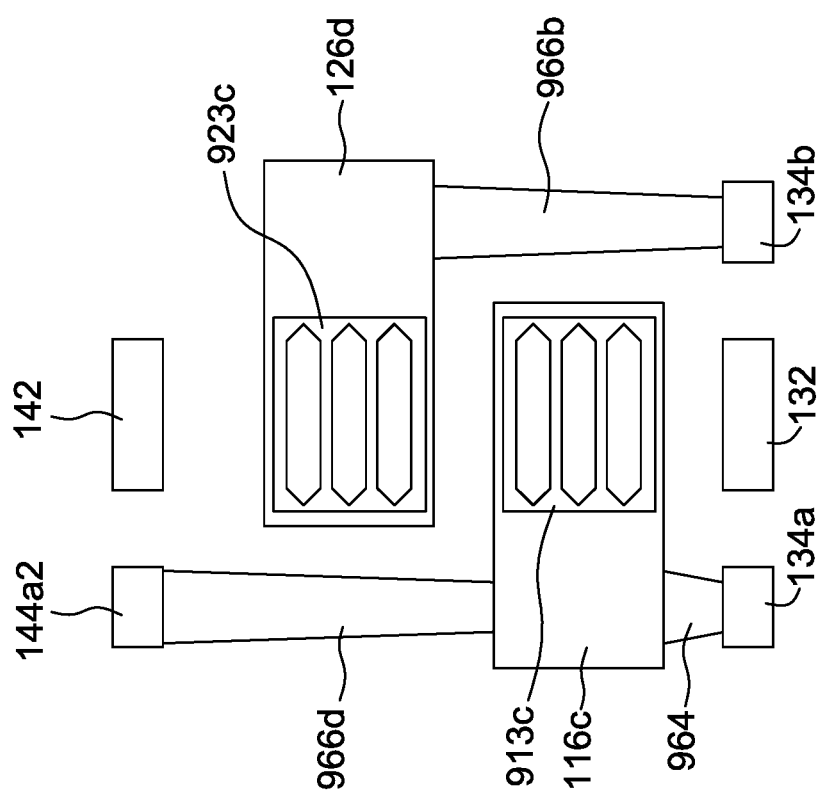
Figure 9K:
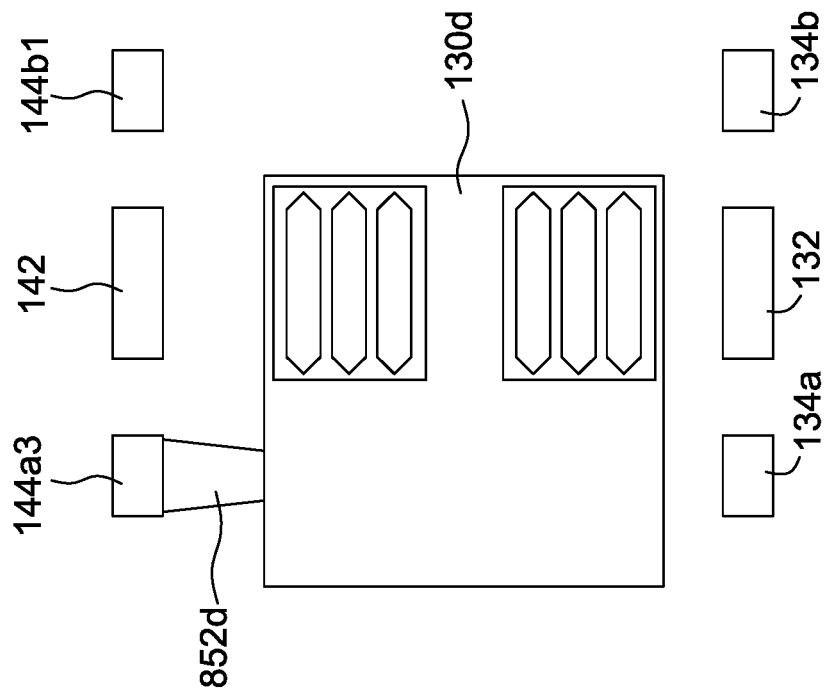
Figure 9J:
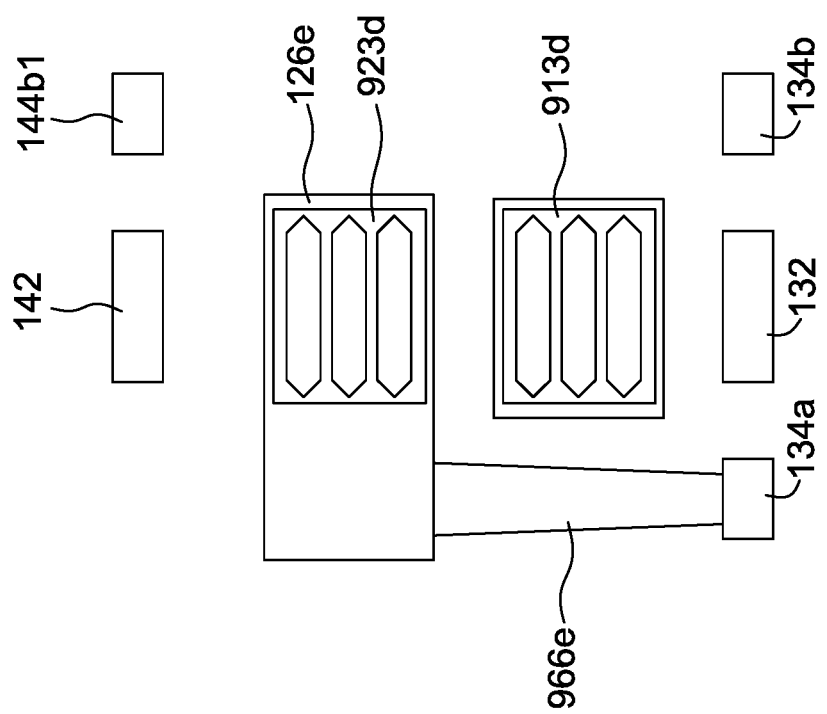
Figure 9L:
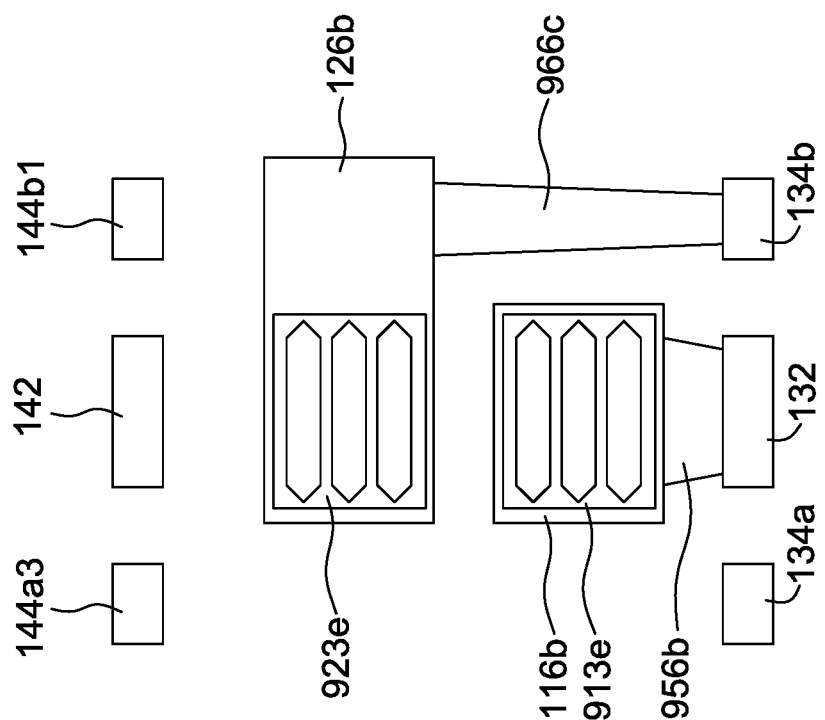

Referring to FIGS. 9D, 9H and 9L, the connection path PX of FIG. 9A is implemented by a conduction path shown in FIG. 9C electrically connecting the source/drain regions 923a, 923c and 923e through the conductive lines 126a, 126c and 126e, tall drain vias 966a, 966b and 966c and the conductive line 134b. Referring to FIGS. 9C, 9H and 9J, the connection path PY of FIG. 9A is implemented by a conduction path PP1 (in a manner similar to the first type pick-up path of FIG. 4A) formed between the source/drain region 923d and the source/drain region 913c through the conductive line 126e, a tall drain via 966e, the conductive line 134a, drain via 964 and the conductive line 116c.

Figure 10B:
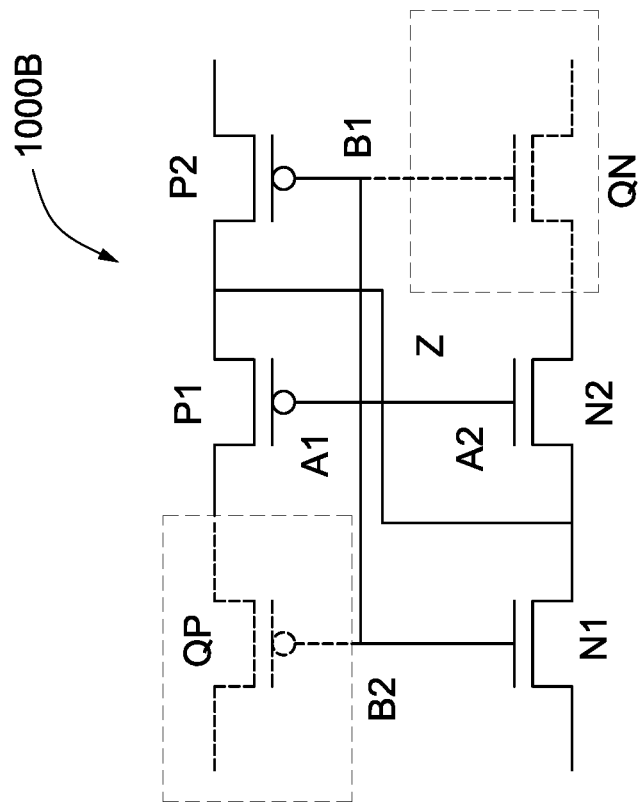
FIGS. 10A and 10B are circuit diagrams of a semiconductor device, in accordance with some embodiments of the present disclosure.
Figure 10A:
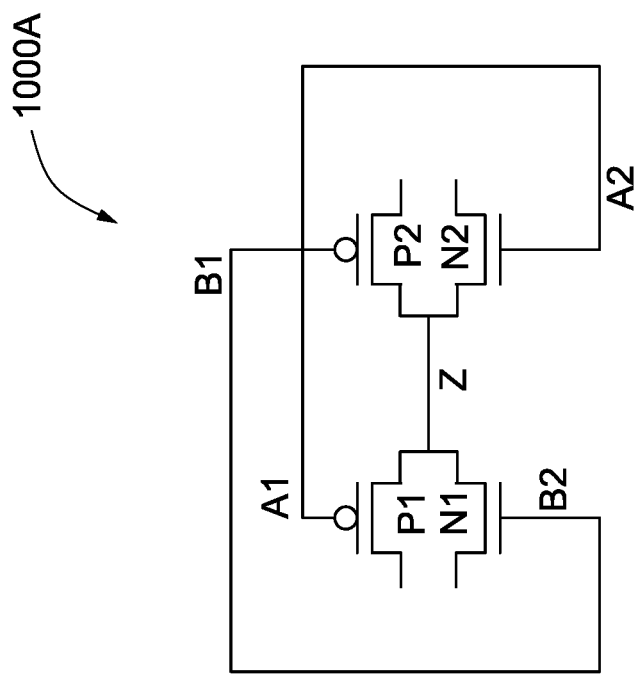

FIG. 10A is a circuit diagram of a semiconductor device 1000A, in accordance with some embodiments of the present disclosure. In some embodiments, the semiconductor device 1000A is a transmission gate device, including two pairs of FETs P1/N1 and P2/N2. A common source/drain region of the FET pair P1/N1 is electrically connected to a common source/drain region of the FET pair P2/N2 at a connection port Z. The gates of the FETs P1 and N2 are interconnected and the gates of the FETs P2 and N1 are interconnected.

A first control signal A1 or A2 is provided to the gate terminals of the FETs P1 and N2, and a second signal B1 or B2 is provided to the gate terminals of the FETs N1 and P2. In some embodiments, the first control signal A1 and the second control signal B1 are complementary to each other.

FIG. 10B is a circuit diagram of a semiconductor device 1000B, in accordance with some embodiments of the present disclosure. In some embodiments, the semiconductor device 1000B is an alternative implementation of the semiconductor device 1000B. Referring to FIG. 10B, the semiconductor device 1000B includes three CFETs parallel to each other, in which the p-type FET QP and the n-type FET N1 form a first CFET, the p-type FET P1 and the n-type FET N2 form a second CFET and the p-type FET P2 and the n-type FET QN form a third CFET. In some embodiments, the p-type FET P2 is electrically connected to the n-type FET N1 while the p-type FET P1 is electrically connected to the n-type FET N2. The interconnected FETs P1, P2, N1 and N2 provide the functionality of the transmission gate 1000A. Furthermore, the FETs QP and QN are not functioning and thus are deactivated in the semiconductor device 1000B.

Figure 10C:
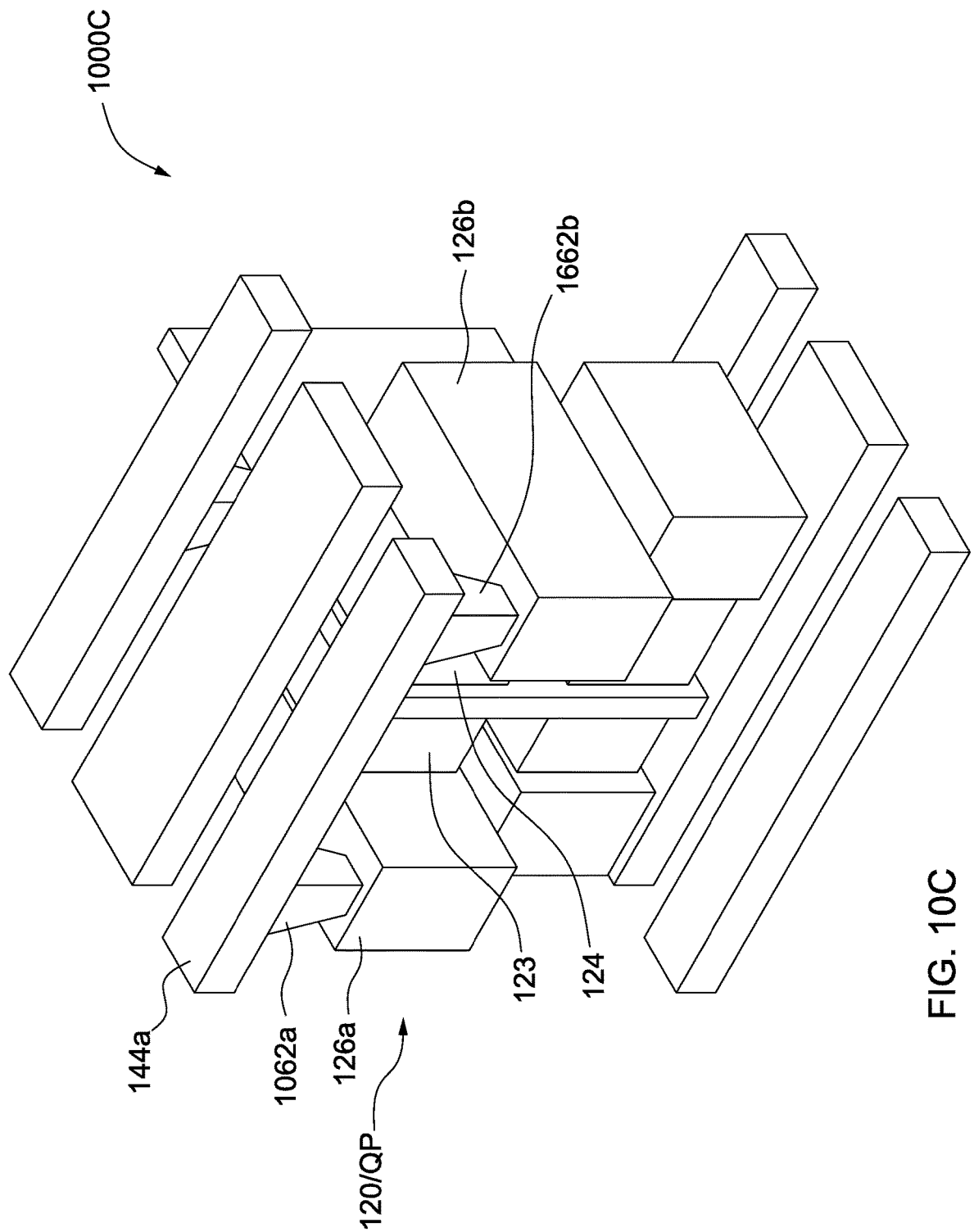
FIGS. 10C to 10F are perspective views of various parts of the semiconductor device shown in FIG. 10B, in accordance with some embodiments of the present disclosure.
Figure 10D:
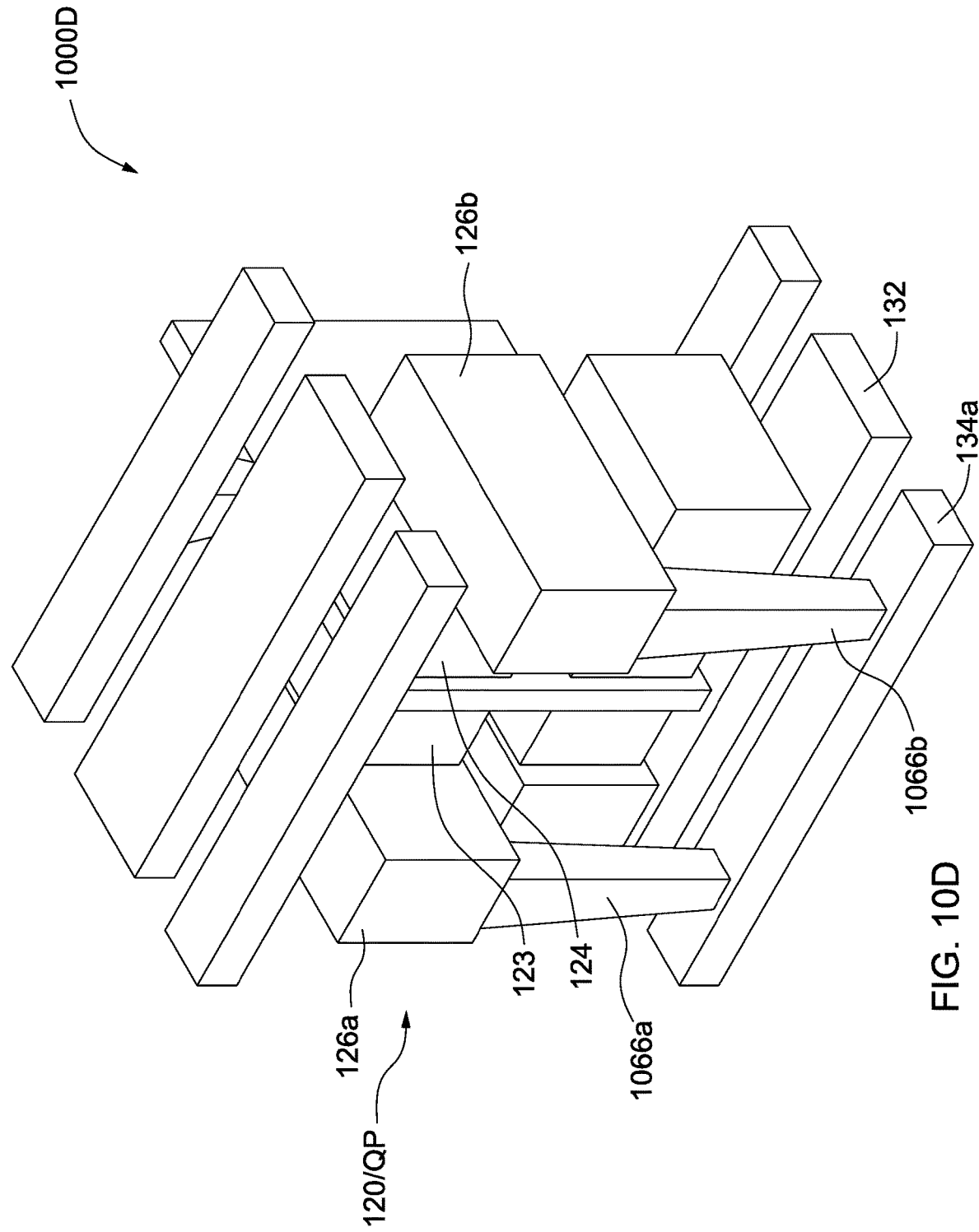

FIGS. 10C to 10D are perspective views of semiconductor devices 1000C and 1000D for realizing the p-type FET QP in the semiconductor device 1000B, in accordance with some embodiments of the present disclosure. The semiconductor devices 1000C and 1000D are similar to the semiconductor device 200A in many aspects, and thus the descriptions of theses aspects are not repeated for brevity.

The p-type FET QP in the semiconductor device 1000C corresponds to that shown in FIG. 10B and is deactivated through shorting the source/drain regions 123 and 124 of the active region 122. As such, the source/drain regions 123 and 124 are shorted through the conductive lines 126a, 126b, drain vias 1062a, 1062b and the conductive line 144a.

Alternatively, as shown in FIG. 10D, the source/drain regions 123 and 124 of the p-type FET QP are shorted through the conductive lines 126a, 126b, tall drain vias 1066a, 1066b and the conductive line 134a.

Figure 10E:
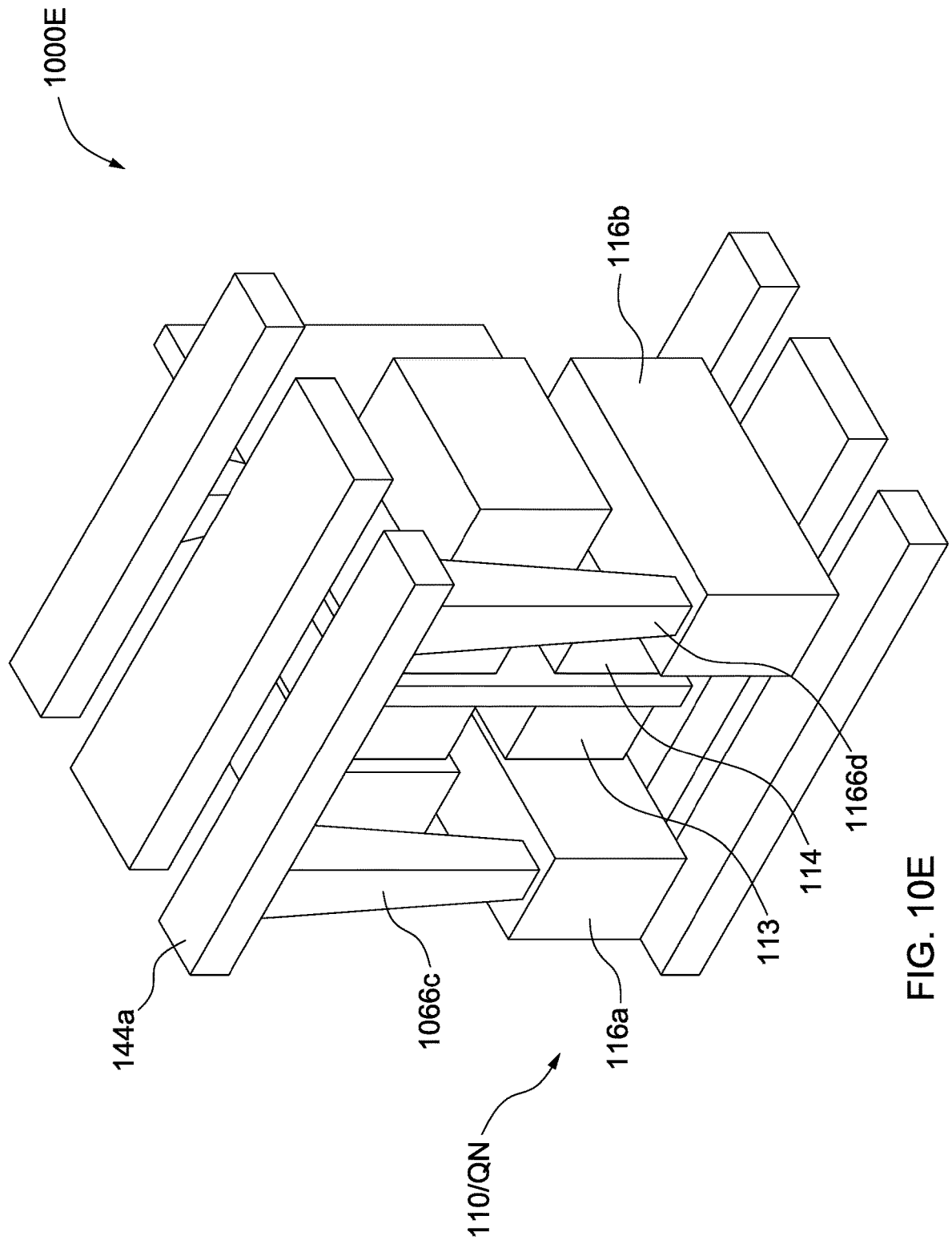
Figure 10F:
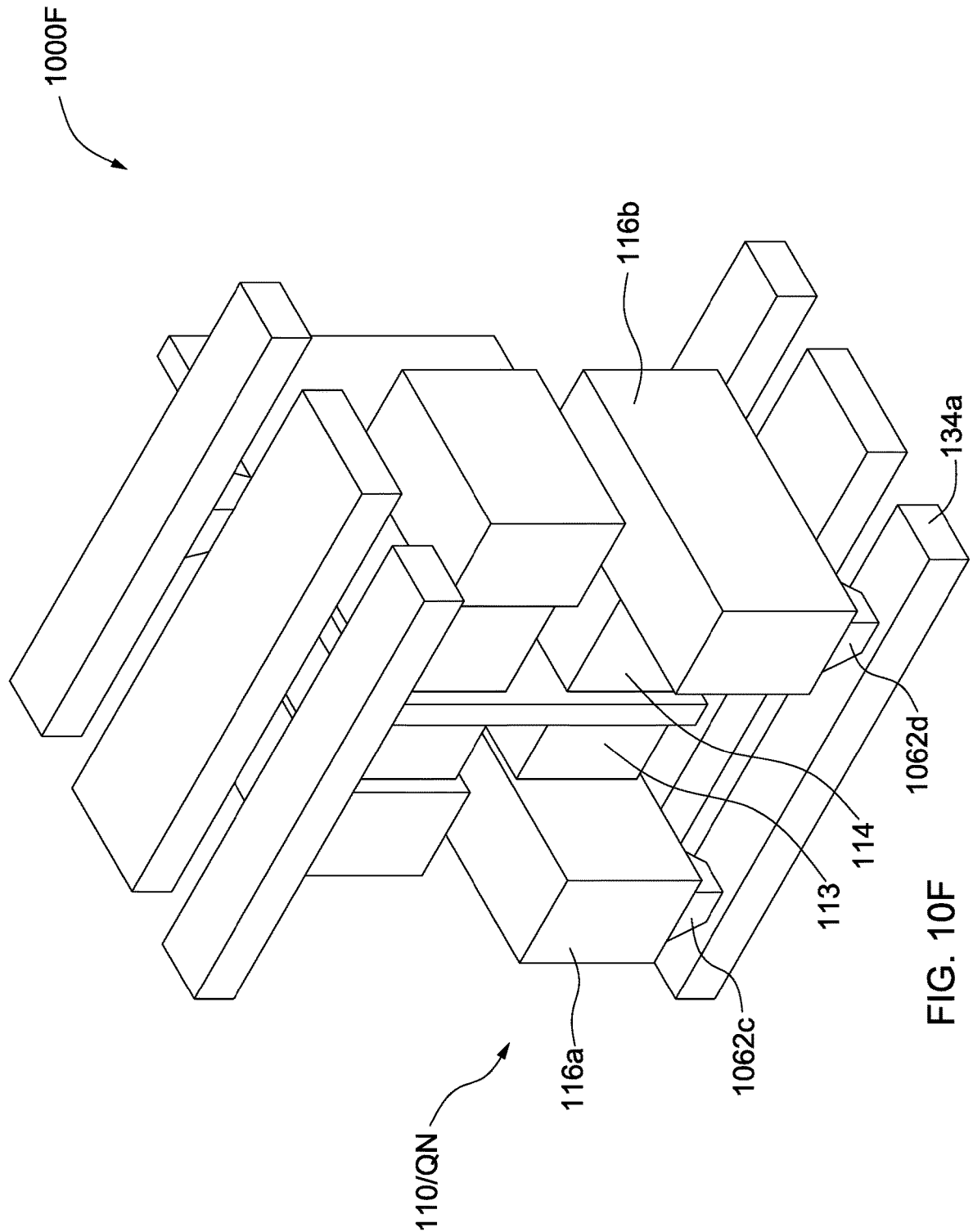

FIGS. 10E to 10F are perspective views of semiconductor devices 1000E and 1000F for realizing the n-type FET QN in the semiconductor device 1000B, in accordance with some embodiments of the present disclosure. The semiconductor devices 1000E and 1000F are similar to the semiconductor device 200A in many aspects, and thus the descriptions of theses aspects are not repeated for brevity.

The n-type FET QN in the semiconductor device 1000E corresponds to that shown in FIG. 10B and is deactivated through shorting the source/drain regions 113 and 114 of the active region 112. As such, the source/drain regions 113 and 114 are shorted through the conductive lines 116a, 116b, tall drain vias 1066c, 1066d and the conductive line 144a.

Alternatively, as shown in FIG. 10F, the source/drain regions 113 and 114 of the n-type FET QN are shorted through the conductive lines 116a, 116b, drain vias 1062c, 1062d and the conductive line 134a.

Figure 11A:
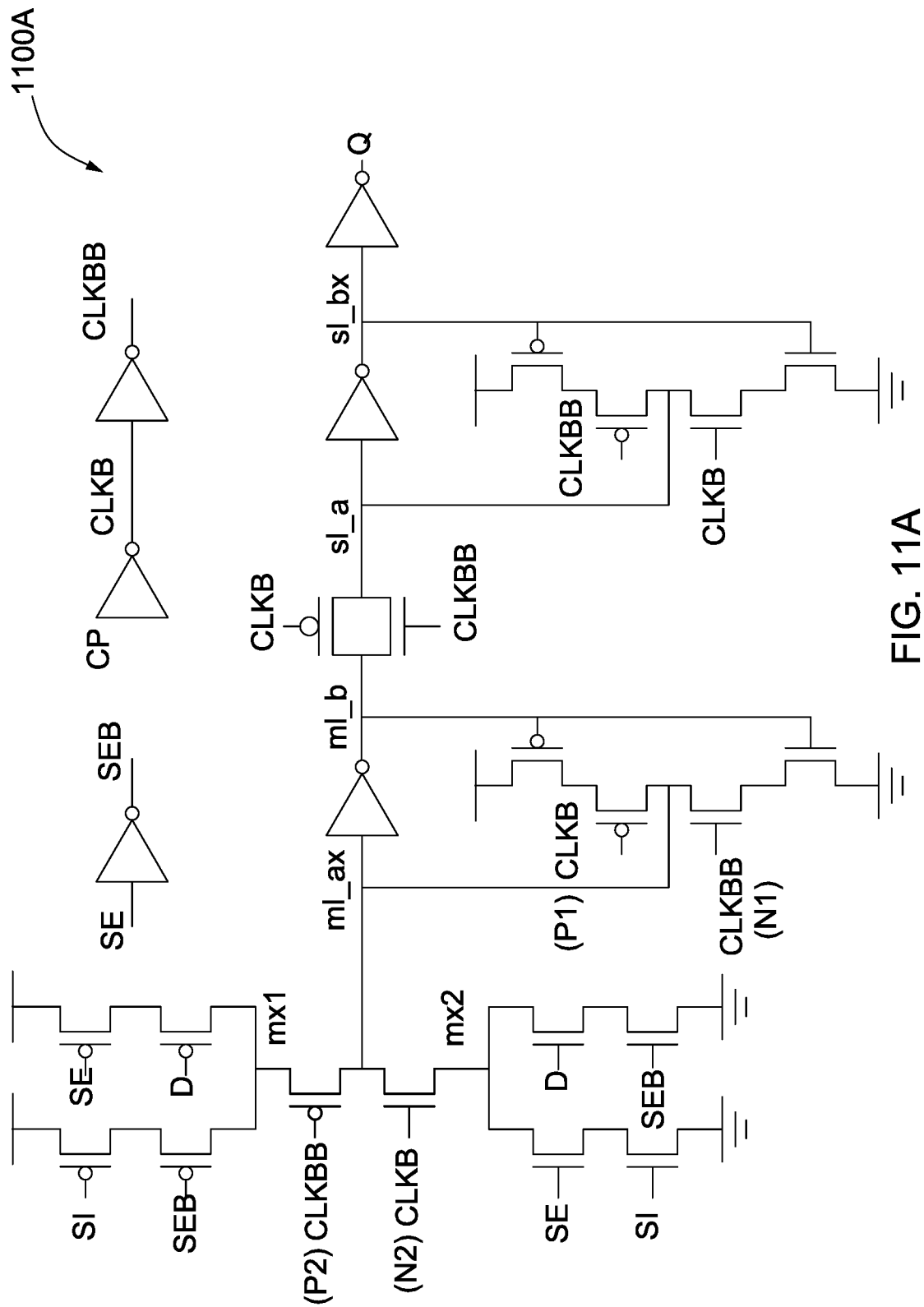
FIG. 11A is a circuit diagram of a semiconductor device, in accordance with some embodiments of the present disclosure.

FIG. 11A is a circuit diagram of a semiconductor device 1100A, in accordance with some embodiments of the present disclosure. In some embodiments, the semiconductor device 1100A is a flip-flop circuit. The semiconductor device 1100A includes, among the various elements, a transmission gate 1102, which corresponds to the transmission gate 1000B, including p-types FETs P1, P2 and n-type FETs N1, N2. The FETs P2 and N2 in conjunction with the FETs P1 and N1 are interconnected at the node ml_ax (corresponding to the connection port Z of the semiconductor device 1000B). In some embodiments, the control signals CLKBB and CLKB correspond to the control signals B1 and A1, respectively, in FIG. 10B.

Figure 11B:
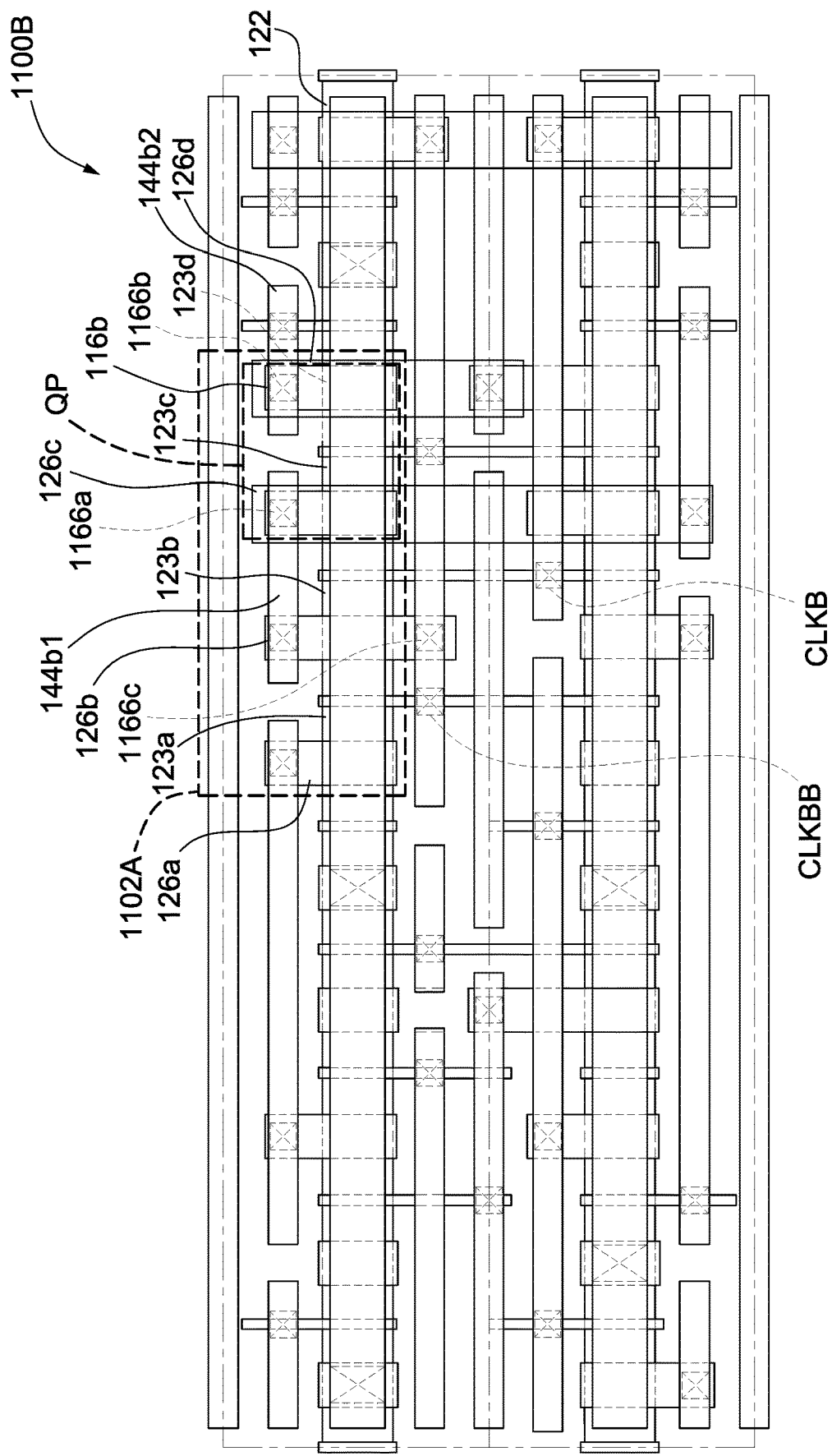
FIGS. 11B and 11C are plan views of the semiconductor device shown in FIG. 11A, in accordance with some embodiments of the present disclosure.
Figure 11C:
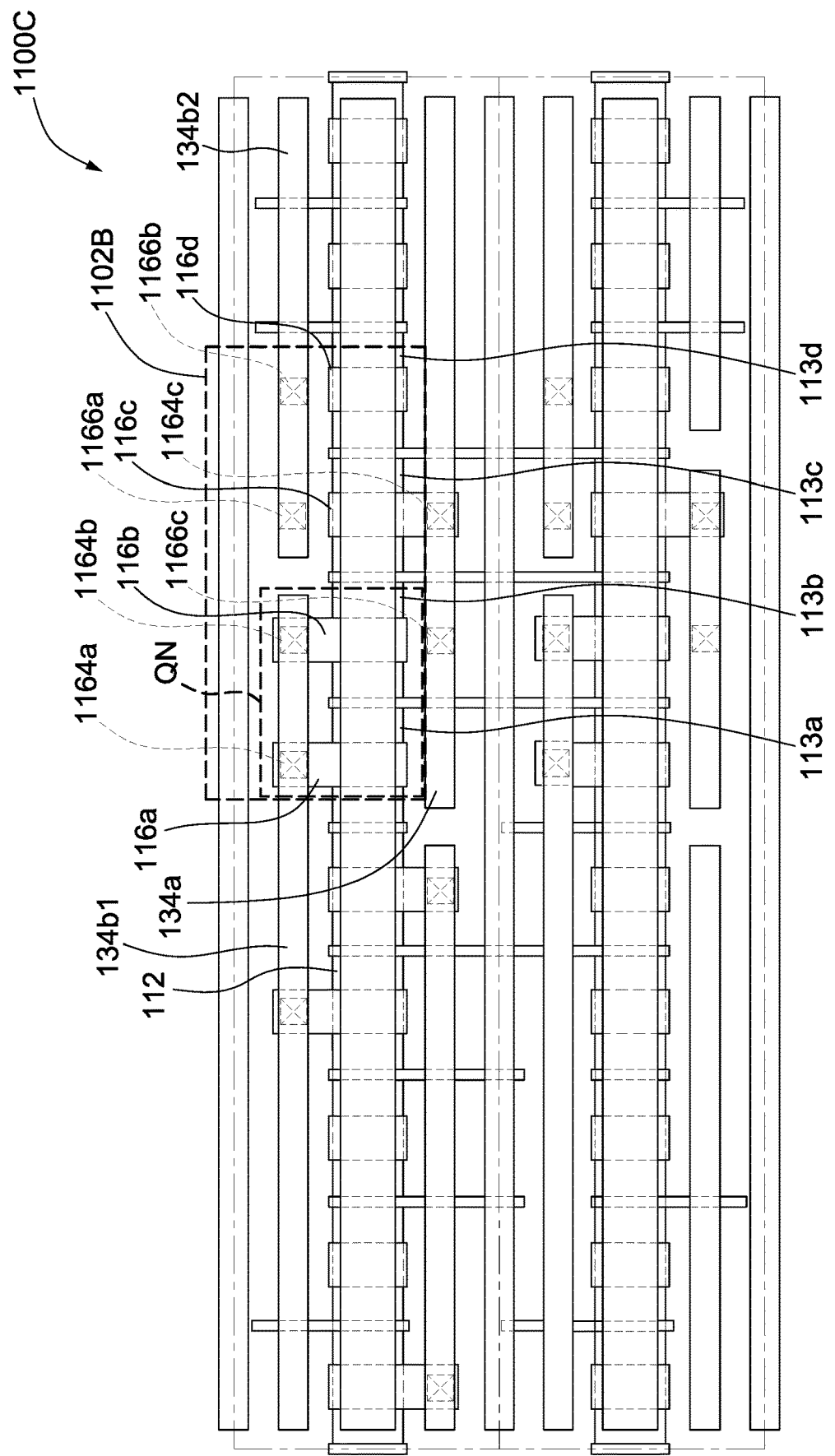

FIGS. 11B and 11C are plan views 1100B and 1100C of the semiconductor device 1100A, in accordance with some embodiments of the present disclosure. In some embodiments, the semiconductor device 1100A is implemented as a cell, and the plan views 1100B and 1100C are referred to as the layouts of the cell 1100A. The features of the semiconductor device 1100A in different layers are shown separately in the layouts 1100B and 1100C for clarity.

The transmission gate 1102 includes a first portion 1102A as shown in FIG. 11B, which includes three p-type FETs P1, P2 and QP formed on the active region 122 and only the p-type FET QP is identified by a dashed box. The transmission gate 1102 further includes a second portion 1102B as shown in FIG. 11C, which includes three n-type FETs N1, N2 and QN formed on the active region 112 and only the p-type FET QN identified by a dashed box.

Referring to FIGS. 11B and 11C, the source/drain regions 123c and 123d of the p-type FET QP are shorted through the conductive lines 126c, 126b, tall drain vias 1166a, 1166b and the conductive line 134b2. Likewise, the source/drain regions 113a and 113b of the n-type FET QN are shorted through the conductive lines 116a, 116b, drain vias 1164a, 1164b and the conductive line 134b1.

In some embodiments, the connection port Z of FIG. 10B (equivalent to the node ml_ax of FIG. 11A) is implemented in FIGS. 11B and 11C by a conduction path formed between the source/drain region 113c and 123b through the conductive line 116c, the drain via 1164c, the conductive line 134a, the tall drain via 1166c and the conductive line 126b, in a manner similar to the second type pick-up path of FIG. 4B.

Figure 12:
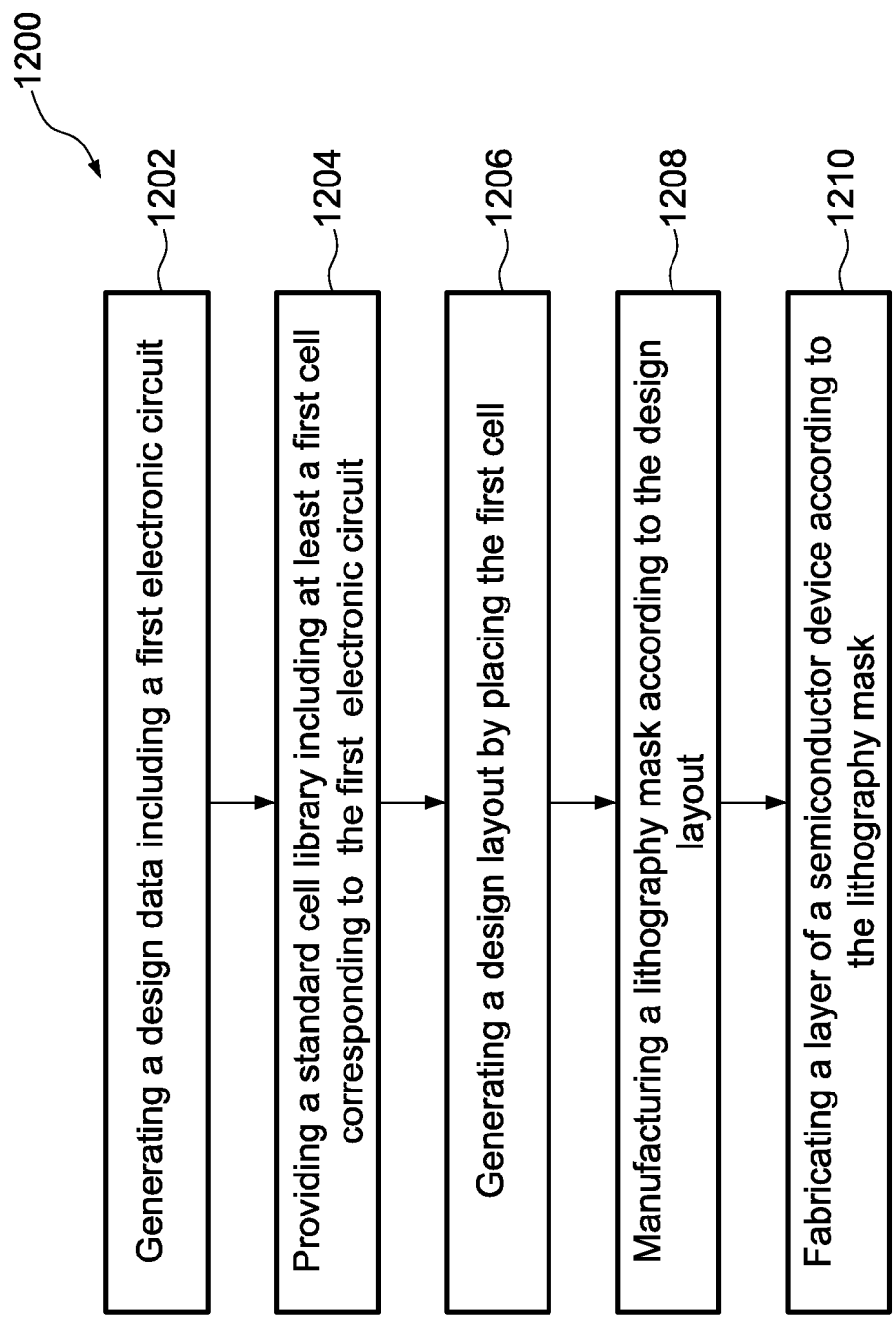
FIG. 12 is a flowchart of a layout method, in accordance with some embodiments of the present disclosure.

FIG. 12 is a flowchart of a layout method 1200, in accordance with some embodiments of the present disclosure. It should be understood that additional steps can be provided before, during, and after the steps shown in FIG. 12, and some of the steps described below can be replaced or eliminated in other embodiments of the layout method 1200. The order of the steps may be interchangeable.

At step 1202, a design data is generated including a first electronic circuit. At step 1204, a standard cell library is provided including a first cell corresponding to the first electronic circuit. In some embodiments, the first cell is associated the semiconductor devices described with reference to the preceding figures.

At step 1206, a design layout is generated by placing the first cell. At step 1208, a lithography mask is manufactured according to the design layout.

At step 1210, a layer of a semiconductor device is fabricated according to the lithography mask.

Figure 13A:
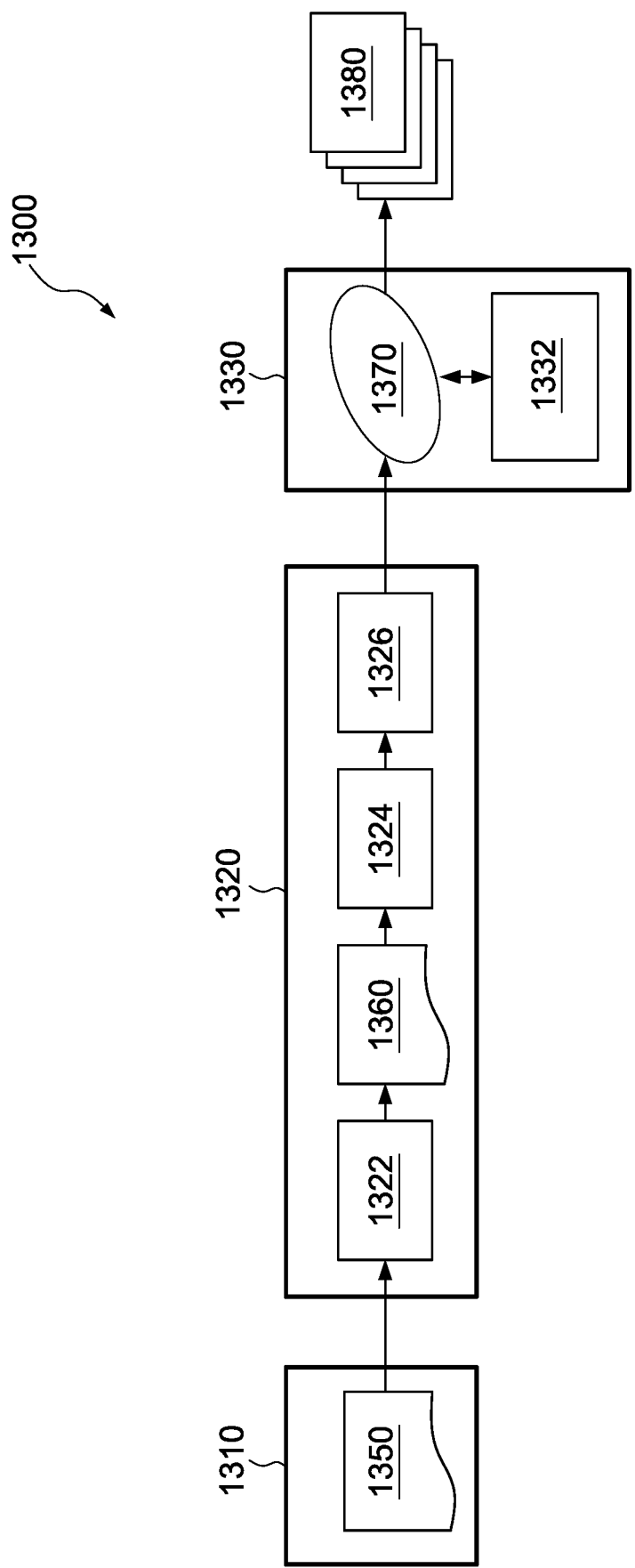
FIG. 13A is a schematic diagram showing an integrated circuit (IC) manufacturing system, in accordance with some embodiments of the present disclosure.

FIG. 13A is a schematic diagram 1300 showing an integrated circuit (IC) manufacturing system, in accordance with some embodiments. The IC manufacturing system 1300 is configured to manufacture an IC device 1380 through a plurality of entities, such as a design subsystem 1310, a mask subsystem 1320, and a fabrication subsystem 1330. The entities in the IC manufacturing system 1300 may be linked by a communication channel, e.g., a wired or wireless channel, and interact with one another through a network, e.g., an intranet or the internet. In an embodiment, the design subsystem 1310, the mask subsystem 1320 and the fabrication subsystem 1330 belong to a single entity, or are operated by independent parties.

The design subsystem (design house or layout design provider) 1310 generates a design layout 1350 in a design phase for the IC devices 1380 to be fabricated. The design subsystem 1310 may perform the layout methods discussed in the present disclosure to generate the design layout 1350, e.g., the design layouts shown with reference to the figures of the present disclosure. In an embodiment, the design subsystem 1310 operates a circuit design procedure to generate the design layout 1350. The design subsystem 1310 may include further one or more steps, such as logic design, physical design, pre-layout simulation, placement and routing, timing analysis, parameter extraction, design rule check and post-layout simulation, to generate the design layout 1350. The design layout 1350 may be converted from description texts into their visual equivalents to show a physical layout of the depicted patterns, such as the dimensions, shapes and locations thereof. In an embodiment, the design layout 1350 can be expressed in a suitable file format such as GDSII, DFII, OASIS, or the like.

The mask subsystem 1320 receives the design layout 1350 from the design subsystem 1310 and manufactures one or more masks (photomask, lithography masks or reticles)

according to the design layout 1350. In an embodiment, the mask subsystem 1320 includes a mask data preparation block 1322, a mask fabrication block 1324 and a mask inspection block 1326. The mask data preparation block 1322 modifies the design layout 1350 so that a revised design layout 1360 can allow a mask writer to transfer the design layout 1350 to a writer-readable format.

The mask fabrication block 1324 is configured to fabricate the mask by preparing a substrate based on the design layout 1360 provided by the mask data preparation block 1322. A mask substrate is exposed to a radiation beam, such as an electron beam, based on the pattern of the design layout 1360 in a writing operation, which may be followed by an etching operation to leave behind the patterns corresponding to the design layout 1360. In an embodiment, the mask fabrication block 1324 includes a checking procedure to ensure that the design layout 1360 complies with requirements of a mask writer and/or a mask manufacturer to generate the mask as desired. An electron-beam (e-beam), multiple e-beams, an ion beam, a laser beam or other suitable writer source may be used to transfer the patterns.

After the lithography mask is fabricated, the mask inspection block 1326 inspects the fabricated mask to determine if any defects, such as full-height and non-full-height defects, exist in the fabricated mask. If any defects are detected, the mask may be cleaned or the design layout in the mask may be modified.

The fabrication subsystem 1330 is an IC manufacturing entity that includes multiple manufacturing facilities or tools for the fabrication of a variety of the IC devices 1380. The fabrication subsystem 1330 uses the mask fabricated by the mask subsystem 1320 to fabricate a wafer 1370 having a plurality of IC devices 1380 thereon. The wafer 1370 includes a semiconductor substrate and optionally various layers formed thereon. The operations provided by the manufacturing facilities or tools may include, but not limited to, photolithography, deposition, sputtering, etching, diffusion, ion implantation and annealing. In some embodiments, test structures may be formed on the wafer 1370 to generate test data indicative of the quality of the fabricated wafer 1370. In an embodiment, the fabrication subsystem 1330 includes a wafer testing block 1332 configured to ensure that the wafer 1370 conforms to physical manufacturing specifications and mechanical and/or electrical performance specifications. After the wafer 1370 passes the testing procedure performed by the wafer testing block 1332, the wafer 1370 may be diced (or sliced) along the scribe line regions to form separate IC devices 1380. The dicing process can be accomplished by scribing and breaking, by mechanical sawing (e.g., with a dicing saw) or by laser cutting.

Figure 13B:
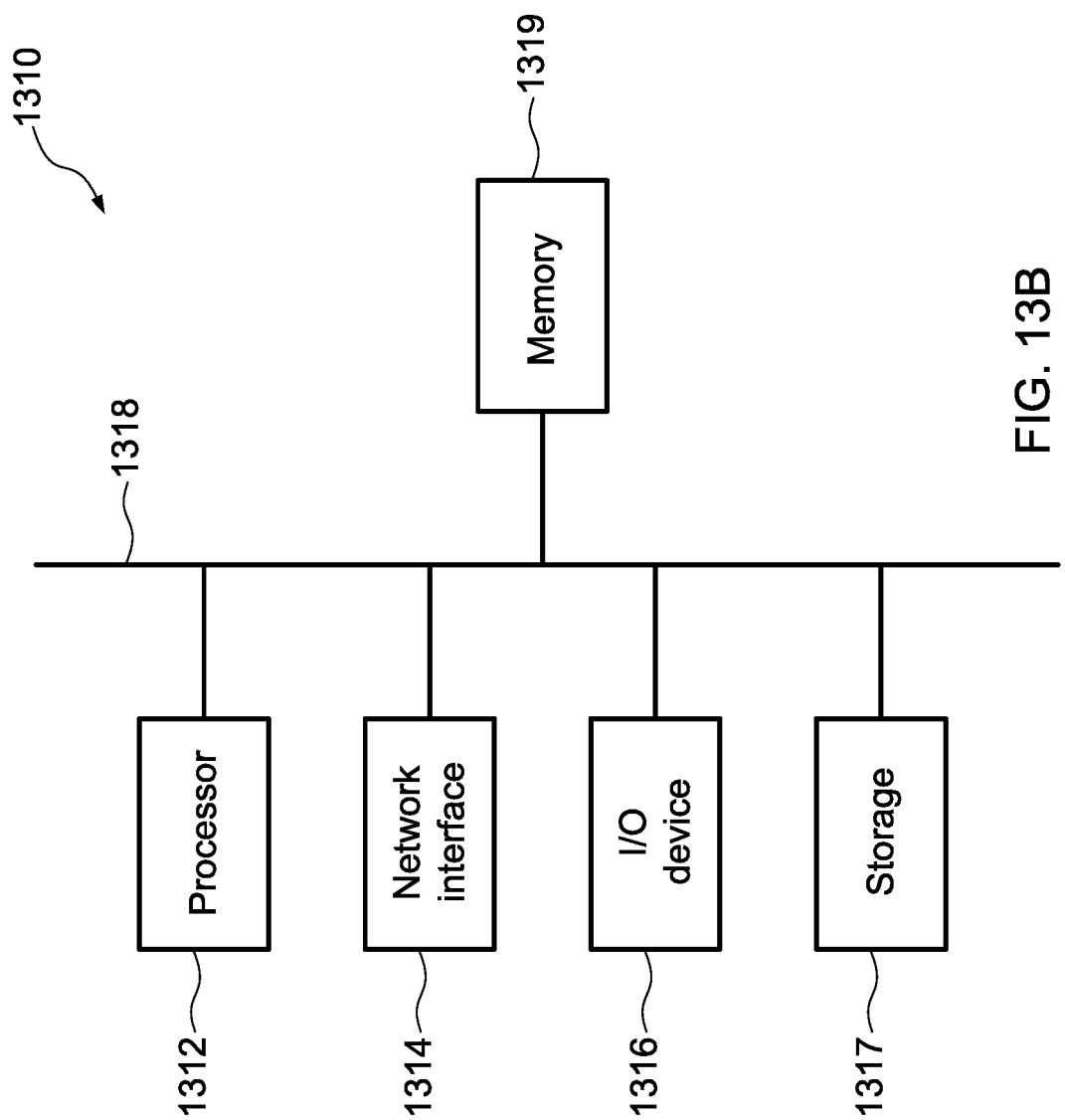
FIG. 13B is a schematic diagram of a design subsystem in the IC manufacturing system shown in FIG. 13A for generating a design layout, in accordance with some embodiments of the present disclosure.

FIG. 13B is a schematic diagram of the design subsystem 1310 of the IC manufacturing system 1300 shown in FIG. 13A for generating or storing the design layouts 1350 discussed above, in accordance with some embodiments. In some embodiments, the design subsystem 1310 is a computer system. The design subsystem 1310 includes a processor 138, a network interface 1314, an input and output (I/O) device 1316, a storage device 1317, a memory 1319, and a bus 1318. The bus 1318 couples the network interface 1314, the I/O device 1316, the storage device 1317, the memory 1319 and the processor 138 to each other.

The processor 138 is configured to execute program instructions that include a tool configured to generate the design layouts as described and illustrated with reference to figures of the present disclosure.

The network interface 1314 is configured to access program instructions and data accessed by the program instructions stored remotely through a network (not shown).

The I/O device 1316 includes an input device and an output device configured for enabling user interaction with the circuit design subsystem 1310. In some embodiments, the input device includes, for example, a keyboard, a mouse, and other devices. Moreover, the output device includes, for example, a display, a printer, and other devices.

The storage device 1317 is configured for storing the design layouts, program instructions and data accessed by the program instructions. In some embodiments, the storage device 1317 includes a standard cell library for storing the data of the standard cells as discussed in the present disclosure. In some embodiments, the storage device 1317 includes a non-transitory computer-readable storage medium, for example, a magnetic disk and an optical disk.

The memory 1319 is configured to store program instructions to be executed by the processor 138 and data accessed by the program instructions. In some embodiments, the memory 1319 includes any combination of a random-access memory (RAM), some other volatile storage device, a read-only memory (ROM), and some other non-volatile storage device.

According to an embodiment, a layout method, executed by at least one processor, includes: generating a design data including an electronic circuit; and generating a design layout by placing a cell corresponding to the electronic circuit. The cell includes a first transistor and a second transistor over the first transistor. The first transistor includes a gate extending in a first direction, a first active region arranged in a first layer and extending in a second direction perpendicular to the first direction, and a first conductive line and a second conductive line arranged on two sides of the first active region. The second transistor includes the gate, a second active region arranged in a second layer over the first layer and extending in the second direction, and a third conductive line and a fourth conductive line arranged on two sides of the second active region. At least one of the first, second, third and fourth conductive line includes a first portion non-overlapped with the gate in the first direction.

According to an embodiment, a layout method, executed by at least one processor, includes generating a design data including an electronic circuit; and generating a design layout by placing a cell corresponding to the electronic circuit. The cell includes a first transistor and a second transistor arranged over the first transistor. The first transistor includes a gate extending in a first direction, a first power rail arranged in a first layer and extending in a second direction perpendicular to the first direction, a first active region arranged in a second layer over the first layer and extending in the second direction, and a first conductive line and a second conductive line arranged in the first layer on two sides of the first power rail. The second transistor includes the gate, a second active region arranged in a third layer over the second layer and extending in the second direction, a second power rail arranged in a fourth layer over the third layer and extending in the second direction, and a third conductive line and a fourth conductive line arranged in the fourth layer on two sides of the second power rail.

According to an embodiment, a semiconductor device includes a first layer having a first power rail and a first transistor of a first conductivity type arranged in a second layer over the first layer. The first transistor includes a gate extending in a first direction, and a first active region extending in a second direction perpendicular to the first direction. The semiconductor device also includes a second transistor of a second conductivity type arranged in a third layer over the second layer, wherein the second transistor includes the gate, and a second active region extending in the second direction. The semiconductor device further includes a fourth layer arranged over the third layer and having a second power rail. The first and second power rails are configured to a first voltage and a second voltage, respectively.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A layout method, executed by at least one processor, comprising:
   generating a design data comprising an electronic circuit; and
   generating a design layout by placing a cell corresponding to the electronic circuit, wherein the cell comprises a first transistor and a second transistor arranged over the first transistor,
   wherein the first transistor comprises:
      a gate extending in a plane formed by two axes in a first direction and a second direction;
      a first active region arranged in a first layer and extending in a third direction perpendicular to the plane, wherein the first active region comprises a pair of first source/drain regions formed of silicon or silicon germanium; and
      a first conductive line and a second conductive line arranged in the first layer on two sides of the first active region and parallel to the plane, wherein the first conductive line and the second conductive line are formed of a metallic material,
   wherein the second transistor comprises:
      the gate;
      a second active region arranged in a second layer over the first layer and extending in the third direction, wherein the second active region comprises a pair of second source/drain regions formed of silicon or silicon germanium; and
      a third conductive line and a fourth conductive line arranged in the second layer on two sides of the second active region and parallel to the plane, wherein the third conductive line and the fourth conductive line are formed of a metallic material,
   wherein the gate extends across the first layer and the second layer and crosses the first active region and the second active region at a position between the first conductive line and the second conductive line,
   wherein at least one of the first, second, third and fourth conductive line comprises a first portion non-overlapped with the gate when viewed from the third direction,
   wherein the gate crosses the first active region and the second active region,
   wherein, from a top-view perspective, the gate has a first portion extending beyond the first or second active region in the first direction by a first length, and a second portion extending beyond the first or second active region in a fourth direction, opposite to the first direction, by a second length greater than the first length,
   wherein, from a top-view perspective, at least one of the first, second, third and fourth conductive lines has a third portion extending beyond the first or second active region in the fourth direction by a third length, and a fourth portion extending beyond the first or second active region in the first direction by a fourth length greater than the third length.

2. The layout method according to claim 1, further comprising manufacturing a lithography mask according to the design layout.

3. The layout method according to claim 1, wherein the cell further comprises a first power rail arranged in a third layer underlying the first layer and a second power rail arranged in a fourth layer over the second layer, wherein the first power rail and the second power rail are configured to supply a first voltage and a second voltage, respectively.

4. The layout method according to claim 3, wherein the first and second power rails overlap the first and second active regions, wherein the first power rail overlaps the second power rail from a top-view perspective.

5. The layout method according to claim 3, wherein the cell further comprises fifth and sixth conductive lines extending in the third layer and arranged on opposite sides of the first power rail.

6. The layout method according to claim 5, wherein the at least one of the first, second, third and fourth conductive line comprises a second portion overlapping one of the fifth and sixth conductive lines from a top-view perspective.

7. The layout method according to claim 5, wherein the cell further comprises a first conductive via arranged between the first and third layers, extending adjacent to the first active region, and electrically connecting the first conductive line to the fifth conductive line.

8. The layout method according to claim 3, wherein the cell further comprises seventh and eighth conductive lines extending in the fourth layer and arranged on opposite sides of the second power rail.

9. The layout method according to claim 1, wherein the cell further comprising a second conductive via electrically connecting the second conductive line to the third conductive line, wherein the second and third conductive lines are on a same side of the gate.

10. The layout method according to claim 1, wherein the first and second conductive lines have different lengths in the first direction.

11. The layout method according to claim 1, further comprising a third conductive via electrically connecting and sandwiched between the first conductive line and the third conductive line on a same side of the first or second active region.

12. The layout method according to claim 1, wherein the first and second transistors comprise one or more nanosheets.

13. A layout method, executed by at least one processor, comprising:
   generating a design data comprising an electronic circuit; and
   generating a design layout by placing a cell corresponding to the electronic circuit, wherein the cell comprises a first transistor and a second transistor arranged over the first transistor, wherein the first transistor comprises:
- a gate extending in a plane formed by two axes in a first direction and a second direction;
- a first power rail arranged in a first layer and extending in a third direction perpendicular to the plane;
- a first active region arranged in a second layer over the first layer and extending in the third direction, wherein the first active region comprises a pair of first source/drain regions formed of silicon or silicon germanium; and
- a first conductive line and a second conductive line arranged in the third direction in the first layer on two sides of the first power rail, wherein the first conductive line and the second conductive line are formed of a metallic material, wherein the second transistor comprises:
- the gate;
- a second active region arranged in a third layer over the second layer and extending in the third direction, wherein the second active region comprises a pair of second source/drain regions formed of silicon or silicon germanium, wherein the gate extends across the second layer and the third layer, and crosses the first active region and the second active region at a position between two ends of the first active region and two ends of the second active region;
- a second power rail arranged in a fourth layer over the third layer and extending in the third direction;
- a third conductive line and a fourth conductive line arranged in the third direction in the fourth layer on two sides of the second power rail, wherein the third conductive line and the fourth conductive line are formed of a metallic material; and
- a fifth conductive line arranged in one of the second or third layer on one side of the first or second active region, wherein the second conductive line is formed of a metallic material,
- wherein the gate crosses the first active region and the second active region,
- wherein, from a top-view perspective, the gate has a first portion extending beyond the first or second active region in the first direction by a first length, and a second portion extending beyond the first or second active region in a fourth direction, opposite to the first direction, by a second length greater than the first length,
- wherein, from a top-view perspective, the fifth conductive lines has a third portion extending beyond the first or second active region in the fourth direction by a third length, and a fourth portion extending beyond the first or second active region in the first direction by a fourth length greater than the third length.

14. The layout method according to claim 13, wherein the gate wraps around nanosheets of the first and second active regions from a cross-sectional view.

15. The layout method according to claim 13, wherein at least one of the first, second, third and fourth conductive lines overlaps the fifth conductive line and is non-overlapped with the gate from a top-view perspective.

16. The layout method according to claim 13, wherein the cell further comprises:
- a sixth conductive line arranged in the second layer and electrically connected to the second active region; and
- a first conductive via electrically connecting the sixth conductive line and the first power rail.

17. The layout method according to claim 16, wherein the sixth conductive line is non-overlapped with the first and second conductive lines from a top-view perspective.

18. A layout method, executed by at least one processor, comprising:
- generating a design data comprising an electronic circuit; and
- generating a design layout by placing a cell corresponding to the electronic circuit, wherein the cell comprises:
  - a gate extending in a plane formed by two axes in a first direction and a second direction;
  - a first power rail arranged in a first layer and extending in a third direction perpendicular to the plane, wherein the first power rail is formed of a conductive material;
  - a first active region arranged in a second layer over the first layer and extending in the third direction, wherein the first active region comprises a pair of first source/drain regions formed of silicon or silicon germanium;
  - a first conductive line arranged in the third direction in the first layer on a first side of the first power rail, wherein the first conductive line is formed of a metallic material;
  - a second conductive line arranged in the second layer on one side of the first active region and parallel to the plane, wherein the second conductive line is formed of a metallic material;
  - a second active region arranged in a third layer over the second layer and extending in the third direction, wherein the second active region comprises a pair of second source/drain regions formed of silicon or silicon germanium, wherein the gate extends across the second layer and the third layer, and crosses the first active region and the second active region at a position between two ends of the first active region and two ends of the second active region;
  - a second power rail arranged in a fourth layer over the third layer and extending in the third direction, wherein the second power rail is formed of a conductive material; and
  - a first conductive via electrically connecting the first power rail to the first active region or connecting the second power rail to the second active region,
  - wherein the gate crosses the first active region and the second active region,
  - wherein, from a top-view perspective, the gate has a first portion extending beyond the first or second active region in the first direction by a first length, and a second portion extending beyond the first or second active region in a fourth direction, opposite to the first direction, by a second length greater than the first length,
  - wherein, from a top-view perspective, the second conductive line has a third portion extending beyond the first or second active region in the fourth direction by a third length, and a fourth portion extending beyond the first or second active region in the first direction by a fourth length greater than the third length.

19. The layout method according to claim 18, wherein the gate wraps around nanosheets of the first and second active regions from a cross-sectional view.

20. The layout method according to claim 18, wherein the first conductive line is non-overlapped with the gate from a top-view perspective.

* * * * *